(12) United States Patent
Tada et al.

(10) Patent No.: US 9,389,485 B2
(45) Date of Patent: Jul. 12, 2016

(54) PHOTO BOOTH

(71) Applicant: FURYU CORPORATION, Tokyo (JP)

(72) Inventors: Kyoko Tada, Osaka (JP); Hidehiro Sakai, Osaka (JP); Takashi Mitsuyasu, Kyoto (JP); Yukari Hamaguchi, Osaka (JP); Shingo Hamaguchi, Osaka (JP); Shuhei Yamoto, Kyoto (JP)

(73) Assignee: FURYU CORPORATION, Tokyo (JP)

( * ) Notice: Subject to any disclaimer, the term of this patent is extended or adjusted under 35 U.S.C. 154(b) by 0 days.

(21) Appl. No.: 14/695,728

(22) Filed: Apr. 24, 2015

(65) Prior Publication Data

US 2016/0004140 A1 Jan. 7, 2016

(30) Foreign Application Priority Data

Jul. 4, 2014 (JP) .................. 2014-138296

(51) Int. Cl.
*G03B 15/05* (2006.01)
*G03B 17/48* (2006.01)

(52) U.S. Cl.
CPC ................. *G03B 15/05* (2013.01); *G03B 17/48* (2013.01)

(58) Field of Classification Search
CPC ...................................................... G03B 17/53
See application file for complete search history.

(56) References Cited

U.S. PATENT DOCUMENTS 3,398,664 A * 8/1968 Bonatsos ............... B03G 17/53
346/107.2
5,446,515 A * 8/1995 Wolfe .................... G03B 17/53
396/2
2010/0296801 A1* 11/2010 Lane ...................... G03B 17/53
396/2
2015/0104162 A1* 4/2015 Crasnianski .......... G03B 17/53
396/2

FOREIGN PATENT DOCUMENTS

| JP | 2001-100306 A | 4/2001 |
| JP | 2002-218498 A | 8/2002 |
| JP | 2003-015211 A | 1/2003 |
| JP | 2003-241296 A | 8/2003 |
| JP | 2003-264760 A | 9/2003 |
| JP | 2004-145245 A | 5/2004 |
| JP | 3548852 B2 | 7/2004 |
| JP | 2005-006342 A | 1/2005 |
| JP | 2005-241839 A | 9/2005 |
| JP | 2009-058723 A | 3/2009 |

OTHER PUBLICATIONS

Oct. 7, 2014 Japanese Office Action issued in Application No. 2014-138296.
Mar. 5, 2015 Japanese Office Action issued in Application No. 2014-138296.
Apr. 7, 2016 Office Action issued in Japanese Application No. 2014-138296.

* cited by examiner

*Primary Examiner* — Clayton E LaBalle
*Assistant Examiner* — Noam Reisner
(74) *Attorney, Agent, or Firm* — Oliff PLC

(57) ABSTRACT

A device includes a camera and an upper strobe which irradiates a user with light from an upper front. The upper strobe is provided such that a light-emitting surface is positioned at an upper rear of the camera as viewed from an object. The present technology can be applied to a photo sticker creating device.

11 Claims, 68 Drawing Sheets

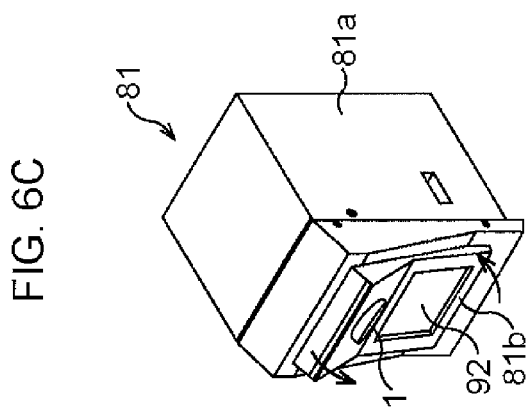
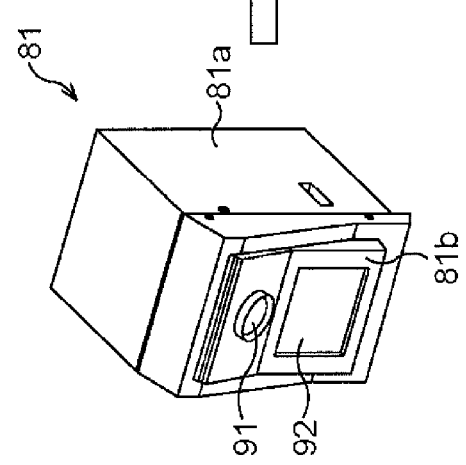
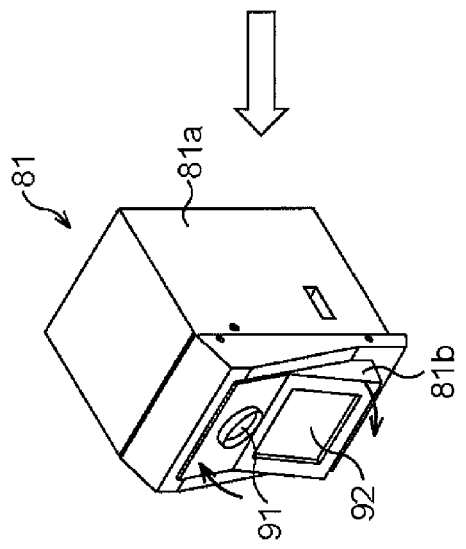
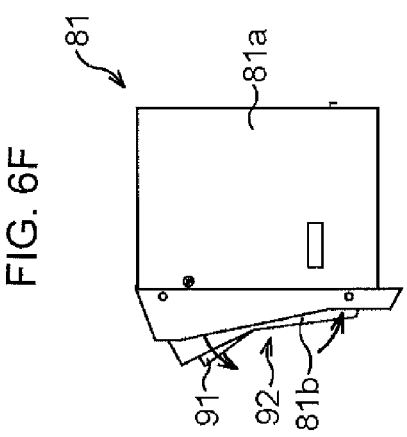
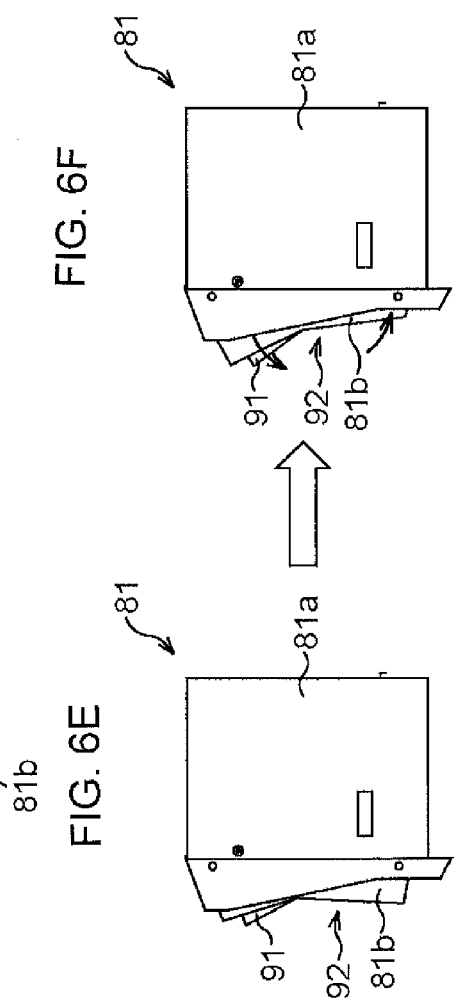
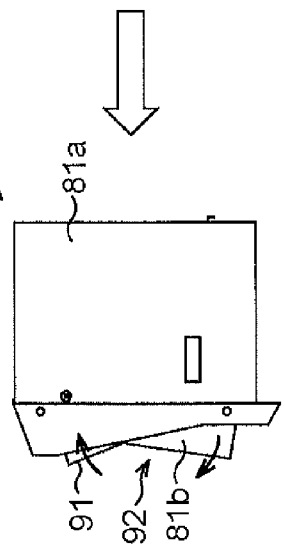

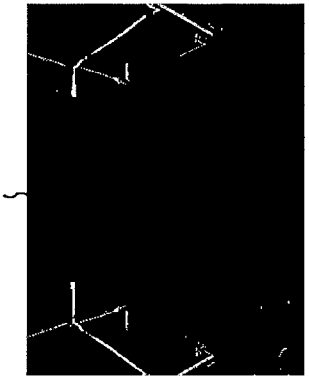
FIG. 33A
551
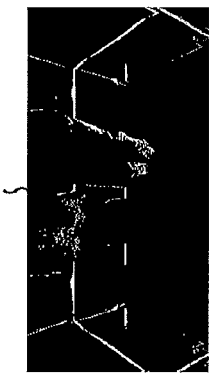
FIG. 33B
552
FIG. 33C
553
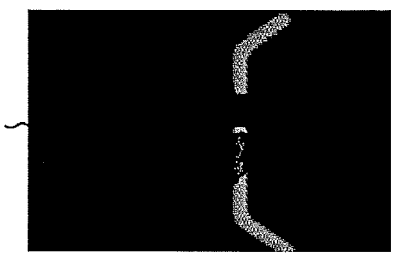
FIG. 33D
554
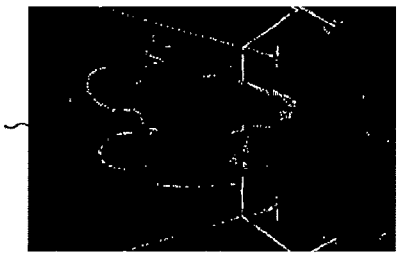
FIG. 33E
555

FIG. 53

PEN SELECT  SELECT EITHER PEN TO SCRIBBLE  00

131

USE
RIGHT PEN

762

TOUCH
Touch the display with a pen
at your dominant hand!

USE
LEFT PEN

761

PHOTO BOOTH

BACKGROUND

1. Technical Field

The present technology relates to a photo booth, more particularly, relates to a photo booth which can provide an image having an excellent finish.

2. Related Art

Conventionally, a photo sticker machine installed in an amusement facility and the like is known. The photo sticker machine shoots a user and edits a shot image according to an operation of the user. The photo sticker machine prints the shot image which has been edited on a sticker sheet.

There is a photo sticker machine which can change the height and the angle of a camera, and can shoot a user at a user's desired height and angle of the camera.

For example, JP 3548852 B2 discloses that a user operates a "+ button" and a "− button" on an operation panel provided separately from a camera and a monitor, and a photo sticker machine thereby sets a camera angle.

Furthermore, JP 2001-100306 A discloses that a photo sticker machine sets a camera attached to one end of a robot arm to a desired position and angle by operating an arm operating button, a camera moving lever, and the like.

In addition, a photo sticker machine in which the height and the angle of a camera can be manually adjusted is also known.

However, in a conventional photo sticker machine, an operation button and the like to set the height and the angle of a camera have been provided at a position apart from the camera and a monitor to display a live view image which is a moving image of a user captured by the camera.

Therefore, when a user sets the height and the angle of the camera checking the live view image, the user should operate an operation button while making one's facial expression and posture. In this case, the user is required to largely move the eyes between the operation button and the monitor. The user may lose the once decided facial expression and posture, and as a result, there is a possibility that the user cannot be satisfied with the shooting.

SUMMARY

Incidentally, a conventional photo sticker machine has shot a user as an object at a position close to a strobe such that the user brightly appears in an image. However, when the distance between the user and the strobe is too close, a "shine" may be generated on a part of the user's face.

The present technology has been made in view of the foregoing, and can provide an image having an excellent finish.

A photo booth according to an aspect of the present technology includes: a camera; and an upper strobe configured to irradiate a user with light from an upper front, and the upper strobe is provided such that a light-emitting surface is positioned at an upper rear of the camera as viewed from an object.

The photo booth further includes a camera unit configured with a housing incorporating the camera and a monitor, and an upper surface of the camera unit inclines to a front side as viewed from the object.

The photo booth further includes a lower strobe configured to irradiate the user with light from a lower front, and the lower strobe is provided below the camera.

The photo booth, further includes a base portion at which the lower strobe is provided, and an upper surface of the base portion inclines to a front side as viewed from the object.

A tilt angle of the camera is adjustable.

The camera performs close-up shooting in which a face and an upper half of a body of the user is shot, and whole-body shooting in which a whole-body of the user is shot.

The photo booth further includes a monitor provided in a vicinity of the camera, and a tilt angle of a display surface of the monitor may be adjustable in accordance with the camera.

A shape of the light-emitting surface of the upper strobe is a substantial circle.

The camera is driven in a vertical direction.

The upper strobe is driven in a vertical direction according to movement of the camera.

In an aspect of the present technology, an upper strobe is provided such that a light-emitting surface is positioned at an upper rear of the camera as viewed from an object.

According to the present technology, it is possible to provide an image having an excellent finish.

BRIEF DESCRIPTION OF DRAWINGS

FIGS. 6A, 6B, 6C, 6D, 6E, and 6F are perspective views and side views illustrating a configuration example of a camera unit;

FIGS. 33A to 33E are examples of mask images generated in the boundary erasing processing;

FIG. 53 is a diagram illustrating an example of a pen selection screen;

DETAILED DESCRIPTION

Hereinafter, specific embodiments to which the present technology is applied will be described in detail with reference to the drawings.

<Configuration of Appearance of Photo Sticker Creating Device>

Figure 1:
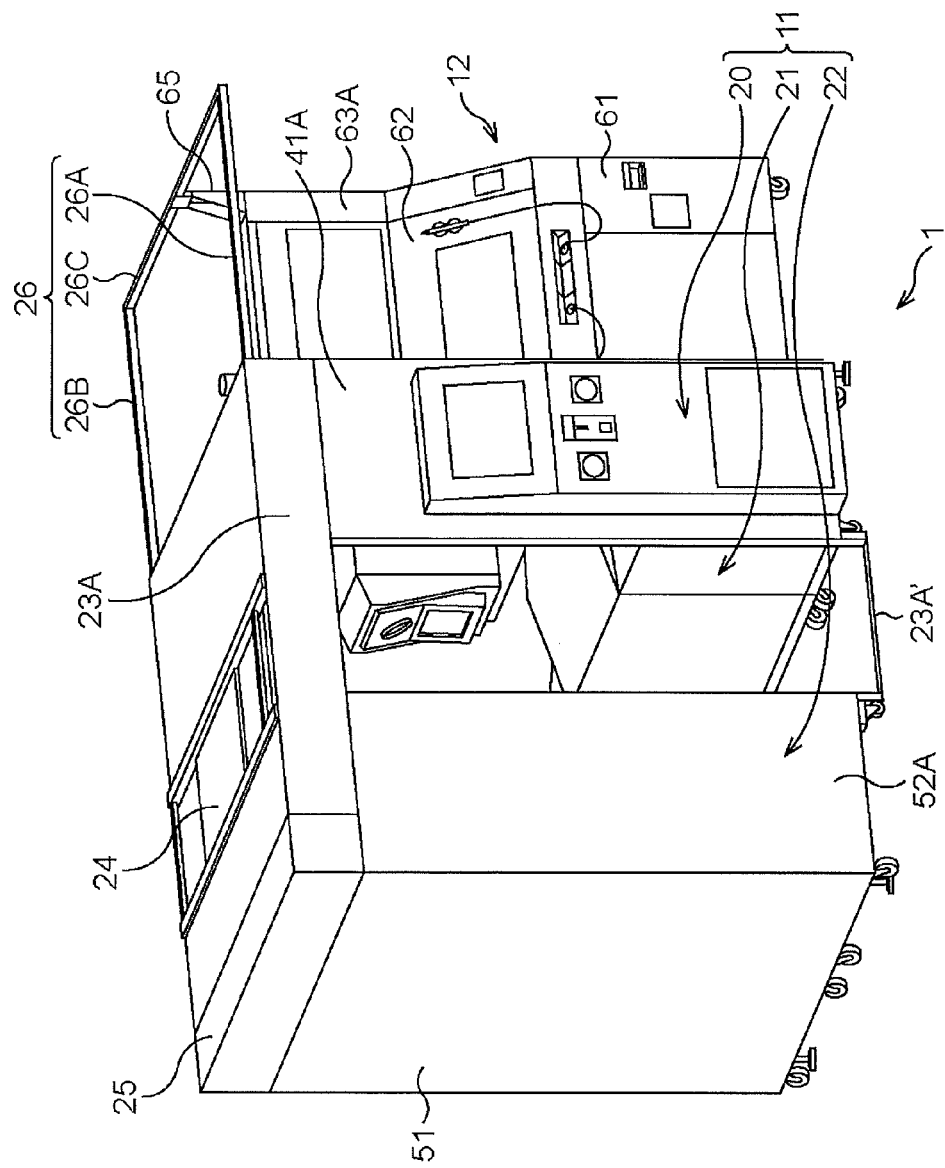
FIG. 1 is a perspective view illustrating a configuration example of an appearance of a photo sticker creating device according to an embodiment of the present technology.
Figure 2:
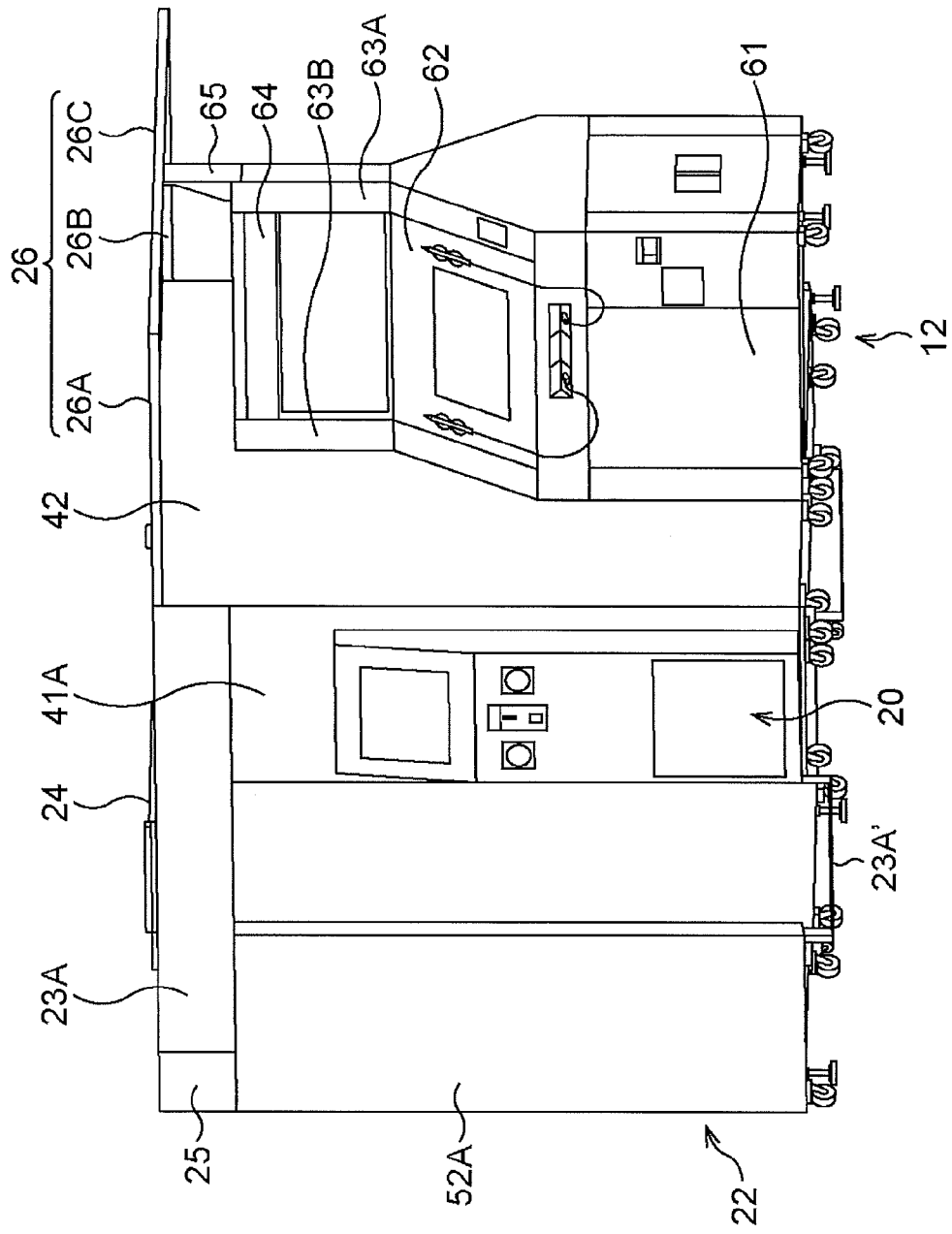
FIG. 2 is a perspective view of the appearance of the photo sticker creating device as viewed from another angle.

FIGS. 1 and 2 are perspective views illustrating a configuration example of an appearance of a photo sticker creating device 1.

The photo sticker creating device 1 is a game device which provides a shot image and an edited image. The photo sticker creating device 1 provides a user with the image by printing the image on a sticker sheet or transmitting the image to a server in order to browse the image on a mobile terminal of the user. The photo sticker creating device 1 is installed in an amusement facility, a shop, and the like. Users of the photo sticker creating device 1 are mainly high school girls and young women. A plurality of users, about two or three persons per a group, as well as a single user can enjoy a game of the photo sticker creating device 1.

In the photo sticker creating device 1, a user shoots oneself as an object. The user composites, by editing work, an image for compositing, such as a handwritten character and a stamp image, on a selected image from the shot images obtained by the shooting. The shot image is thereby edited to be a colorful image. The user receives the sticker sheet on which the edited image, which has been edited, is printed and terminates a series of the game.

As illustrated in FIG. 1, the photo sticker creating device 1 is basically configured such that a shooting unit 11 and an editing unit 12 are installed in a contact state.

The shooting unit 11 is configured with a pre-service portion 20, a shooting portion 21, and a background portion 22. The pre-service portion 20 is installed on a side of the shooting portion 21. A front space of the pre-service portion 20 becomes a pre-service space where pre-service processing is performed. The shooting portion 21 and the background portion 22 are installed being separated by a predetermined distance. A space formed between the shooting portion 21 and the background portion 22 becomes a shooting space where shooting processing is performed.

The pre-service portion 20 performs, as the pre-service processing, guidance introducing a game provided by the photo sticker creating device 1 and various settings of the shooting processing performed in the shooting space. The pre-service portion 20 includes a coin insertion slot to which the user inserts the charge and a touch panel monitor used for various operations. The pre-service portion 20 appropriately guides the user in the pre-service space to the shooting space according to availability of the shooting space.

Figure 3:
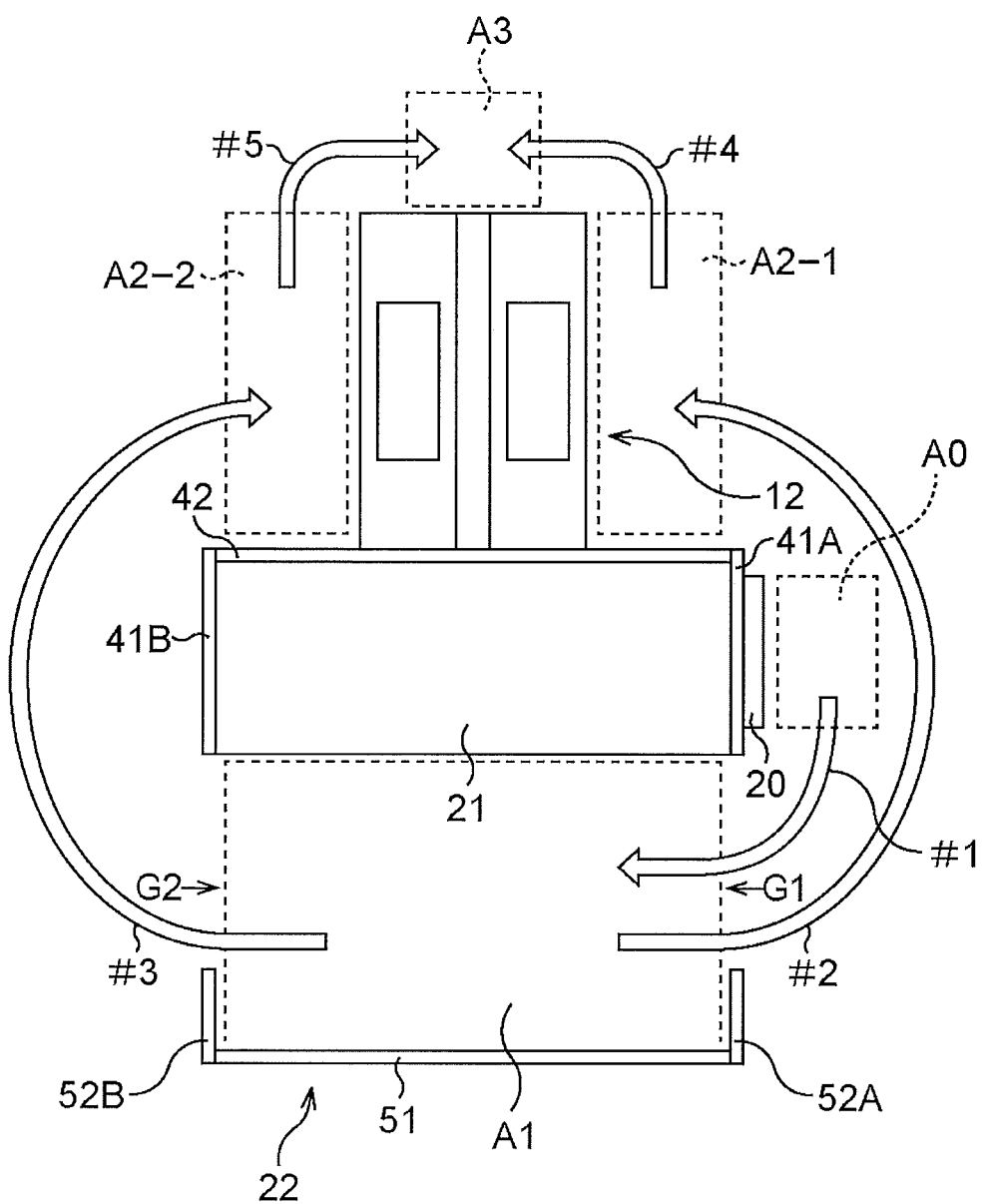
FIG. 3 is a diagram describing movements of a user.

The shooting portion 21 shoots the user as an object. The shooting portion 21 is positioned in front of the user who has entered the shooting space. In the front surface of the shooting portion 21 which faces the shooting space, a camera, a touch panel monitor used for various operations, and the like are provided. When a surface of a right side as viewed from the user in the shooting space is a right side surface, and a surface of a left side is a left side surface, the right side surface of the shooting portion 21 is configured with a side surface panel 41A and the left side surface is configured with a side surface panel 41B (FIG. 3). The front surface of the shooting portion 21 is configured with a front panel 42. The above described pre-service portion 20 is installed on the side surface panel 41A. Note that, the pre-service portion 20 may be installed on the side surface panel 41B or on both of the side surface panels 41A and 41B.

The background portion 22 is configured with a back surface panel 51, a side surface panel 52A, and a side surface panel 52B (FIG. 3). The back surface panel 51 is a plate member positioned at a back surface side of the user facing the front. The side surface panel 52A is a plate member having a narrower breadth than the side surface panel 41A, and attached to a right end of the back surface panel 51. The side surface panel 52B is a plate member having a narrower breadth than the side surface panel 41B, and attached to a left end of the back surface panel 51.

The side surface panel 41A, which configures the right side surface of the shooting portion 21, and the side surface panel 52A of the background portion 22 are provided in substantially the same plane. The upper parts of the side surface panel 41A and the side surface panel 52A are coupled by a coupling portion 23A which is a plate member. The lower parts of the side surface panel 41A and the side surface panel 52A are coupled by a coupling portion 23A' which is a member made of, for example, metal and provided on a floor surface. The side surface panel 41B, which configures the left side surface of the shooting portion 21, and the side surface panel 52B of the background portion 22 are similarly provided in substantially the same plane. The upper parts of the side surface panel 41B and the side surface panel 52B are coupled by a coupling portion 23B (not shown). The lower parts of the side surface panel 41B and the side surface panel 52B are coupled by a coupling portion 23B' (not shown).

An opening formed by being surrounded by the side surface panel 41A, the coupling portion 23A, and the side surface panel 52A becomes an entrance of the shooting space. In addition, an opening formed by being surrounded by the side surface panel 41B, the coupling portion 23B, and the side surface panel 52B also becomes an entrance of the shooting space.

At the upper part of the background portion 22, a background curtain unit 25 is provided in the form of being supported by the back surface panel 51, the side surface panel 52A, and the side surface panel 52B. In the background curtain unit 25, a background curtain of a predetermined color, which appears in the background of the user in the shot image obtained by the shooting, is housed. The background curtain unit 25 appropriately lowers, for example, a green curtain for performing chroma key in the shooting space in conjunction with the shooting.

Note that, the chroma key curtain may be affixed in advance to the back surface panel 51 which is a back surface of the shooting space. When the shooting is performed using the chroma key curtain as the background, various types of background images are prepared, and chroma key processing is performed in the shooting processing or the editing processing. The user can thereby composite a desired background image on the part of the curtain.

Particularly, in the embodiment, on the floor surface of the background portion 22 side in the shooting space, for example, a green sheet, which is similar to the curtain for performing chroma key, is laid to perform the chroma key. The user can thereby composite a desired image for compositing on the floor surface, by performing the chroma key processing to the floor surface in the shot image in which the user appears.

Over the shooting space, a ceiling is formed being surrounded by the front surface of the shooting portion 21, the coupling portion 23A, the coupling portion 23B, and the background curtain unit 25. On a part of the ceiling, a ceiling strobe unit 24 is provided. One end of the ceiling strobe unit 24 is fixed to the coupling portion 23A, and the other end is fixed to the coupling portion 23B. The ceiling strobe unit 24 incorporates a strobe which irradiates the inside of the shooting space with light in accordance with the shooting. In the interior of the ceiling strobe unit 24, a fluorescent light is provided in addition to the strobe. The ceiling strobe unit 24 thereby functions as illumination of the shooting space.

The editing unit 12 edits the shot image. The editing unit 12 is coupled with the shooting unit 11 such that one side surface of the editing unit 12 comes in contact with the front panel 42 of the shooting portion 21.

When the editing unit 12 illustrated in FIGS. 1 and 2 is the front surface side, configurations used for editing work are provided at the front surface side and the back surface side of the editing unit 12. With this configuration, two groups of users can perform editing work at the same time.

The front surface side of the editing unit 12 is configured with a surface 61, and a slope surface 62 formed above the surface 61. The surface 61 is vertical to the floor surface and substantially parallel to the side surface panel 41A of the shooting portion 21. On the slope surface 62, a tablet built-in monitor and a stylus pen, which are used for the editing work, are provided. On the right side of the slope surface 62, a columnar supporting portion 63A which supports one end of an illumination device 64 is provided. On the left side of the slope surface 62, a columnar supporting portion 63B which supports the other end of the illumination device 64 is provided. On the upper surface of the supporting portion 63A, a supporting portion 65 which supports a curtain rail 26 is provided.

The curtain rail 26 is attached above the editing unit 12. The curtain rail 26 is configured by combining of three rails 26A to 26C. The three rails 26A to 26C are combined such that the shape of the three rails 26A to 26C as viewed from above becomes a substantially U shape. One end of the rail 26A and one end of the rail 26B, which are provided in parallel, are respectively fixed to the coupling portion 23A and the coupling portion 233. The other end of the rail 26A is joined to one end of the rail 26C and the other end of rail 26B is joined to the other end of the rail 26C.

A curtain is attached to the curtain rail 26 such that interiors of a space in front of the front surface of the editing unit 12 and a space in front of the back surface of the editing unit 12 cannot be seen from outside. The space in front of the front surface of the editing unit 12 and the space in front of the back surface of the editing unit 12 which are surrounded by the curtain become editing spaces in which the user performs the editing work.

Although the detail will be described later, in a right side surface of the editing unit 12, an outlet through which a printed sticker sheet is discharged is provided. A space in front of the right side surface of the editing unit 12 becomes a print-waiting space where the user waits for a printed sticker sheet to be discharged.

<Movements of User>

Here, procedures of a photo sticker creation game and movements of the user associated with the game will be described. FIG. 3 is a plan view of the photo sticker creating device 1 as viewed from above.

First, the user inserts the charge to the coin insertion slot at a pre-service space A0 which is a space in front of the pre-service portion 20. Then the user performs various settings according to a screen displayed on the touch panel monitor. As a pre-service work, the user selects, for example, a course of the shooting processing performed in the shooting space and a background of the shot image.

As illustrated by an outline arrow #1, the user who has completed the pre-service work enters a shooting space A1 formed between the shooting portion 21 and the background portion 22 from an entrance G1 between the side surface panel 41A and the side surface panel 52A. Then the user performs shooting work using a camera and a touch panel monitor which are provided in the shooting portion 21.

As illustrated by an outline arrow #2, the user who has completed the shooting work exits the shooting space A1 from the entrance G1 and moves to an editing space A2-1 or as illustrated by an outline arrow #3, exits the shooting space A1 from the entrance G2 and moves to an editing space A2-2.

The editing space A2-1 is an editing space of the front surface side of the editing unit 12. On the other hand, the editing space A2-2 is an editing space of the back surface side of the editing unit 12. The user is guided to either of the editing space A2-1 or the editing space A2-2, for example, by a screen display of the touch panel monitor. For example, the user is guided to an available space of the two editing spaces as a destination. The user who has moved to the editing space A2-1 or the editing space A2-2 starts the editing work. The user in the editing space A2-1 and the user in the editing space A2-2 can perform the editing work at the same time.

After completion of the editing work, printing of the edited images is started. When the printing is started, as illustrated by an outline arrow #4, the user who has completed the editing work in the editing space A2-1 moves from the editing space A2-1 to a print-waiting space A3. As illustrated by an outline arrow #5, the user who has completed the editing in the editing space A2-2 moves from the editing space A2-2 to the print-waiting space A3.

The user who has moved to the print-waiting space A3 waits for the printing of the image to be completed. When the printing has been completed, the user receives the sticker sheet through the outlet provided in the right side surface of the editing unit 12, and terminates a series of the photo sticker creation game.

Next, configurations of respective units and sections will be described.

<Configuration of Pre-Service Portion>

Figure 4:
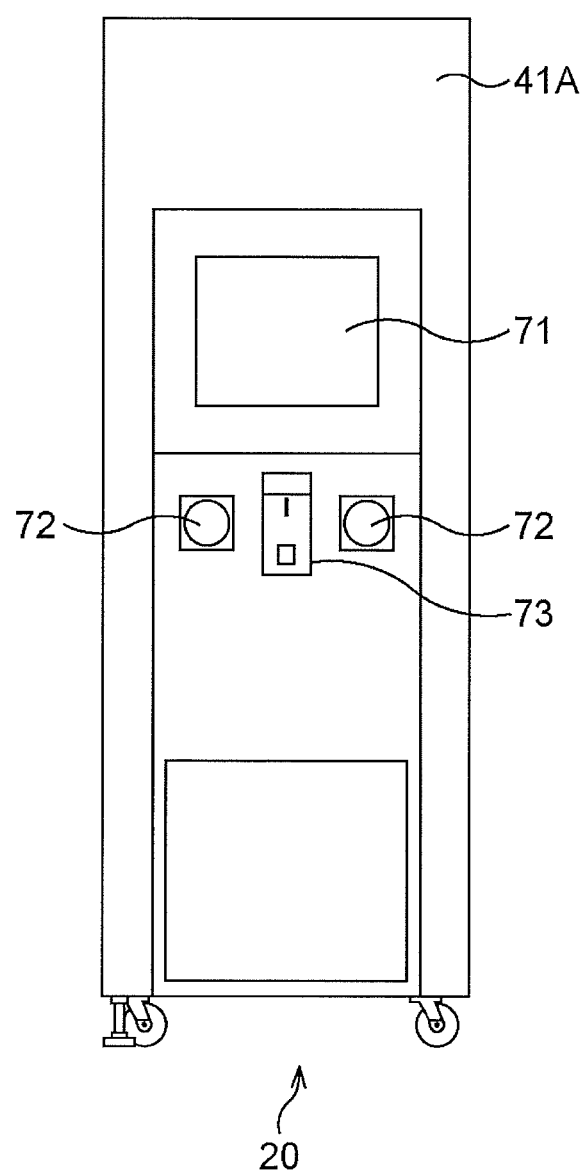
FIG. 4 is a diagram illustrating a configuration example of a pre-service portion.

FIG. 4 is a diagram illustrating a configuration example of a front surface side of the pre-service portion 20.

On the upper part of the pre-service portion 20, a touch panel monitor 71 is provided. The touch panel monitor 71 is configured with a monitor, such as a liquid crystal display (LCD) and a touch panel layered thereto. The touch panel monitor 71 displays various graphical user interfaces (GUIs) and has a function to receive a selection operation by a user. On the touch panel monitor 71, a screen used for pre-service processing, in which a course of the shooting processing, a background of the shot image, and the like are selected, is displayed.

On the lower part of the touch panel monitor 71, two speakers 72 are provided. The two speakers 72 output sound guidance of the pre-service processing, back ground music (BGM), sound effects, and the like. Between the two speakers 72, a coin insertion/return slot 73 to which the user inserts coins is provided.

The speaker 72 and the coin insertion/return slot 73 are provided at a higher position than a conventional photo sticker machine.

In a pre-service portion of the conventional photo sticker machine, a speaker has been provided at a relatively low position. Therefore, it has been difficult for the user to hear the music played from the speaker. Thus, the speaker 72 is provided at a higher position, and it becomes easy for the user to hear the music played from the speaker 72.

Furthermore, in the pre-service portion of the conventional photo sticker machine, a coin insertion/return slot has been provided at a relatively low position. Therefore, it has been difficult for the user to insert a coin to the coin insertion/return slot, the user has failed to insert and dropped the coin. Thus, the coin insertion/return slot 73 is provided at a higher position, and it becomes easy for the user to insert a coin to the coin insertion/return slot 73.

<Configuration of Shooting Portion>

Figure 5:
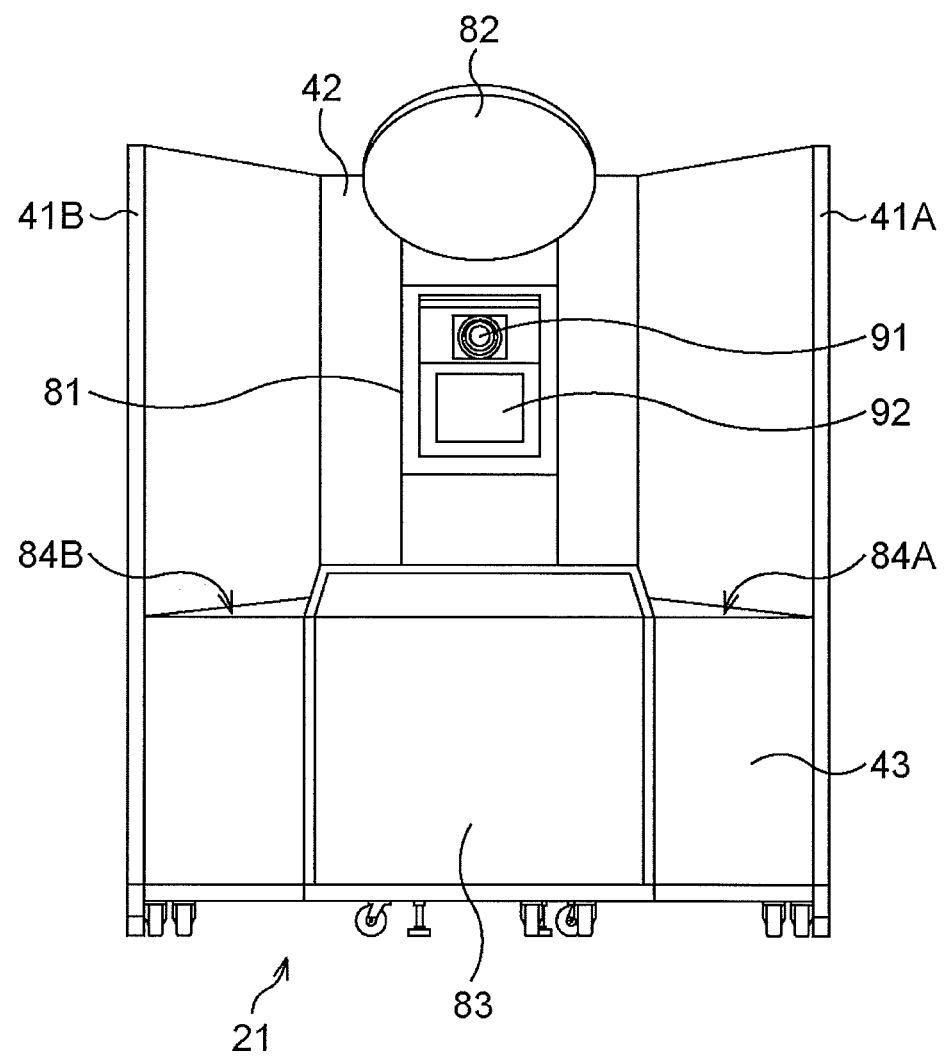
FIG. 5 is a diagram illustrating a configuration example of a shooting portion.

FIG. 5 is a diagram illustrating a configuration example of a front of the shooting portion 21. The shooting portion 21 is configured such that the side surface panel 41A, the side surface panel 41B, and the front panel 42 are attached to a box-like base portion 43.

In the center of the front panel 42, a camera unit 81 is provided. The camera unit 81 is configured with a housing incorporating a camera 91 and a touch panel monitor 92.

The camera 91 is, for example, a single-lens reflex camera, and is attached to the interior of the camera unit 81 such that a lens is exposed. The camera 91 includes an imaging device, such as a charge coupled device (CCD) image sensor or a complementary metal oxide semiconductor (CMOS) image sensor, and shoots the user in the shooting space A1. A moving image (hereinafter referred to as a live view image) captured by the camera 91 is displayed on the touch panel monitor 92 in real time. A still image captured by the camera 91 at predetermined timing, such as when the shooting is instructed, is stored as the shot image.

The touch panel monitor 92 is provided below the camera 91. The touch panel monitor 92 is configured with a monitor, such as an LCD, and a touch panel layered thereto. The touch panel monitor 92 has a function as a live view monitor to display the moving image captured by the camera 91, and a function to display various GUIs and to receive a selection operation by the user. The moving image (live view image) and the still image (shot image) captured by the camera 91 are displayed on the touch panel monitor 92.

(Details of Camera Unit)

Here, the details of the camera unit 81 will be described.

FIGS. 6A, 6B, 6C, 6D, 6E, and 6F illustrate perspective views and side views of the camera unit 81. FIGS. 6A, 6B, and 6C illustrate the perspective views of the camera unit 81, and FIGS. 6D, 6E, and 6F illustrate the side views of the camera unit 81.

As illustrated in FIGS. 6A, 6B, 6C, 6D, 6E, and 6F, the camera unit 81 includes a supporting housing 81a and a movable housing 81b. The movable housing 81b incorporates the camera 91 and the touch panel monitor 92, and is supported by the supporting housing 81a. That is, the camera 91 and the touch panel monitor 92 as a display monitor integrally move to adjust an elevation angle or a depression angle (hereinafter, also referred to as a tilt angle). More specifically, the movable housing 81b moves by a predetermined angle such that the camera 91 has the tilt angle (the elevation angle or the depression angle) instructed by the user. Note that, the user can adjust the tilt angles of the camera 91 and the touch panel monitor 92 by the predetermined angle by operating an input portion, which will be described later, displayed on the touch panel monitor 92 or provided in the vicinity of the touch panel monitor 92.

The camera 91 and the touch panel monitor 92 are incorporated in the movable housing 81b such that the lens surface of the camera 91 and the display surface of the touch panel monitor 92 are exposed. As shown in FIGS. 6B and 6E, when the camera 91 in the movable housing 81b has a predetermined depression angle, the display surface of the touch panel monitor 92 is provided so as to face in the horizontal direction. When the display surface of the touch panel monitor 92 faces in the horizontal direction, the user can confirm display contents displayed on the display surface while facing the touch panel monitor 92.

Here, it is assumed that the angle in the state B is a default angle. When the user instructs the camera 91 to face upward in the state B, the depression angle of the camera 91 decreases, and the elevation angle of the touch panel monitor 92 increases as shown in the state A. Furthermore, when the user instructs the camera 91 to face downward in the state B, the depression angle of the camera 91 increases, and the elevation angle of the touch panel monitor 92 decreases as shown in the state C.

Although not illustrated, by changing the shape of the movable housing 81b, the display surface of the touch panel monitor 92 may be provided so as to face in the horizontal direction when the camera 91 has a predetermined elevation angle.

Furthermore, the camera 91 performs close-up shooting and whole-body shooting, which will be described later. The close-up shooting is to shoot the face and the upper half of the body of the user. The whole-body shooting is to shoot the whole-body of the user. When the whole-body shooting is performed, the tilt angles of the camera 91 and the touch panel monitor 92 are adjusted in order to shoot the user from the upper front or from the front.

Figure 7:
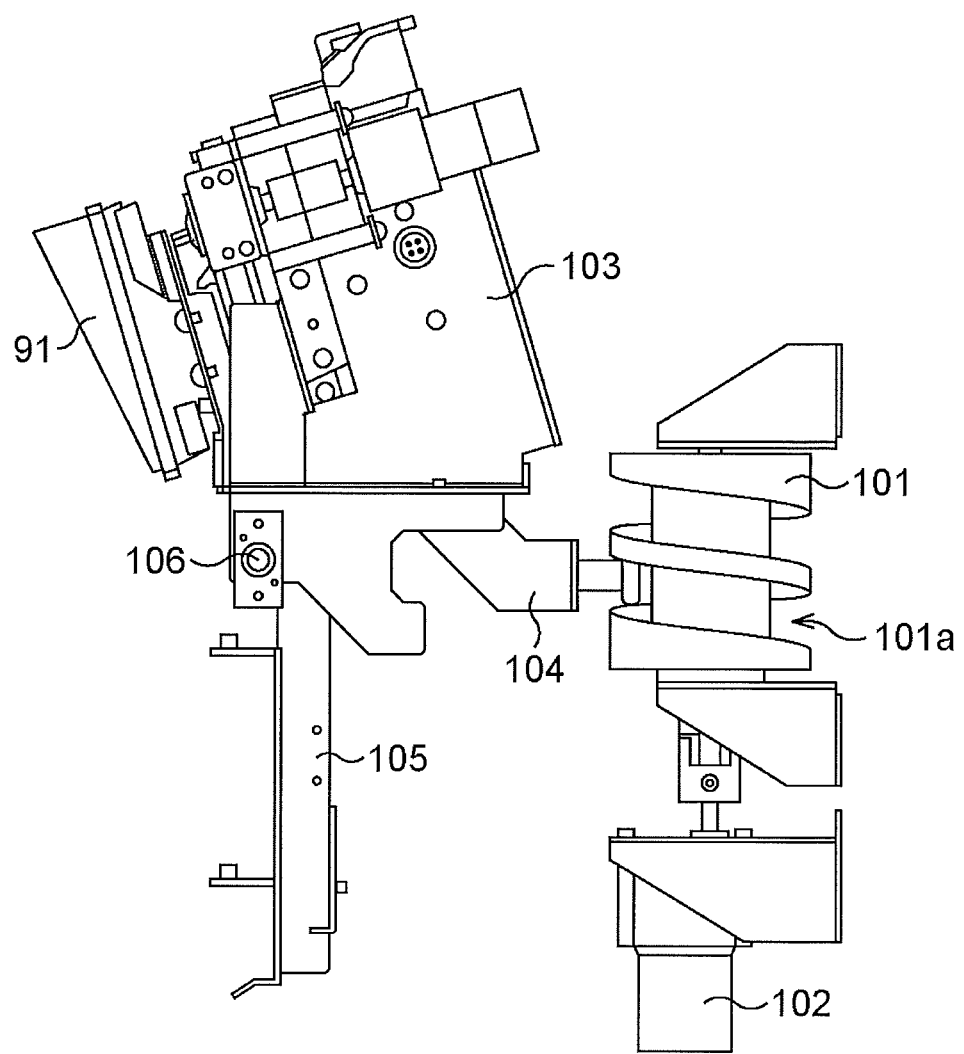
FIG. 7 is a diagram illustrating an internal configuration of the camera unit.

FIG. 7 illustrates an internal configuration of the camera unit 81 as viewed from the side of the camera unit 81.

A cylindrical cam 101 and a pulse motor 102 are provided inside the camera unit 81. The cylindrical cam 101 is rotatable about the axis in the vertical direction. The pulse motor 102 drives the cylindrical cam 101 according to the driving pulse number corresponding to the tilt angle, instructed by the user, of the camera 91. A spiral shaped groove 101a is formed on the circumferential surface of the cylindrical cam 101.

Furthermore, a follower member 104 is provided inside the camera unit 81. One end of the follower member 104 is jointed to a supporting member 103 supporting the camera 91. The other end of the follower member 104 moves, according to the rotation of the cylindrical cam 101, in the vertical direction along the groove 101a formed on the circumferential surface of the cylindrical cam 101. A roller abutting against the groove 101a is provided at one end, which is engaged to the follower member 104, of the groove 101a. The roller slides in the groove 101a while rotating according to the rotation of the cylindrical cam 101, and the other end of the follower member 104 thereby moves in the vertical direction. Moreover, a supporting member 105 supporting the touch panel monitor 92 is jointed to the supporting member 103.

With this configuration, the cylindrical cam 101 rotates and the other end of the follower member 104 moves in the vertical direction, the supporting members 103 and 105 are thereby tilted with a shaft 106 as a tilt shaft. As a result, the tilt angles of the camera 91 and the touch panel monitor 92 are adjusted.

By using the cylindrical cam 101 in this manner, it is possible to implement a configuration to tilt the camera 91 with less components than other configuration.

Returning to the description of FIG. 5, an upper strobe 82, a curved light-emitting surface of which faces the user, is installed above the camera unit 81. The upper strobe 82 irradiates the face and the upper half of the body of the user from above. Note that, the shape of the upper strobe 82 viewed from the front may be a perfect circle, elliptical, or polygonal. Furthermore, a lower strobe 83 which irradiates the lower half of the body and the foot of the user is provided in the center of the base portion 43 provided below the camera unit 81.

Figure 8:
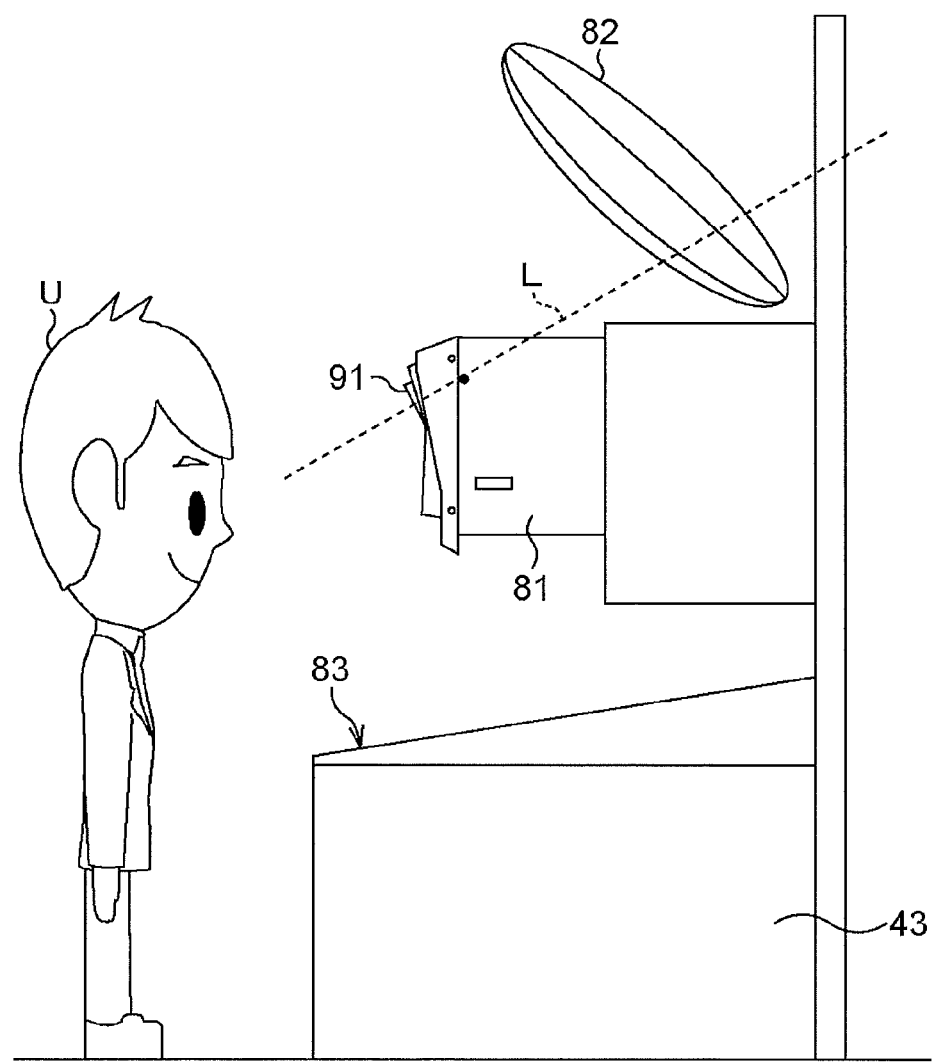
FIG. 8 is a diagram describing an arrangement of the camera unit and an upper strobe.

As illustrated in FIG. 8, the upper strobe 82 is provided at an upper rear of the camera unit 81 as viewed from a user U to irradiate the user U from the upper front. The upper strobe 82 is arranged on a substantial virtual extension line L of the lens optical axis of the camera 91. Note that, the upper surface of the camera unit 81 inclines to the front side as viewed from the user. Furthermore, as shown in FIG. 8, the base portion 43 (the lower strobe 83) is provided so as to be more protruded to the user U side than the camera unit 81. The base portion 43 thereby makes the user U stand at the closest position to the camera unit 81. That is, when the user desires to be shot close to the camera 91, the user cannot move from the user side surface of the base portion 43 toward the camera 91, and it is possible to prevent the user from being too close to the camera 91. Note that, the upper surface of the base portion 43 (the lower strobe 83) also inclines to the front side as viewed from the user. The user U is thereby irradiated, from a lower front, with light from the upper surface of the lower strobe 83.

A conventional photo sticker machine has shot a user as an object at a position close to a strobe such that the user brightly appears in an image. However, when the distance between the user and the strobe is too close, a "shine" may be generated on a part of the user's face.

In contrast, in the example of FIG. 8, it is possible to keep a constant distance between the upper strobe 82 and the user U. It is thereby possible to prevent a "shine" from being generated on a part of the user's face, and to provide an image having an excellent finish.

Note that, in order to keep a constant distance between the upper strobe 82 and the user U, the upper strobe 82 may move according to the standing position of the user U. In this case, the camera 91 (the camera unit 81) may move according to the upper strobe 82.

Returning to the description of FIG. 5 again, spaces 84A and 84B are formed at the right and left parts on the upper surface of the base portion 43. The spaces 84A and 84B are formed so as to interpose the upper surface of the lower strobe

83. The spaces 84A and 84B are used as baggage storage places where the user places hand baggage and the like. Note that, resin-made transparent pockets in various sizes may be provided on the front side of the base portion 43 (the user side) and both right and left sides of the lower strobe 83. Advertising matters and printed matters can be inserted into these pockets.

Although not illustrated, a speaker is provided, for example, in the vicinity of the ceiling of the front panel 42. The speaker outputs voice guidance of the shooting processing, BGM, sound effects, and the like.

Furthermore, oblique panels 85A and 85B are provided over the respective spaces 84A and 84B. The oblique panel 85A is provided so as to hide the corner between the front panel 42 and the side surface panel 41A, and the oblique panel 85B is provided so as to hide the corner between the front panel 42 and the side surface panel 41B.

Figure 9:
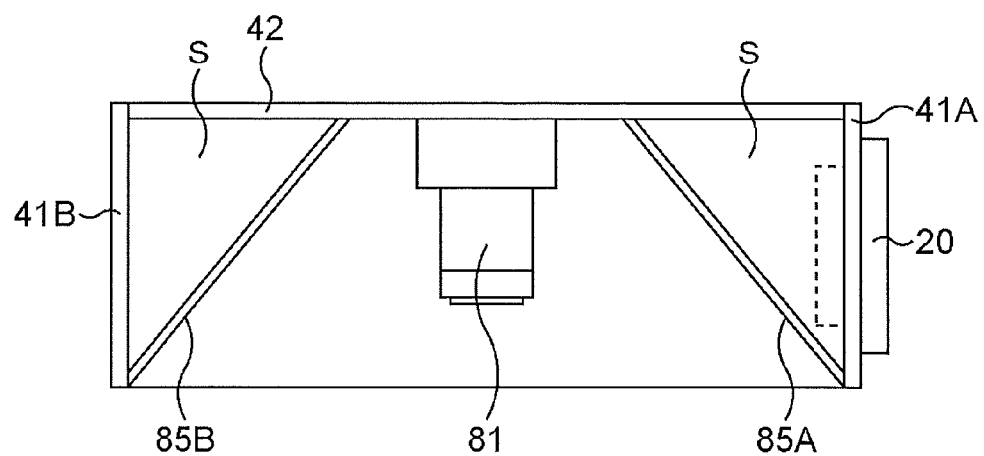
FIG. 9 is a top view illustrating a configuration example of a shooting portion.

By providing the oblique panels 85A and 85B, as illustrated in FIG. 9 (the top view of the shooting portion 21), a space S surrounded by the side surface panel 41A (41B), the front panel. 42, and the oblique panel 85A (85B) is formed. A part of the configuration of the pre-service portion 20 can be thereby protruded to the space S side, and it is possible to improve the flexibility of the configuration or the installation of the pre-service portion 20. Moreover, by providing the oblique panels 85A and 85B, when the camera unit 81 is arranged closer to the user, it is possible to avoid giving the user an impression that the camera unit 81 is being protruded to the user side.

<Configuration of Background Portion>

Figure 10:
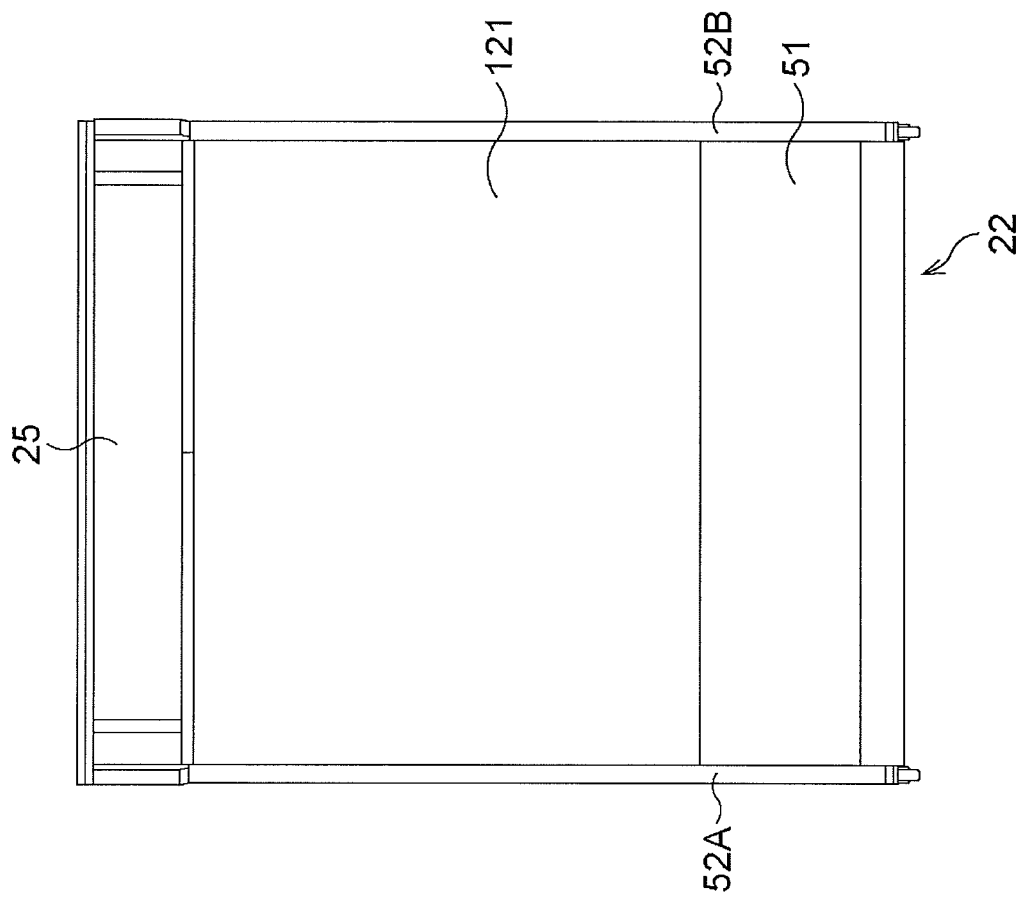
FIG. 10 is a diagram illustrating a configuration example of a background portion.

FIG. 10 is a diagram illustrating a configuration example of the shooting space A1 side of the background portion 22.

As described above, the background curtain unit 25 is provided at the upper part of the back surface panel 51.

Furthermore, a back surface curtain 121, which has a length from the upper end of the back surface panel 51 to a predetermined height, is affixed to a surface of the back surface panel 51 on the shooting space A1 side (the front side in the drawing). The color of the back surface curtain 121 is a white-based color which is similar to studios and the like where fashion magazine models and the like are shot. A shadow thereby more easily appears in the background of the object and stereoscopic effects can be emphasized in the shot image obtained by the shooting. The white-based color includes not only white but also colors close to white (specifically, gray close to white, bluish gray close to white, and the like). Note that, the back surface panel 51 can stand vertically by itself on the installation surface of the photo sticker creating device 1 by being formed of material, such as rigid resin or metal. Furthermore, the surface of the back surface panel 51 exposed from the back surface curtain 121 is painted with the same color as the back surface curtain 121.

When the back surface curtain 121 is affixed to the entire back surface panel 51, the back surface curtain 121, particularly close to the floor surface, may become dirty with the user's shoes due to the user's posture.

Thus, the back surface curtain 121 is affixed from the upper end of the back surface panel 51 to, for example, the height of around a user's knee, and the back surface panel 51 below the curtain is exposed. It is thereby possible for the back surface curtain 121 to prevent from becoming dirty. Note that, when the exposed part of the back surface panel 51 becomes dirty with the user's shoes, the dirt is made to be easily wiped off with a cloth and the like. Therefore, it is preferable that the surface of the back surface panel 51 is painted with a chemical resistance coating material and the like. Note that, the front and back of the back surface panel 51 may be easily inverted.

When dirt is strongly adhered to the surface of the back surface panel 51, by inverting the front and back of the back surface panel 51, it is possible to hide the dirt from the user.

Although not illustrated, the side surface curtains, which has a length from the upper end of the side surface panels 52A and 52B to a predetermined height similar to the back surface curtain 121 are affixed to the respective side surface panels 52A and 52B on the shooting space A1 side. The color of the side surface curtain is the same as that of the back surface curtain 121.

<Configuration of Editing Unit>

Figure 11:
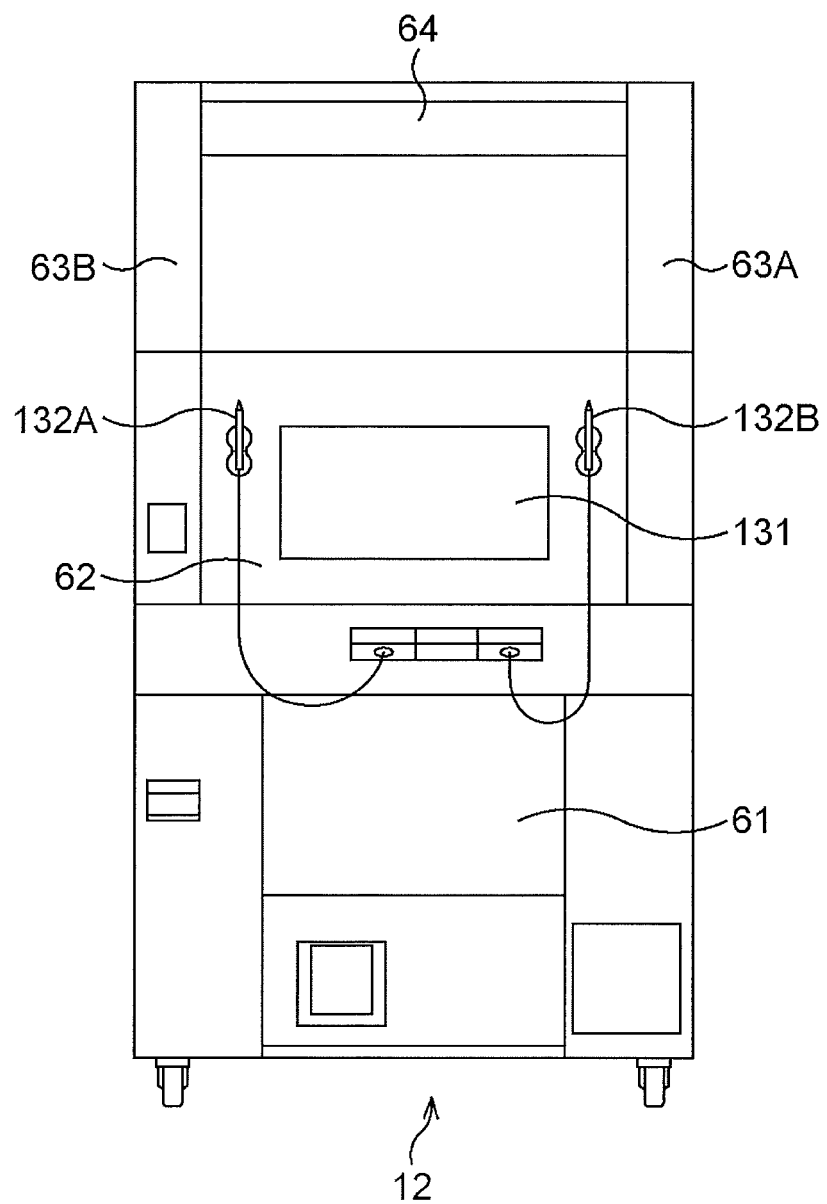
FIG. 11 is a diagram illustrating a configuration example of a front of an editing unit.

FIG. 11 is a diagram illustrating a configuration example of the front surface side (the editing space A2-1 side) of the editing unit 12.

In substantially the center of the slope surface 62, a tablet built-in monitor 131 is provided. At the left side of the tablet built-in monitor 131, a stylus pen 132A is provided. At the right side of the tablet built-in monitor 131, a stylus pen 132B is provided.

The tablet built-in monitor 131 is configured by providing a tablet which exposes a display. The tablet enables to perform an operation input using the stylus pen 132A or the stylus pen 132B. On the tablet built-in monitor 131, for example, an editing screen used for the editing work is displayed. When the editing work is simultaneously performed by two users, the stylus pen 132A is used by the user who stands on the left side facing the tablet built-in monitor 131, and the stylus pen 132B is used by the user who stands on the right side facing the tablet built-in monitor 131.

Figure 12:
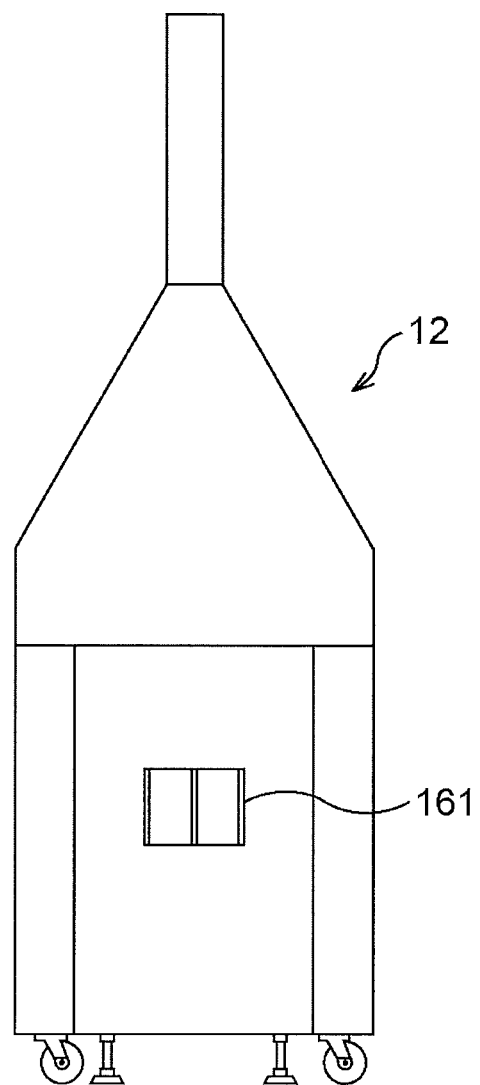
FIG. 12 is a diagram illustrating a configuration example of a side of the editing unit.

FIG. 12 is a diagram illustrating configuration examples of the right side surface of the editing unit 12.

On the lower part of the right side surface of the editing unit 12, a sticker sheet outlet 161 is provided. In the interior of the editing unit 12, a printer is provided. With the printer, an image in which the user in the editing space A2-1 appears, or an image in which the user in the editing space A2-2 appears are printed on the sticker sheet with a predetermined layout and the sticker sheet is discharged through the sticker sheet outlet 161.

<Internal Configuration of Photo Sticker Creating Device>

Figure 13:
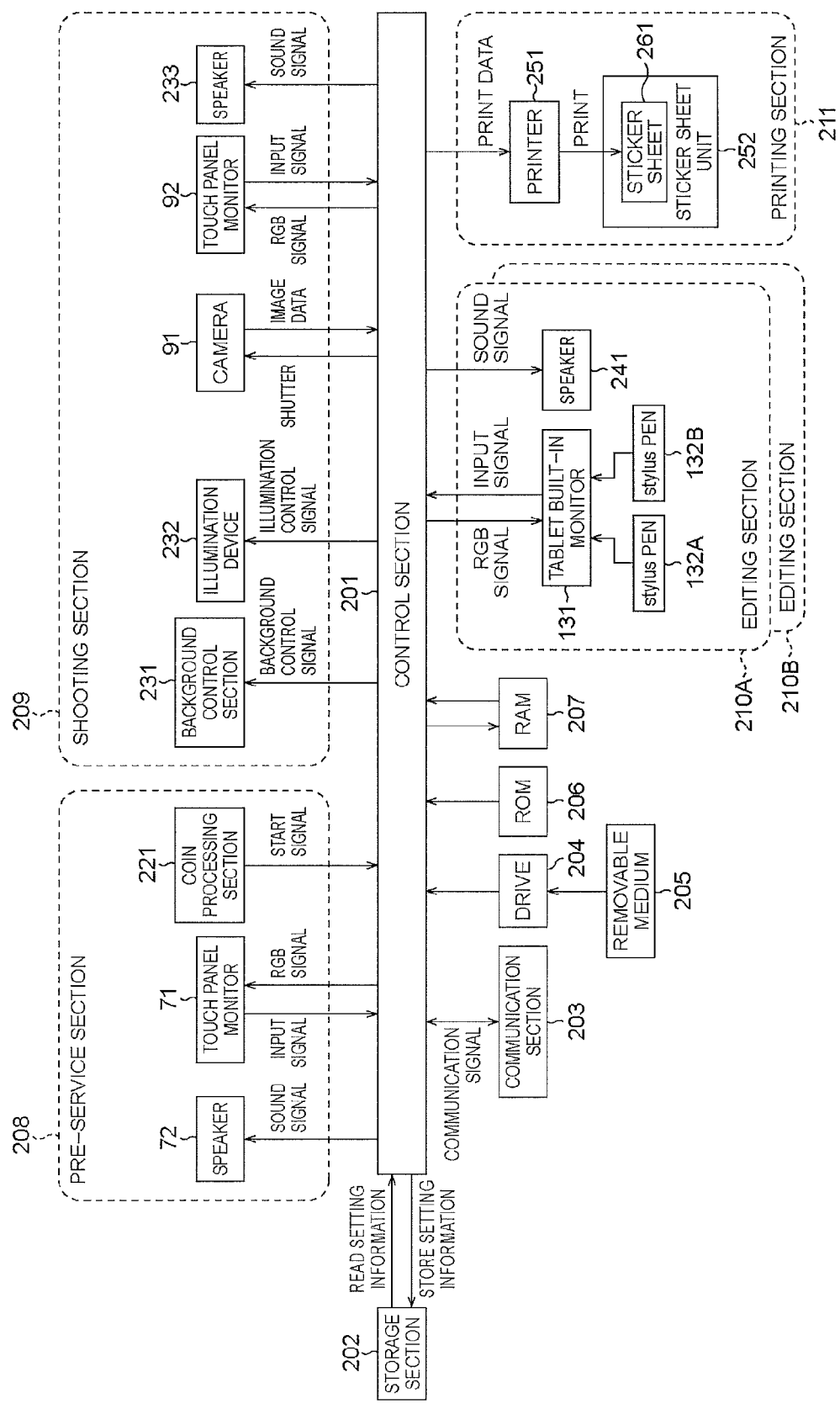
FIG. 13 is a block diagram illustrating an internal configuration example of the photo sticker creating device.

FIG. 13 is a block diagram illustrating an internal configuration example of the photo sticker creating device 1. In FIG. 13, the same reference signs are assigned to the same configurations as the above described configurations. Overlapping description is appropriately omitted.

A control section 201 is implemented by a central processing unit (CPU) and the like. The control section 201 executes a program stored in read only memory (ROM) 206 or a storage section 202 and controls the entire operations of the photo sticker creating device 1. To the control section 201, the storage section 202, a communication section 203, a drive 204, the ROM 206, and random access memory (RAM) 207 are connected. Furthermore, to the control section 201, a pre-service section 208, a shooting section 209, editing sections 210A and 210B, and a printing section 211 are connected.

The storage section 202 is a non-volatile storage medium, such as a hard disk or flash memory. The storage section 202 stores various types of setting information supplied from the control section 201, and the like. The information stored in the storage section 202 is appropriately read by the control section 201.

The communication section 203 is an interface of a network, such as the Internet. The communication section 203 communicates with an external device according to the control of the control section 201. The communication section 203 transmits to the server, for example, the shot image and the edited image which are selected by the user. The image transmitted from the communication section 203 is stored in a predetermined allocated storage area in the server, and is displayed or downloaded on a mobile terminal accessing the server.

To the drive 204, a removable medium 205 implemented by an optical disk or a semiconductor memory is appropriately attached. A program and data read from the removable medium 205 by the drive 204 is supplied to the control section 201, and are stored in the storage section 202 or installed.

The ROM 206 stores a program executed by the control section 201 and data. The RAM 207 temporarily stores a program and data which are processed by the control section 201.

The pre-service section 208 performs pre-service processing to the user in the pre-service space A0. The pre-service section 208 is configured with the touch panel monitor 71, the speaker 72, and a coin processing section 221.

The touch panel monitor 71 displays various selection screens according to the control of the control section 201 and receives an operation of the user to the selection screen. The input signal indicating the operation of the user is supplied to the control section 201 and various settings are performed.

The coin processing section 221 detects insertion of a coin to the coin insertion/return slot 73. When having detected the insertion of coins of a predetermined amount of money, the coin processing section 221 outputs, to the control section 201, a start signal which instructs to start a game.

The shooting section 209 performs the shooting processing to the user in the shooting space A1. The shooting section 209 is configured with a background control section 231, an illumination device 232, the camera 91, the touch panel monitor 92, and a speaker 233.

The background control section 231 controls to raise and lower the background curtain by the background curtain unit 25 according to a background control signal supplied from the control section 201.

The illumination device 232 includes strobes in the shooting space A1, and emits light according to an illumination control signal supplied from the control section 201. In the shooting space A1, the upper strobe 82 and the lower strobe 83 of the shooting portion 21 are provided, in addition to the strobe of the ceiling strobe unit 24 as the illumination device 232.

The camera 91 performs the shooting according to the shutter control of the control section 201, and outputs, to the control section 201, the shot image (image data) obtained by the shooting.

The editing section 210A performs the editing processing intended for the user in the editing space A2-1. The editing section 210A is configured with the tablet built-in monitor 131, the stylus pens 132A and 132B, and a speaker 241. The editing section 210B performs the editing processing intended for the user in the editing space A2-2 and has the same configuration as the editing section 210A. Hereinafter, the editing sections 210A and 210B are simply referred to as the editing section 210, unless particularly distinguished.

The tablet built-in monitor 131 displays an editing screen according to the control of the control section 201, and receives an operation of the user to the editing screen. A signal indicating content of the operation of the user is supplied to the control section 201, and the editing target shot image is edited.

The printing section 211 performs printing processing of providing the user in the print-waiting space A3 with a printed sticker sheet. The printing section 211 is configured by including a printer 251. A sticker sheet unit 252 is attached to the printer 251.

The printer 251 prints, based on print data supplied from the control section 201, the edited image on a sticker sheet 261 stored in the sticker sheet unit 252 and discharges the printed sheet through the sticker sheet outlet 161.

<Configuration of Control Section>

Figure 14:
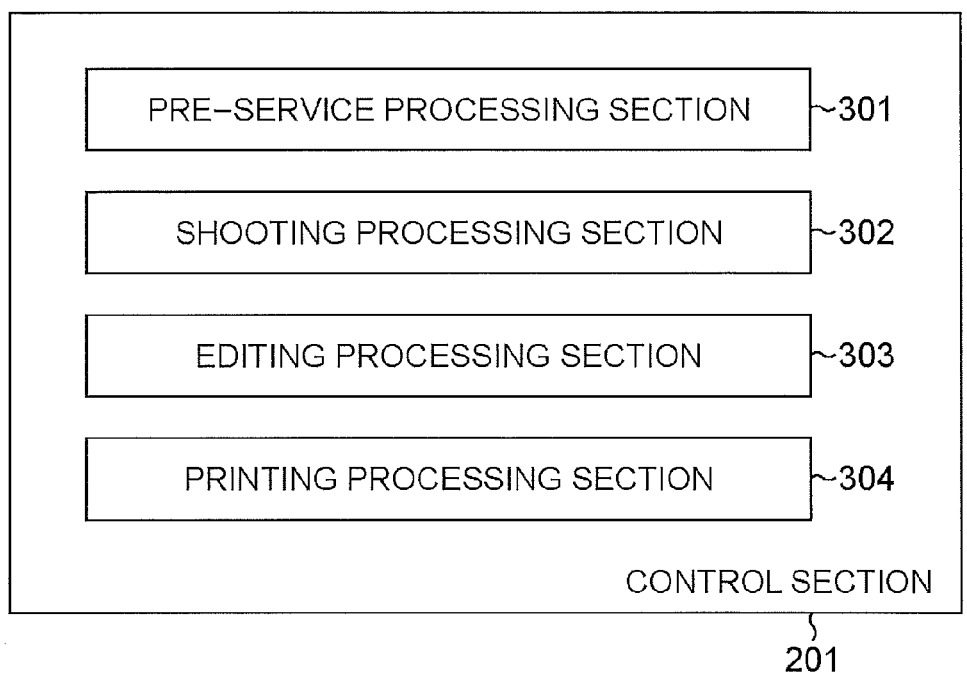
FIG. 14 is a block diagram illustrating a functional configuration example of a control section.

FIG. 14 is a block diagram illustrating a functional configuration example of the control section 201. At least one of functional sections illustrated in FIG. 14 is realized by executing a predetermined program by the CPU in the control section 201. The photo sticker creating device 1 thereby functions as an image providing device.

The control section 201 is configured with a pre-service processing section 301, a shooting processing section 302, an editing processing section 303, and a printing processing section 304.

The pre-service processing section 301 performs pre-service processing by controlling sections of the pre-service section 208. The shooting processing section 302 performs the shooting processing by controlling sections of the shooting section 209. The editing processing section 303 performs the editing processing by controlling sections of the editing section 210. The printing processing section 304 performs printing processing by controlling the printer 251 of the printing section 211.

<Configuration Example of Pre-Service Processing Section>

Figure 15:
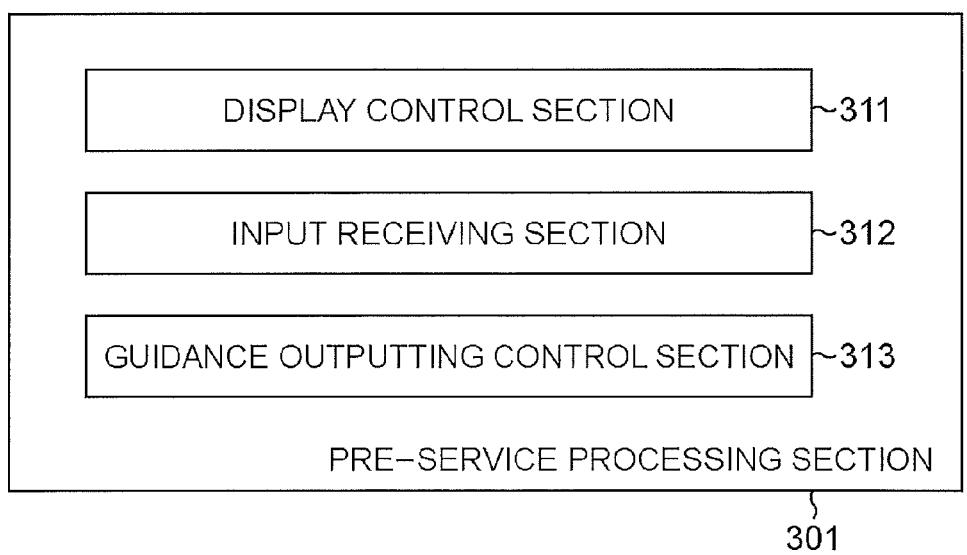
FIG. 15 is a block diagram illustrating a functional configuration example of a pre-service processing section.

FIG. 15 is a block diagram illustrating a functional configuration example of the pre-service processing section 301.

The pre-service processing section 301 is configured with a display control section 311, an input receiving section 312, and a guidance outputting control section 313.

The display control section 311 controls display of the touch panel monitor 71. For example, the display control section 311 displays, on the touch panel monitor 71, a selection screen for a course selection of the shooting processing performed in the shooting space and for a background selection of the shot image.

The input receiving section 312 receives an operation of the user to the touch panel monitor 71. More specifically, the input receiving section 312 receives the selection operation input to a selection screen displayed on the touch panel monitor 71.

The guidance outputting control section 313 controls an output of guidance for explaining various selection operations. The guidance outputting control section 313 displays a screen for explaining various selection operations on the touch panel monitor 71 and outputs sound for explaining various selection operations from the speaker 72.

<Configuration Example of Shooting Processing Section>

Figure 16:
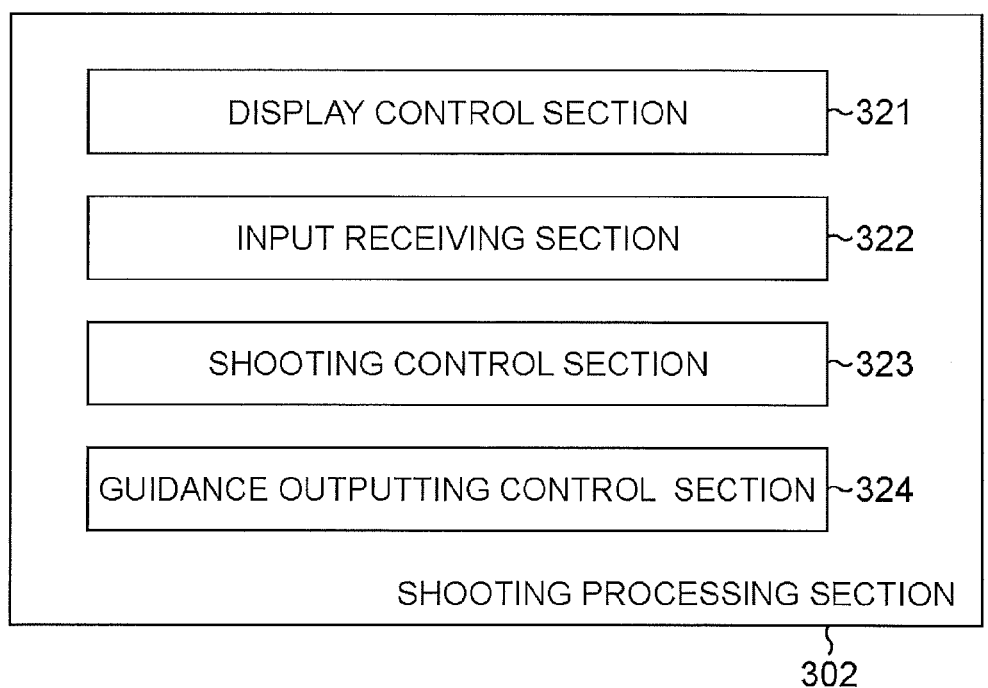
FIG. 16 is a block diagram illustrating a functional configuration example of a shooting processing section.

FIG. 16 is a block diagram illustrating a functional configuration example of the shooting processing section 302.

The shooting processing section 302 is configured with a display control section 321, an input receiving section 322, a shooting control section 323, a guidance outputting control section 324, and an image processing section 325.

The display control section 321 controls display of the touch panel monitor 92. For example, the display control section 321 displays, on the touch panel monitor 92, the moving image captured by the camera 91 as the live view and the shot image as a shooting result.

The input receiving section 322 receives an operation of the user to the touch panel monitor 92.

The shooting control section 323 controls the camera 91, shoots the user as an object, and obtains the shot image.

The guidance outputting control section 324 controls an output of guidance for explaining how to proceed with the shooting work and the like. The guidance outputting control section 324 displays a screen for explaining how to proceed with the shooting work on the touch panel monitor 92 and outputs sound for explaining how to proceed with the shooting work from the speaker 233.

The image processing section 325 performs predetermined image processing to the moving image and the shot image captured by the camera 91.

<Configuration Example of Editing Processing Section>

Figure 17:
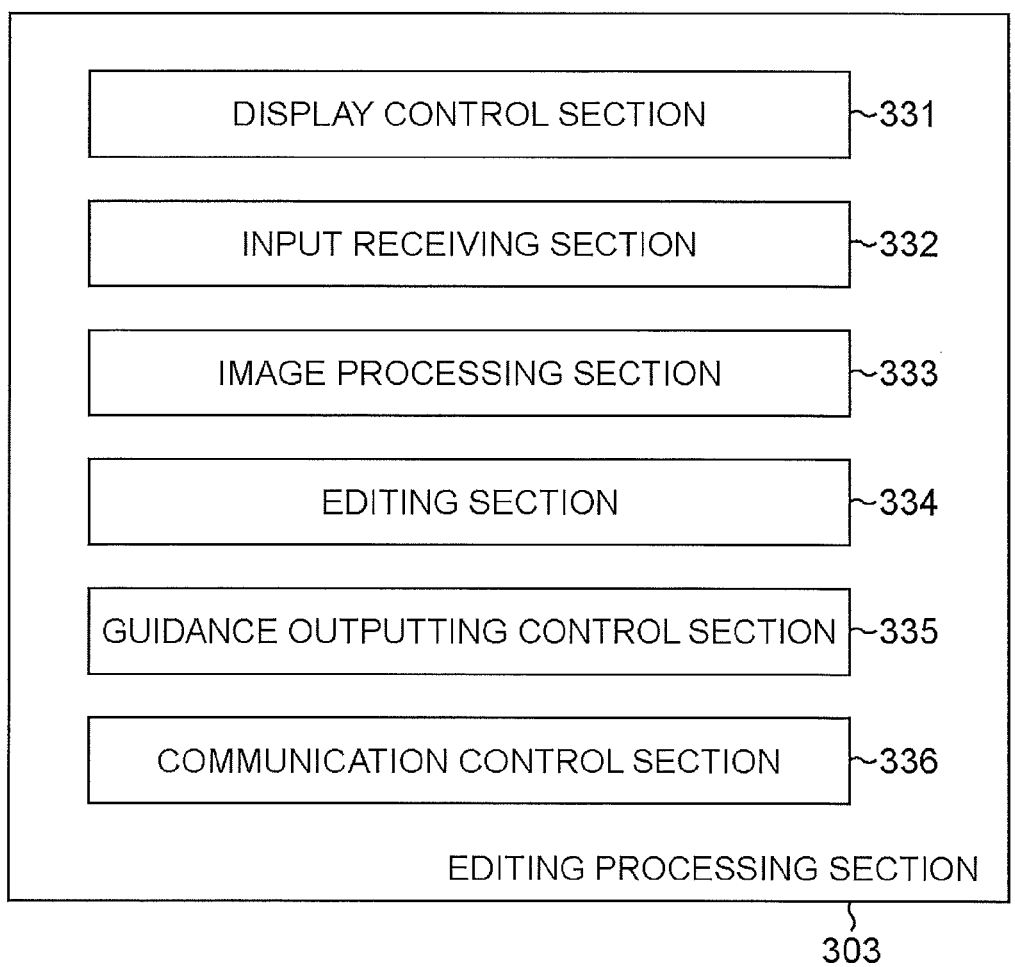
FIG. 17 is a block diagram illustrating a functional configuration example of an editing processing section.

FIG. 17 is a block diagram illustrating a functional configuration example of the editing processing section 303.

The editing processing section 303 is configured with a display control section 331, an input receiving section 332, an image processing section 333, an editing section 334, a guidance outputting control section 335, and a communication control section 336.

The display control section 331 controls display of the tablet built-in monitor 131. For example, the display control section 331 displays, on the tablet built-in monitor 131, a selection screen to select contents of image processing to be performed to the shot image and an editing screen to edit the shot image.

The input receiving section 332 receives an operation of a user to the tablet built-in monitor 131 with the stylus pens 132A and 132B. For example, the input receiving section 312 receives a content selection of image processing to a selection screen and an input to an editing screen.

The image processing section 333 performs predetermined image processing to the shot image according to a selection operation to a selection screen.

The editing section 334 edits the shot image according to an input operation to an editing screen.

The guidance outputting control section 335 controls an output of guidance for explaining how to proceed with the editing work. The guidance outputting control section 335 displays, on the tablet built-in monitor 131, a screen for explaining how to proceed with the editing work and outputs sound for explaining how to proceed with the editing work to the speaker 241.

The communication control section 336 controls the communication section 203 and performs communication processing through a network such as the Internet. For example, the communication control section 336 transmits the shot image obtained in the shooting processing and the edited image obtained in the editing processing to an external server by controlling the communication section 203.

<Operations of Photo Sticker Creating Device>

Figure 18:
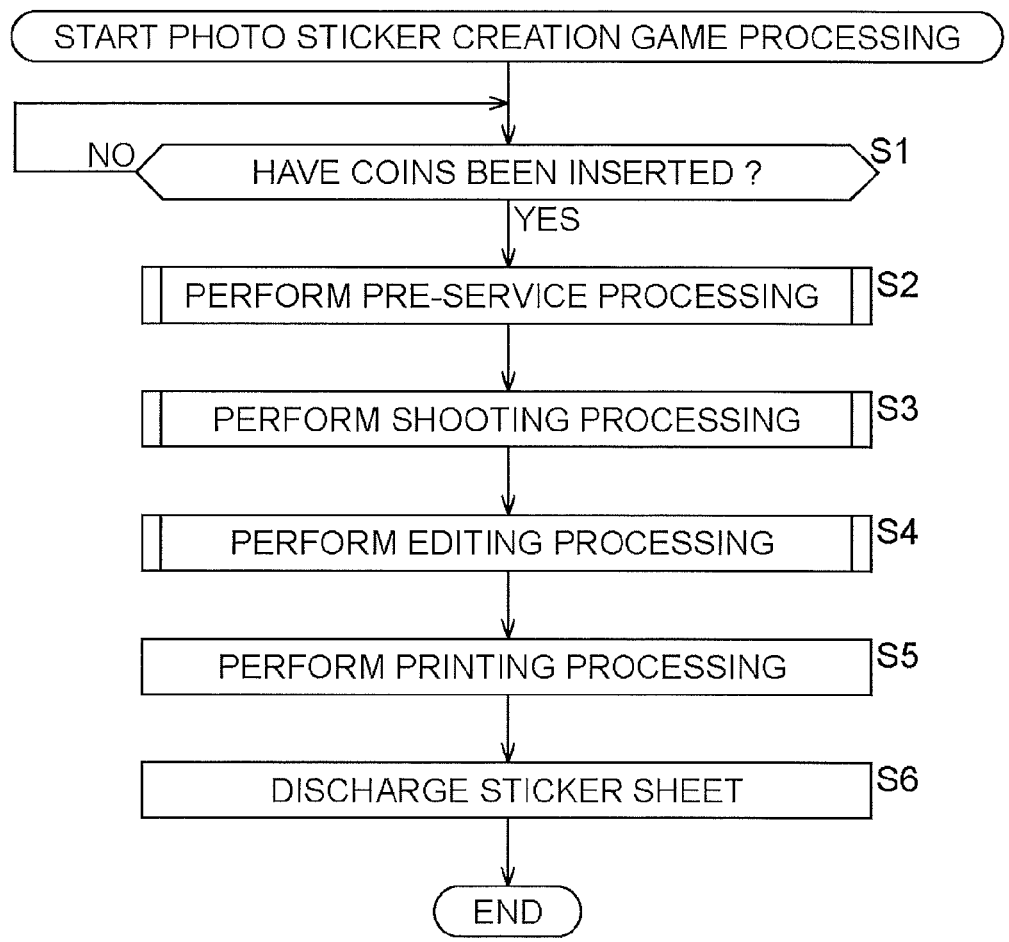
FIG. 18 is a flowchart describing photo sticker creation game processing.

Here, operations of the photo sticker creating device 1 which provides a photo sticker creation game will be described with reference to the flowchart of FIG. 18.

In step S1, the pre-service processing section 301 determines whether coins of a predetermined amount of money have been inserted based on the start signal supplied from the coin processing section 221 and waits until determining that the coins have been inserted.

When having determined that the coins have been inserted in step S1, the processing proceeds to step 32. In step S2, the pre-service processing section 301 performs pre-service processing by controlling the pre-service section 208. More specifically, the pre-service processing section 301 performs various settings by allowing the user to select a course of the shooting processing performed in the shooting space and a background of the shot image.

In step S3, the shooting processing section 302 performs the shooting processing by controlling the shooting section 209. More specifically, the shooting processing section 302 displays the moving image of the object captured by the camera 91 on the touch panel monitor 92 as the live view, shoots the user in the shooting space A1 as the object, and obtains the shot image.

In step S4, the editing processing section 303 performs the editing processing by controlling the editing section 210 corresponding to the editing space as the destination of the user in the editing space A2-1 or the editing space A2-2 who has completed the shooting processing. More specifically, the editing processing section 303 generates the edited image which has been edited by allowing the user to perform the editing work to the shot image obtained by the shooting processing.

In step S5, the printing processing section 304 performs (starts) printing processing by controlling the printer 251. More specifically, the printing processing section 304 outputs the edited image obtained by the editing processing to the printer 251 and prints the edited image on the sticker sheet. Note that, the shot image obtained by the shooting processing may be printed on the sticker sheet.

When the printing has been completed, in step S6, the printer 251 discharges the sticker sheet through the sticker sheet outlet 161 and the processing is terminated.

<Details of Pre-Service Processing>

Figure 19:
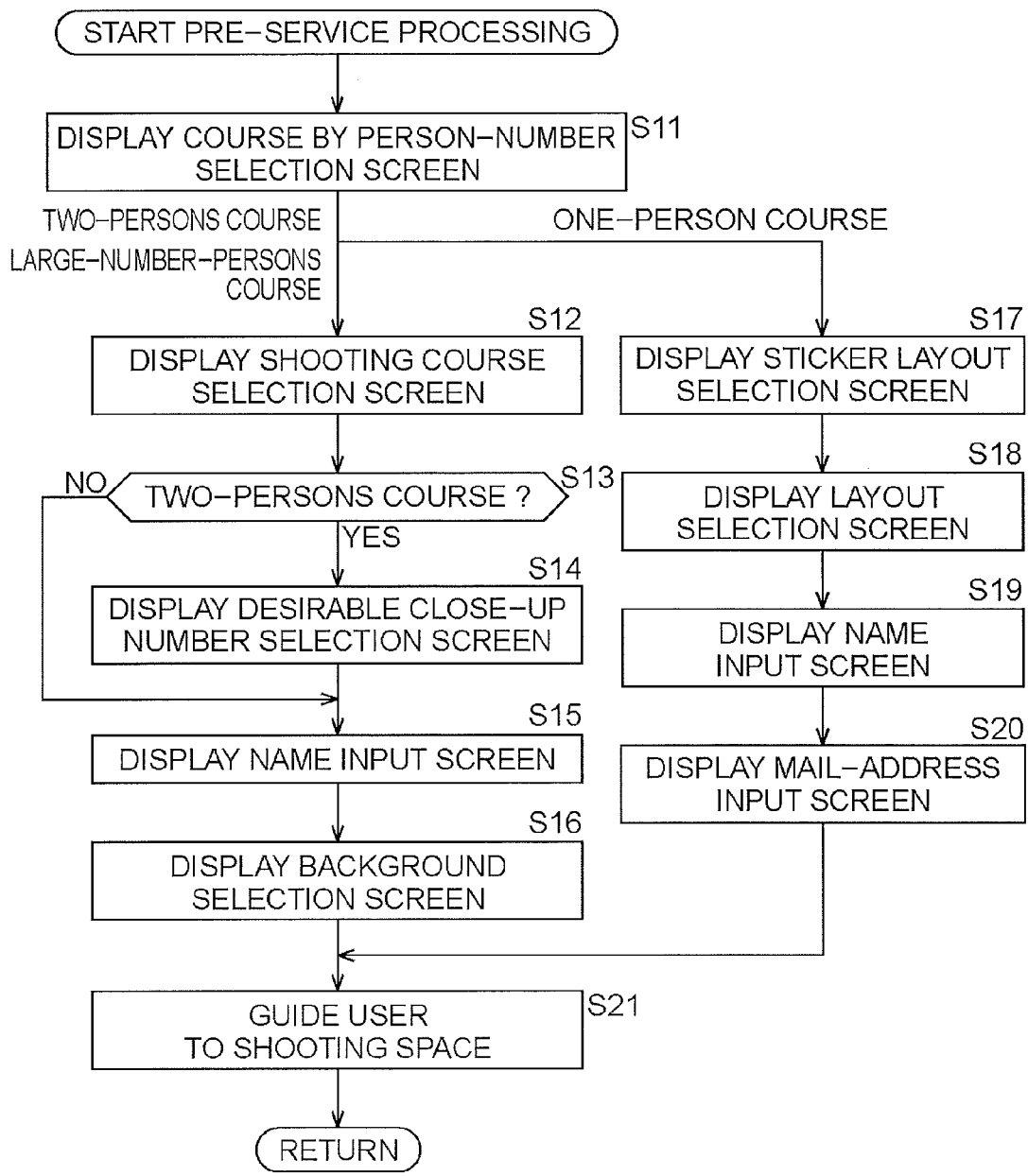
FIG. 19 is a flowchart describing pre-service processing.

Next, details of the pre-service processing in step S2 in the above described series of processing of the photo sticker creation game will be described with reference to the flowchart of FIG. 19.

When the pre-service processing is started, in step S11, the display control section 311 displays a course by person-number selection screen on the touch panel monitor 71.

Figure 20:
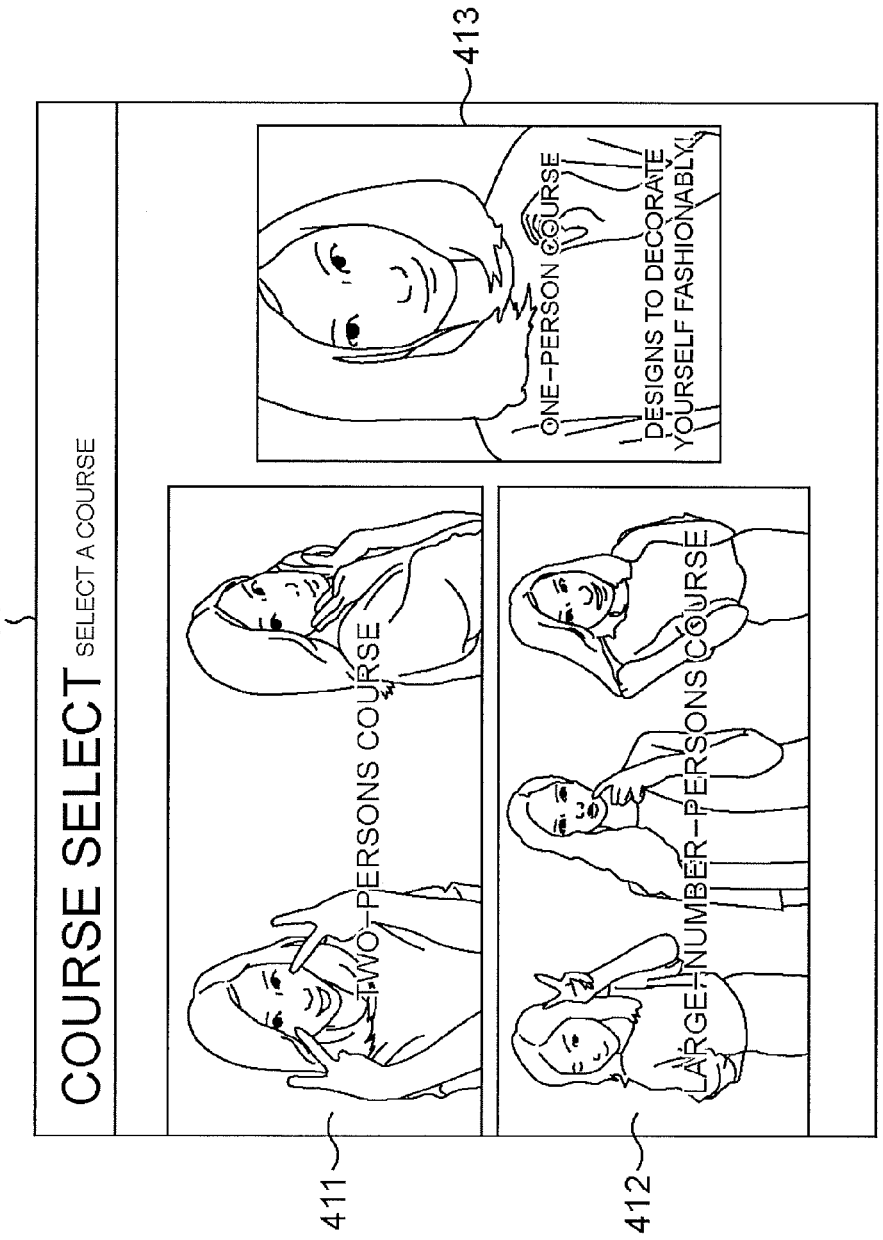
FIG. 20 is a diagram illustrating an example of a course by person-number selection screen.

FIG. 20 is a diagram illustrating an example of the course by person-number selection screen.

On the upper part of the course by person-number selection screen, a message "Select a course" is displayed and buttons 411 to 413 are displayed thereunder. The button 411 is operated when a two-persons course is selected as a person-number course. The button 412 is operated when a large-number-persons course is selected. The button 413 is operated when a one-person course is selected.

By operating any one of the buttons 411 to 413, the input receiving section 312 receives the selection of the person-number course. When the two-persons course is selected, a game for two users is provided. When the large-number-persons is selected, a game for three or more users is provided. When the one-person course is selected, a game for a single user is provided.

When the selection of the two-persons course or the large-number-persons course is received by operating the button 411 or the button 412 on the course by person-number selection screen, the process proceeds to step S12. In step S12, the display control section 311 displays a shooting course selection screen on the touch panel monitor 71.

Figure 21:
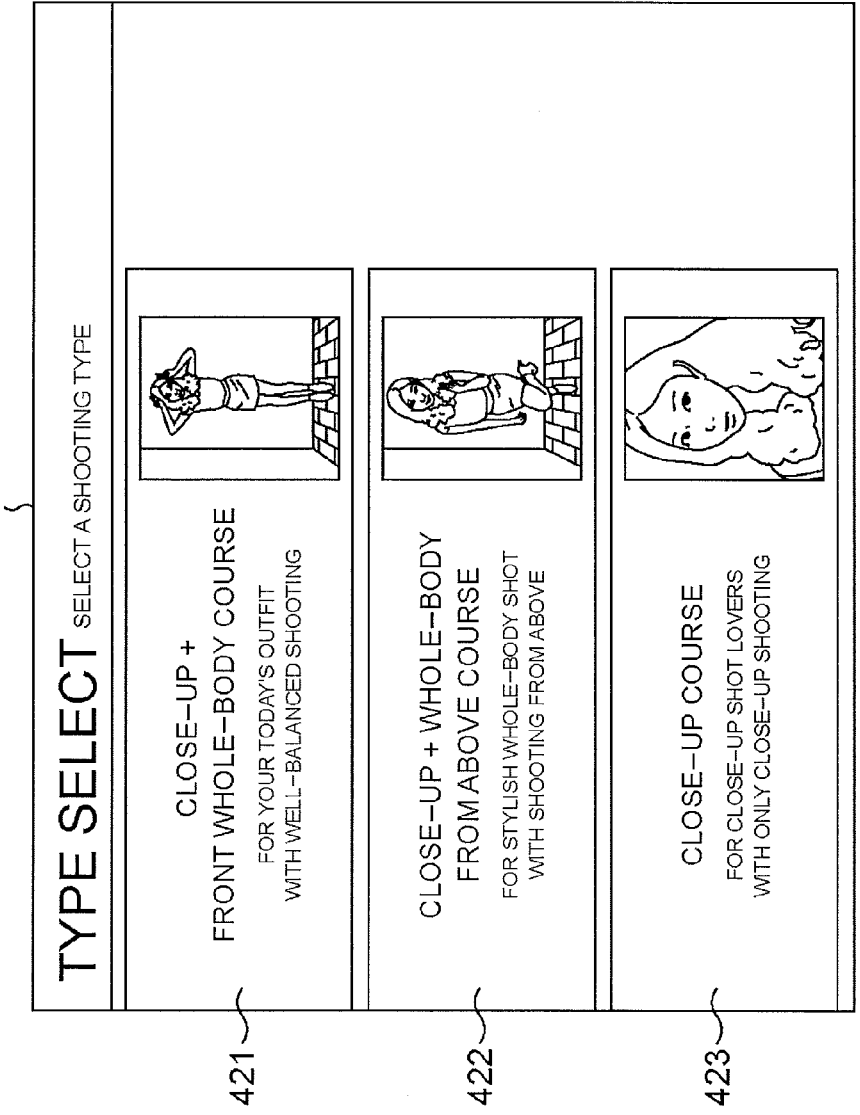
FIG. 21 is a diagram illustrating an example of a shooting course selection screen.

FIG. 21 is a diagram illustrating an example of the shooting course selection screen.

On the upper part of the shooting course selection screen, a message "Select a shooting type" is displayed, and buttons 421 to 423 are displayed thereunder. The button 421 is operated when a "close-up+front whole-body course" is selected as a shooting course. In the close-up+front whole-body course, the close-up shooting and the front whole-body shooting are performed among a plurality of shootings. The button 422 is operated when a "close-up+whole-body from above course" is selected. In the close-up+whole-body from above course, the close-up shooting and the whole-body from above shooting are performed. The button 423 is operated when a "close-up course" is selected. In the close-up shooting, only the close-up shooting is performed.

The close-up shooting is to mainly shoot the face and the upper half of the body of the user as the object. Furthermore, the whole-body shooting is to shoot the whole-body of the user. Moreover, the whole-body shooting includes the front whole-body shooting and the whole-body from above shooting. The front whole-body shooting is to shoot the whole-body of the user from the front. The whole-body from above shooting is to shoot the whole-body of the user from the upper front. With the front whole-body shooting, since the shooting is performed in the state of the lens optical axis of the camera 91 being close to horizontal, the face of the user appears smaller than with the close-up shooting. On the other hand, with the whole-body from above shooting, the face of the user appears larger than with the close-up shooting.

By operating any one of the buttons 421 to 423, the input receiving section 312 receives the selection of the shooting course. Note that, in addition to the above three courses, a course in which all shooting of the close-up shooting, the front whole-body shooting, and the whole-body from above shooting are performed may be provided as a shooting course.

When the selection of any one of the shooting course is received, the processing proceeds to step S13. In step S13, the shooting processing section 302 determines whether the course by person-number is the two-persons course or not.

In step S13, when it is determined that the course by person-number is the two-persons course, the processing proceeds to step S14. In step S14, the display control section 311 displays a desirable close-up number selection screen on the touch panel monitor 71.

Figure 22:
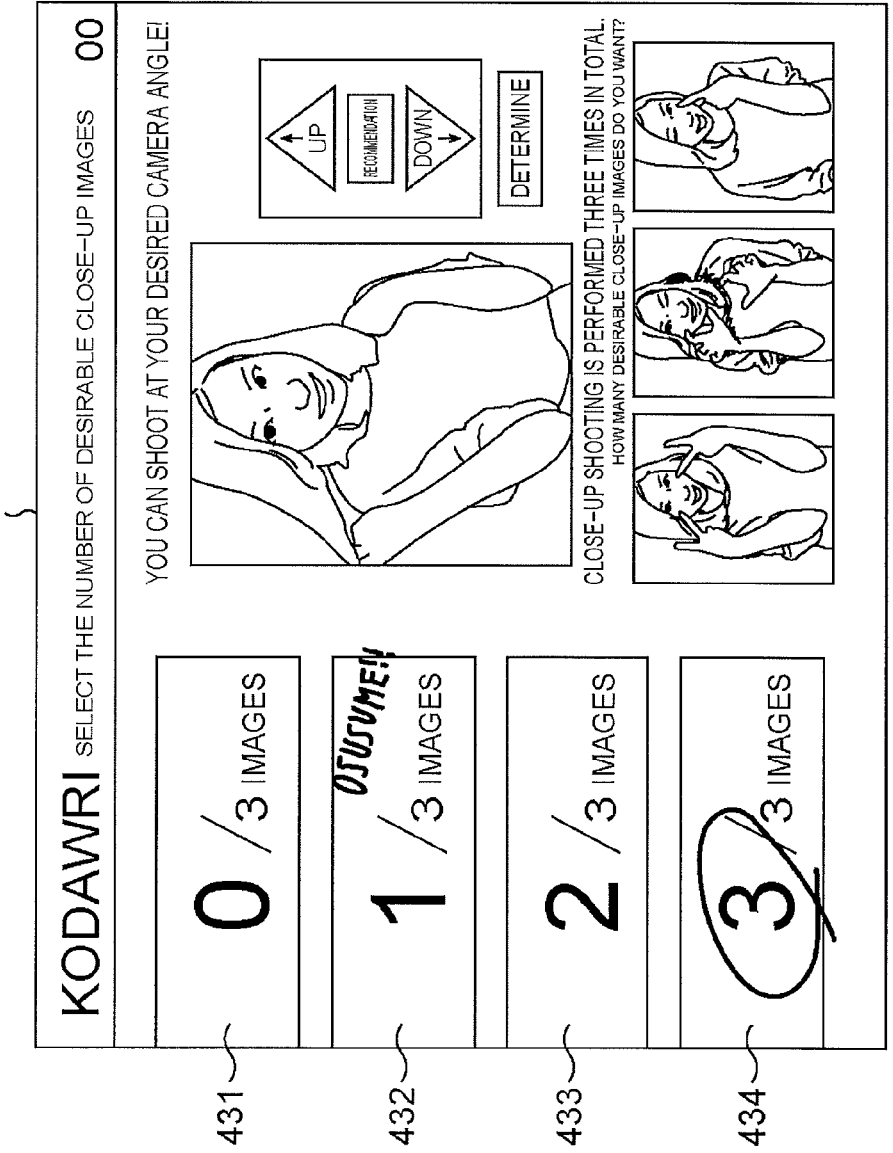
FIG. 22 is a diagram illustrating an example of a desirable close-up number selection screen.

FIG. 22 is a diagram illustrating an example of the desirable close-up number selection screen.

On the upper part of the desirable close-up number selection screen, a message "Select the number of desirable close-up images" is displayed, and buttons 431 to 434 are displayed at the lower left thereof. The button 431 is operated when zero is selected as the number of the shot images obtained by desirable close-up shooting. The button 432 is operated when one-image is selected as the number of the shot images obtained by the desirable close-up shooting. The button 433 is operated when two is selected as the number of the shot images obtained by the desirable close-up shooting. The button 434 is operated when three is selected as the number of the shot images obtained by the desirable close-up shooting.

The desirable close-up shooting is the close-up shooting to be performed at the tilt angle, selected by the user, of the camera 91. On the right side of the desirable close-up number selection screen, a message "You can shoot at your desired camera angle!" and a moving image for explaining how to perform the desirable close-up shooting are displayed. Furthermore, under the moving image, a message and an image for explaining that the close-up shooting will be performed three times when any shooting course is selected.

That is, on the desirable close-up number selection screen, the number of the desirable close-up shooting among the three close-up shootings is selected.

On the other hand, in step S13, when it is determined that the course by person-number is not the two-persons course, that is, when the course by person-number is the large-number-persons course, step S14 is skipped, and the processing proceeds to step S15. Note that, when the large-number-persons course is selected, the desirable close-up shooting will be performed once.

In step S15, the display control section 311 displays a name input screen on the touch panel monitor 71.

The name input screen is used to input a name by the user. By operating the name input screen, the input receiving section 312 receives the input of the respective names of the users.

In step S16, the display control section 311 displays a background selection screen on the touch panel monitor 71.

Figure 23:
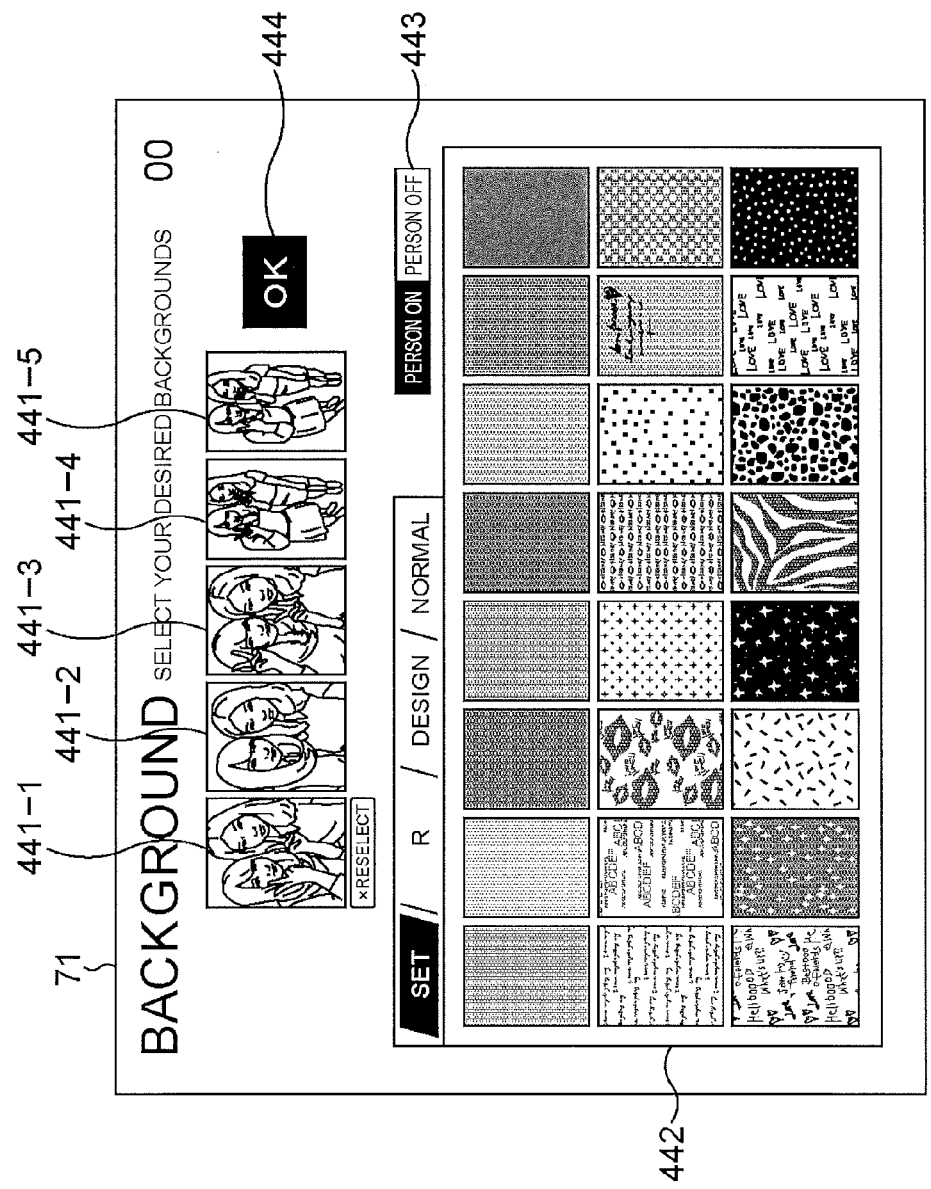
FIG. 23 is a diagram illustrating an example of a background selection screen.

FIG. 23 is a diagram illustrating an example of the background selection screen.

On the upper part of the background selection screen, a message "Select your desired backgrounds" is displayed and model images 441-1 to 441-5 are displayed thereunder. The model images 441-1 to 441-5 are obtained by shooting two models as the objects. Among the model images 441-1 to 441-5, the three model images 441-1 to 441-3 are close-up images in which the faces and the upper half of the bodies of the objects appear and the two model images 441-4 and 441-5 are whole-body images in which the whole bodies of the objects appear.

Under the model images 441-1 to 441-5, a plurality of background images 442 to be composited on the background of the shot image are displayed. In the examples of FIG. 23, 21 background images arranged in three rows and seven columns are displayed. On the background selection screen, by selecting a tab for each theme, such as "SET", "R", "DESIGN", and "NORMAL", the background images in the colors and patterns according to the selected theme are displayed.

On the background selection screen, by the operation of the user, when any one of the background images 442 is selected while any one of the model images 441-1 to 441-5 is being selected, the selected background image is composited on the background of the selected model image.

Note that, by selecting a person ON/OFF button 443, displaying/non-displaying of the object in the model image 441-1 to 441-5 is selected.

As described above, the input receiving section 312 receives the selection of the background images to be composited on the respective five shot images, obtained in the shooting processing, corresponding to the model images 441-1 to 441-5.

Note that, by operating a cancel button displayed under the model image 441-1, the user can cancel the selected background image while the corresponding model image (shot image) is being selected.

Then, when an OK button 445 is pushed while the five background images are being selected, or when a predetermined time has passed after the background selection screen is displayed, the processing proceeds to step S21. When a background image is not selected for a model image until the predetermined time has passed, it is assumed that a predetermined background image is selected for the model image.

Here, when the selection of the one-person course is received by operating the button 413 on the course by person-number selection screen, the processing proceeds to step S17. In step S17, the display control section 311 displays a sticker layout selection screen on the touch panel monitor 71.

Figure 24:
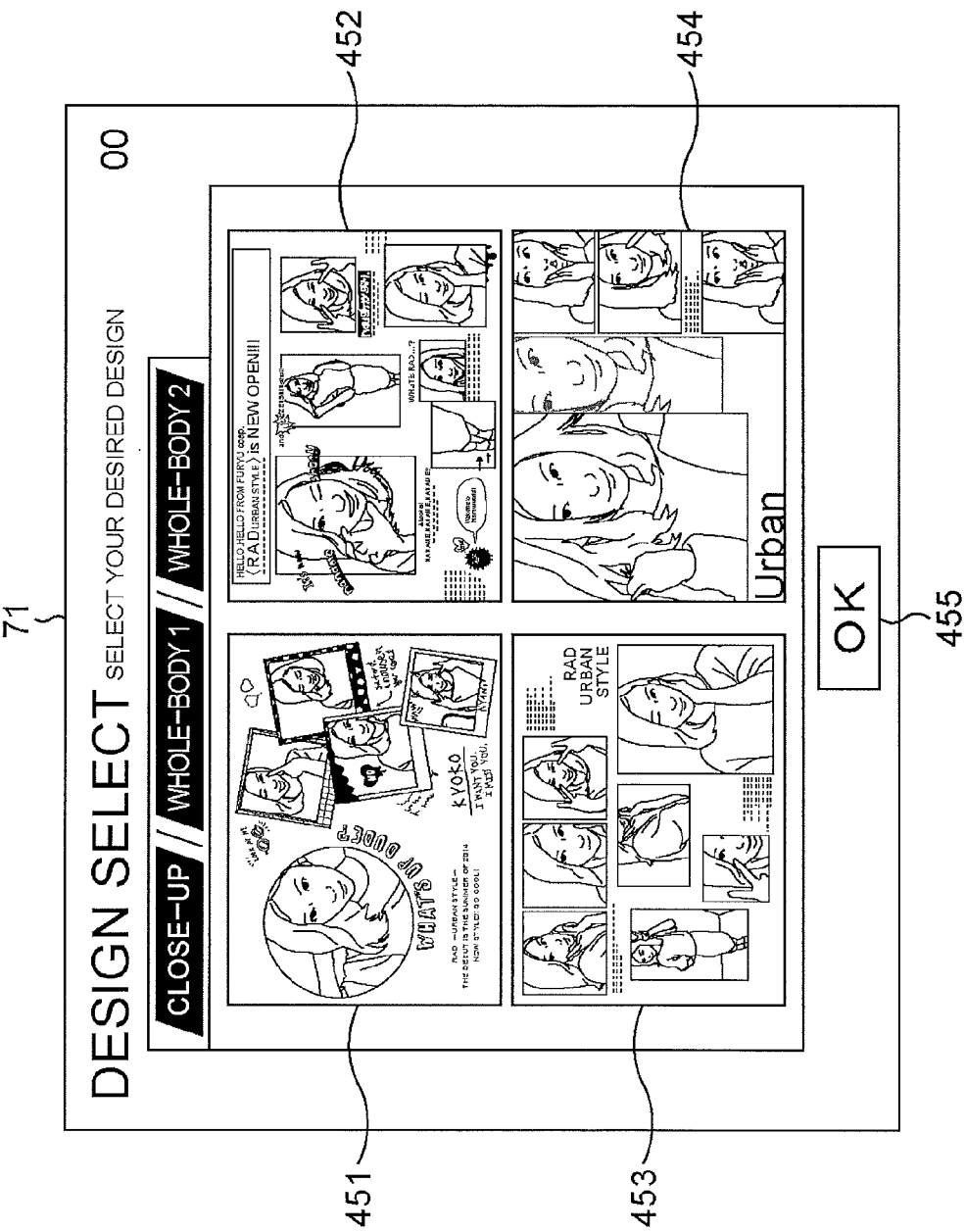
FIG. 24 is a diagram illustrating an example of a sticker layout selection screen.

FIG. 24 is a diagram illustrating an example of the sticker layout selection screen.

On the upper part of the sticker layout selection screen, a message "Select your desired design" is displayed and sticker layout images 451 to 454 are displayed thereunder. In the example of FIG. 24, a plurality of model images is arranged in the respective sticker layout images 451 to 454.

The sticker layout image in which the plurality shot images is arranged is printed on the sticker sheet. In the sticker layout image, the shot image is arranged on a predetermined area (hereinafter, referred to as a shot image arrangement area), and well-designed characters and patterns are arranged on the other area. On the sticker sheet, a composite image obtained by arranging and compositing the shot image on the shot image arrangement area of the sticker layout image is printed. Note that, the composite image obtained by arranging and compositing the shot image on the shot image arrangement area of the sticker layout image may be transmitted to a mobile terminal of the user through the server.

On the sticker layout selection screen, the sticker layout images are displayed by tabs "close-up", "whole-body 1", and "whole-body 2" categorized according to the shot image to be arranged in the sticker layout image. When the "close-up" tab is selected, the sticker layout images in which the close-up images are arranged are displayed. When the "whole-body 1" or the "whole-body 2" tab is selected, the sticker layout images in which the close-up images and the whole-body images are arranged are displayed.

To the shot image arrangement area of the sticker layout image, an image shooting range to determine which part of the body of the user is to be shot is set. In other words, to the shot image arrangement area on which the close-up image to be arranged, the face and the upper half of the body of the user is set as the image shooting range. To the shot image arrangement area on which the whole-body image is to be arranged, the whole-body of the user is set as the image shooting range. When the user desires that the outfit of the user remains in the shot image, the user selects the sticker layout image including the shot image arrangement area on which the whole-body image is to be arranged. Furthermore, when the user desires that the face of the user remains in the shot image, the user selects the sticker layout image including the shot image arrangement areas on which the close-up images are to be arranged.

The number of shot images to be arranged in the sticker layout image, that is, the number of shot image arrangement areas in the sticker layout image may be different from that in each of the sticker layout images. Furthermore, the number of close-up images and the whole-body images to be arranged in the sticker layout image displayed by the "whole-body 1" and "whole-body 2" tabs may be also different from that in each of the sticker layout images.

Therefore, in the shooting processing of the one-person course, the shooting is performed the number of times according to the number of shot images to be arranged in the selected sticker layout image. Note that, in the sticker layout image, one shot image can be arranged on a plurality of shot image arrangement areas by the selection of the user.

Note that, when the sticker layout image displayed by selecting the tab of the "whole-body 1" or the "whole-body 2" is selected, the user can select either of the front whole-body shooting or the whole-body from above shooting is performed as the whole-body shooting. Furthermore, each shot image arrangement area of the sticker layout image may be set such that either of the front whole-body shooting or the whole-body from above shooting is performed.

Furthermore, in the example of FIG. 24, although the sticker layout images 451 and 454, in which only the close-up images are arranged as the model image, and the sticker layout images 452 and 453, in which the close-up image and the whole-body image are arranged as the model image, are arranged in a mixed manner, either sticker layout images is actually arranged.

Then, when an OK button 455 is pushed while either sticker layout image is being selected, or when a predetermined time has passed after the sticker layout image selection screen is displayed, the processing proceeds to step S18. When a sticker layout image is not selected until the predetermined time has passed, it is assumed that a predetermined sticker layout image is selected.

In step S18, the display control section 311 displays a layout selection screen on the touch panel monitor 71. Then, the input receiving section 312 receives the selection of the number of divisions of the sticker sheet.

By selecting the number of divisions of the sticker sheet, a print layout, which indicates the arrangement of the images in the sticker sheet, is determined. The information indicating the print layout is supplied to the printing processing section 304. In the printing processing, the printing processing section 304 prints, using the information, the images on the sticker sheet in the print layout determined based on the number of divisions selected by the user.

In step S19, the display control section 311 displays the name input screen on the touch panel monitor 71. Then, the input receiving section 312 receives the input of the names of the users.

In step S20, the display control section 311 displays a mail-address input screen on the touch panel monitor 71. Then, the input receiving section 312 receives the input of the mail-address of the mobile terminal of the user.

After the processing in step S16 or step S20, the processing proceeds to step S21. In step S21, the guidance outputting control section 313 guides the user in the pre-service space A0 to the shooting space A1. The guide to the shooting space A1 is performed by displaying a guide screen on the touch panel monitor 71 or by outputting sound from the speaker 72.

<Details of Shooting Processing>

Next, details of the shooting processing in step S3 in the above described series of processing of the photo sticker creation game will be described. Note that, according to the course by person-number selected in the pre-service processing, different shooting processing is performed.

(Shooting Processing of Two-Persons Course or Large-Number-Persons Course)

First, shooting processing of the two-persons course or the large-number-persons course will be described with reference to the flowchart of FIG. 25.

In step S31, the shooting processing section 302 determines whether the course by person-number is the two-persons course or not.

When the course by person-number is the two-persons course, the guidance outputting control section 324 displays a screen for explaining how to proceed with identification shooting on the touch panel monitor 92. Then, the processing proceeds to step S32 and the shooting control section 323 performs the identification shooting.

When a plurality of users becomes an object, the identification shooting is performed in order to identify the faces of the respective users, and to farther identify the face organs (such as eyes and a mouth) of the user. A shot image obtained by the identification shooting (hereinafter, referred to as an identification image) is neither edited in the editing processing nor printed on the sticker sheet in the printing processing. The identification image is used only to identify the faces and the face organs.

To achieve such a purpose, in the above described guidance of the identification shooting, a screen to request the user to perform the shooting facing the front is displayed and sound to request the same is output.

When the guidance is completed, the shooting control section 323 starts to capture the moving image by the camera 91. Then, the display control section 321 displays the moving image, in which the user appears, captured by the camera 91 on a live view display screen.

Figure 26:
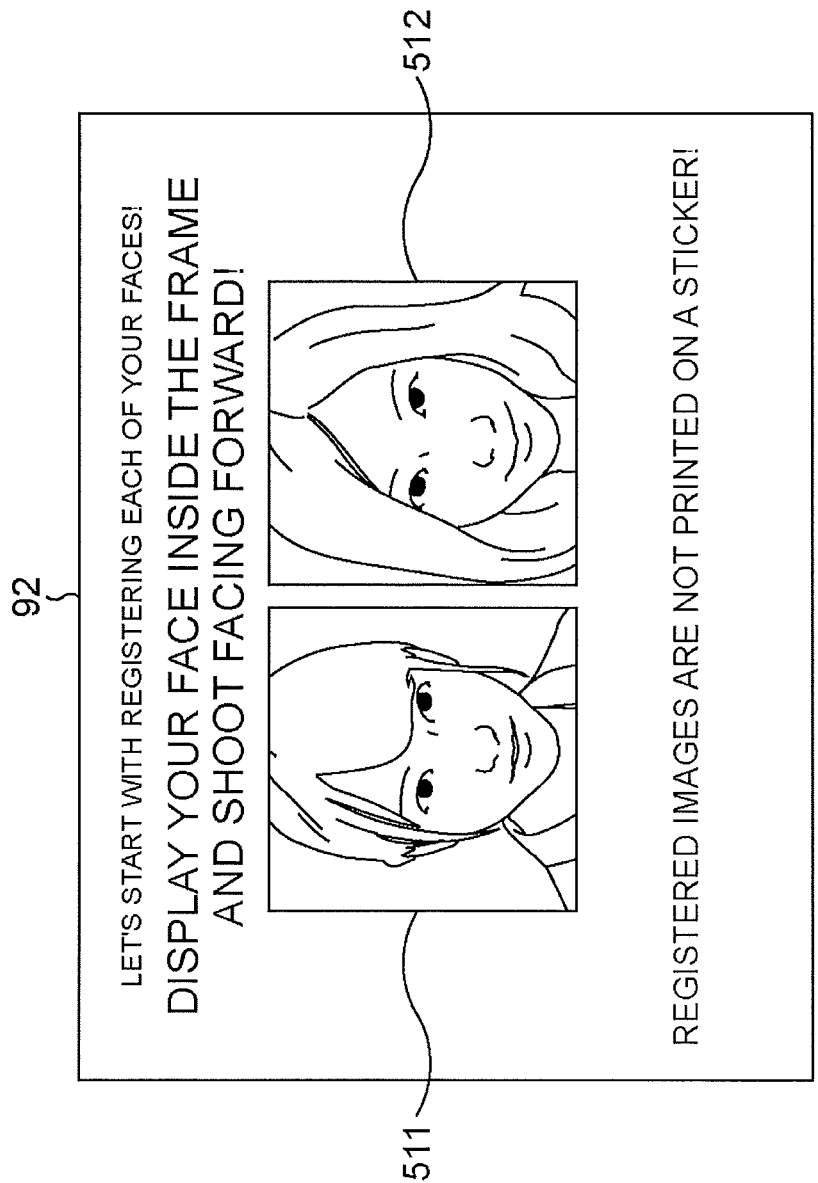
FIG. 26 is a diagram illustrating an example of a live view display screen when identification shooting is performed.

FIG. 26 is a diagram illustrating an example of the live view display screen of the identification shooting.

On the upper part of the live view display screen, a message "Let's start with registering each of your faces! Display your face inside the frame and shoot facing forward!" is displayed. On image display areas 511 and 512 provided under the message, the moving images, in which the respective two users appear, are displayed in real time. Under the image display areas 511 and 512, a message "Registered images are not printed on a sticker!" is displayed.

Predetermined areas of the respective moving images captured by the camera 91 are cut-out and displayed on the image display areas 511 and 512. The two users adjust their face positions to fit the respective faces inside the image display areas 511 and 512 checking the display of the image display areas 511 and 512.

After the live view image is displayed for a predetermined time, a countdown to the shooting is started. Then, at the timing of the shooting, the shooting control section 323 performs the identification shooting and obtains the still images as the identification images. The display control section 321 displays a shooting result of the identification shooting on the touch panel monitor 92.

Figure 27:
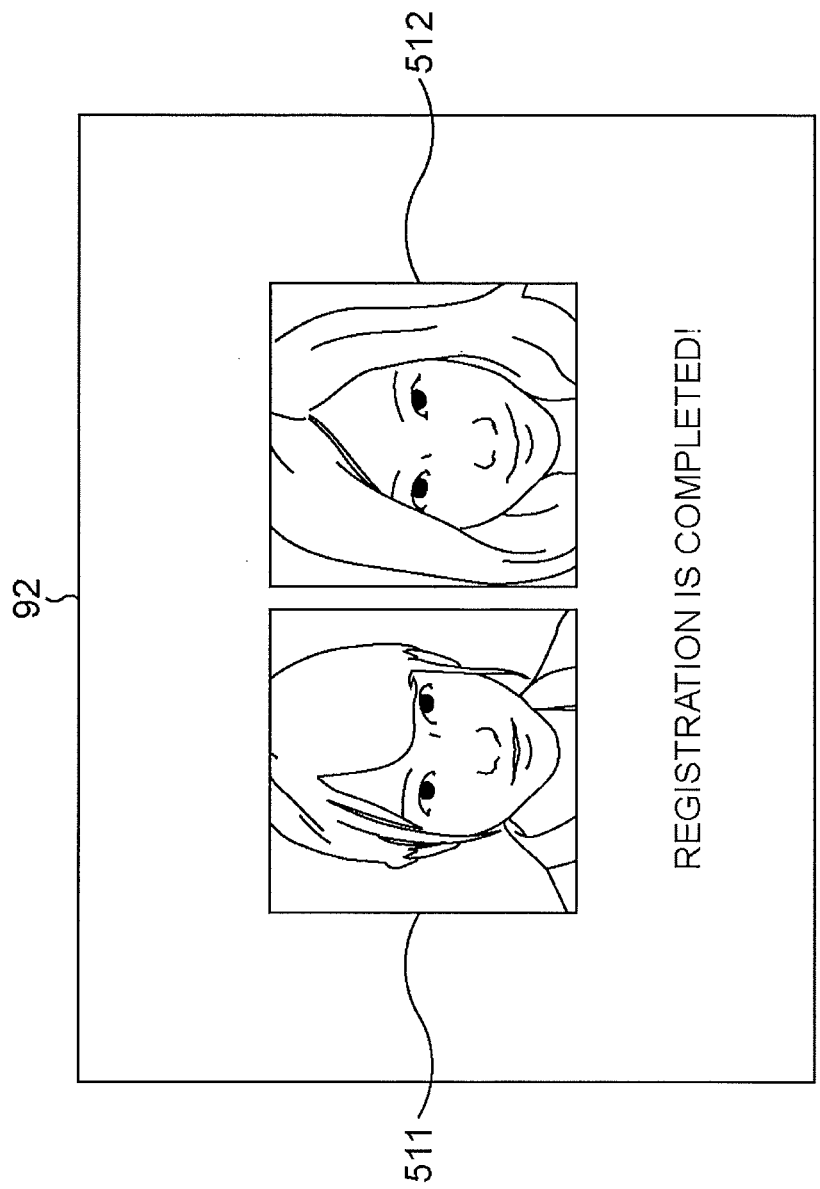
FIG. 27 is a diagram illustrating an example of a shooting result confirmation screen when the identification shooting is performed.

FIG. 27 is a diagram illustrating an example of a shooting result confirmation screen of the identification shooting.

On the image display areas 511 and 512 of the shooting result confirmation screen, the still images (identification images) obtained by the identification shooting are displayed. Under the image display areas 511 and 512, a message "Registration is completed!" is displayed.

As described above, the identification shooting is performed.

Note that, when the course by person-number is the large-number-persons course, step S32 is skipped and the identification shooting is not performed.

When the identification shooting is completed or the shooting processing of the large-number-persons course is started, the guidance outputting control section 324 displays, on the touch panel monitor 92, a screen for explaining how to perform close-up shooting to obtain a close-up image. Then, in step S33, the shooting control section 323 performs the close-up shooting.

More specifically, when the guidance is completed, the shooting control section 323 starts to capture the moving image by the camera 91. Then, the display control section 321 displays the moving image, in which the users appear, captured by the camera 91 on a live view display screen.

Figure 28:
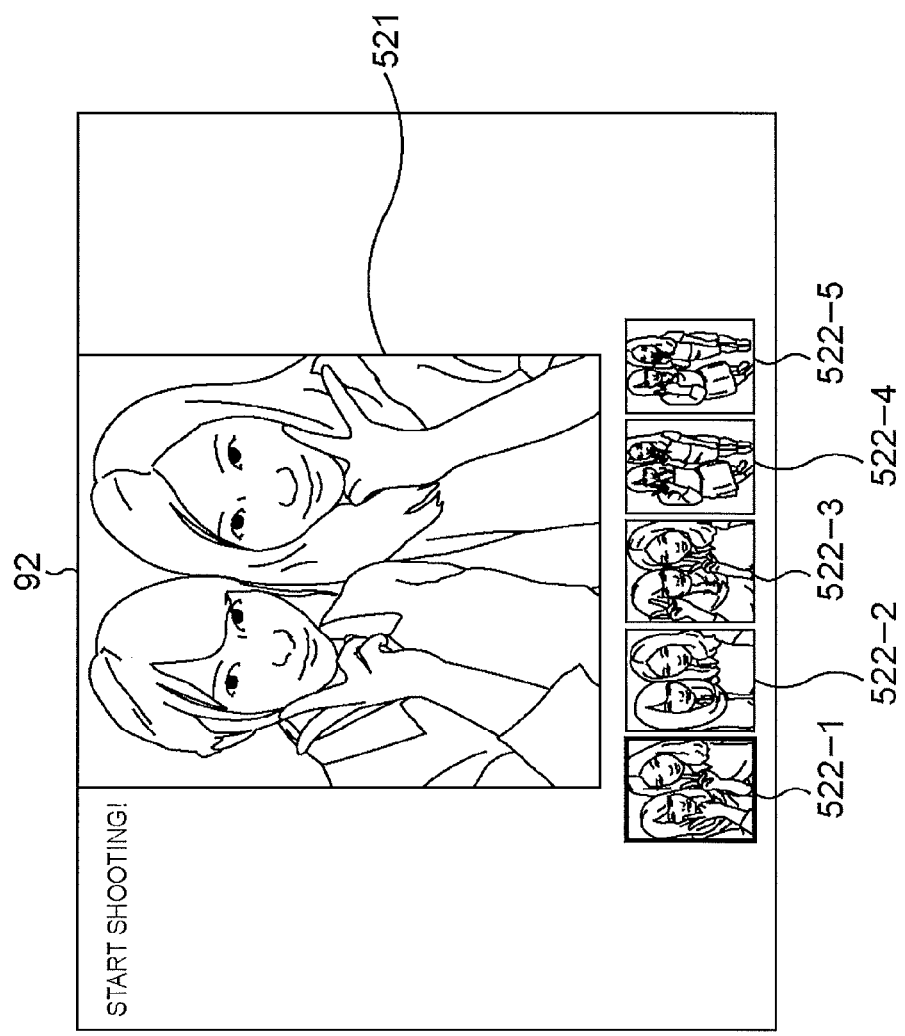
FIG. 28 is a diagram illustrating an example of a live view display screen.

FIG. 28 is a diagram illustrating an example of the live view display screen of the close-up shooting.

On the upper-left part of the live view display screen, a message "Start shooting!" is displayed. On an image display area 521 provided in substantially the center of the live view display screen, the moving image, in which the two users appear, is displayed in real time. Furthermore, on five image display areas 522-1 to 522-5 provided under the image display area 521, the model images displayed on the background selection screen of FIG. 23 are displayed.

Among the five model images displayed on the image display areas 522-1 to 522-5, the three model images displayed on the image display areas 522-1 to 522-3 are close-up images and the other two model images displayed on the image display areas 522-4 and 522-5 are whole-body images. Among the image display areas 522-1 to 522-5, an image display area, in shooting to be performed next is displayed, is highlighted with a thick frame. In the example of FIG. 28, the image display area 522-1 is highlighted with the thick frame.

The users adjust the positions of their bodies to fit their faces and the upper half of the bodies inside the image display area 521, with reference to postures of the model image on the image display area highlighted with the thick frame among the image display areas 522-1 to 522-5 and checking the display of the image display area 521.

After the live view image is displayed for a predetermined time, a countdown to the shooting is started. Then, at the timing of the shooting, the shooting control section 323 performs the close-up shooting and obtains the still image as the close-up image. The display control section 321 displays a shooting result of the close-up shooting on the touch panel monitor 92.

Figure 29:
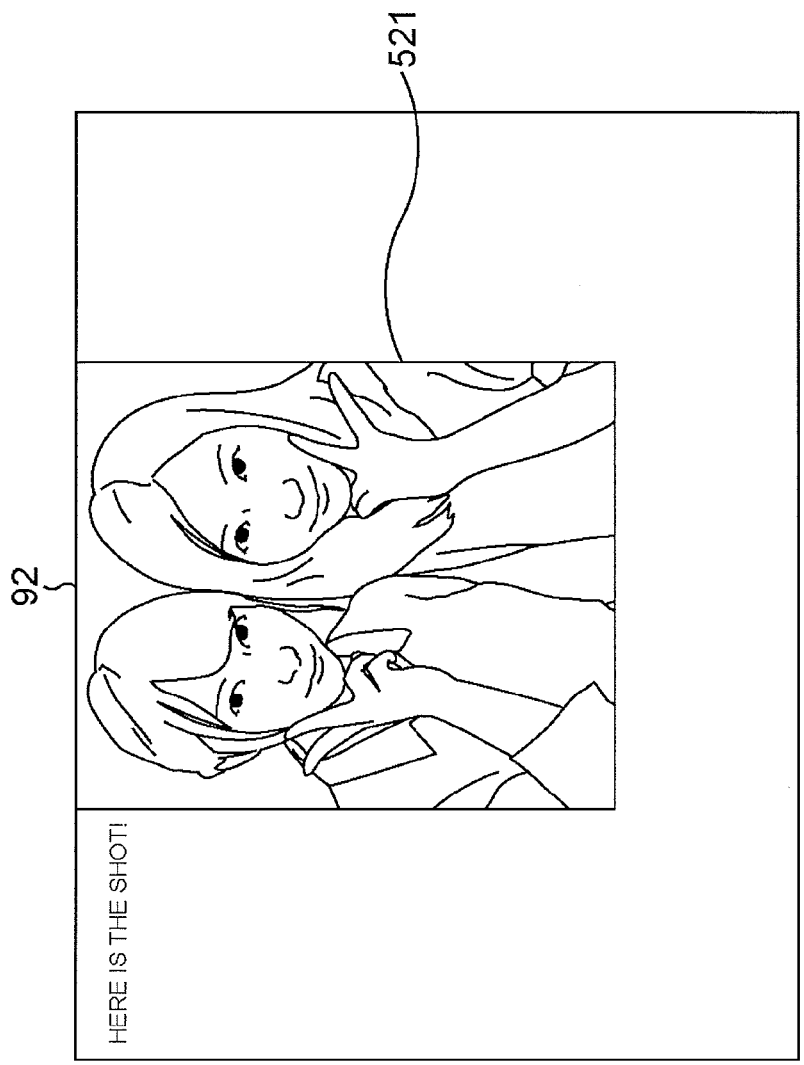
FIG. 29 is a diagram illustrating an example of a shooting result confirmation screen.

FIG. 29 is a diagram illustrating an example of a shooting result confirmation screen of the close-up shooting.

On the image display area 521 of the shooting result confirmation screen, the still image (close-up image) obtained by the close-up shooting is displayed. On the upper-left part of the shooting result confirmation screen, a message "Here is the shot!" is displayed.

As described above, the close-up shooting is performed three times.

Note that, in the above described three close-up shootings, when the course by person-number is the two-persons course, the desirable close-up shooting is performed the number of times selected by the user. Furthermore, when the course by person-number is the large-number-persons course, the desirable close-up shooting is performed once.

Figure 30:
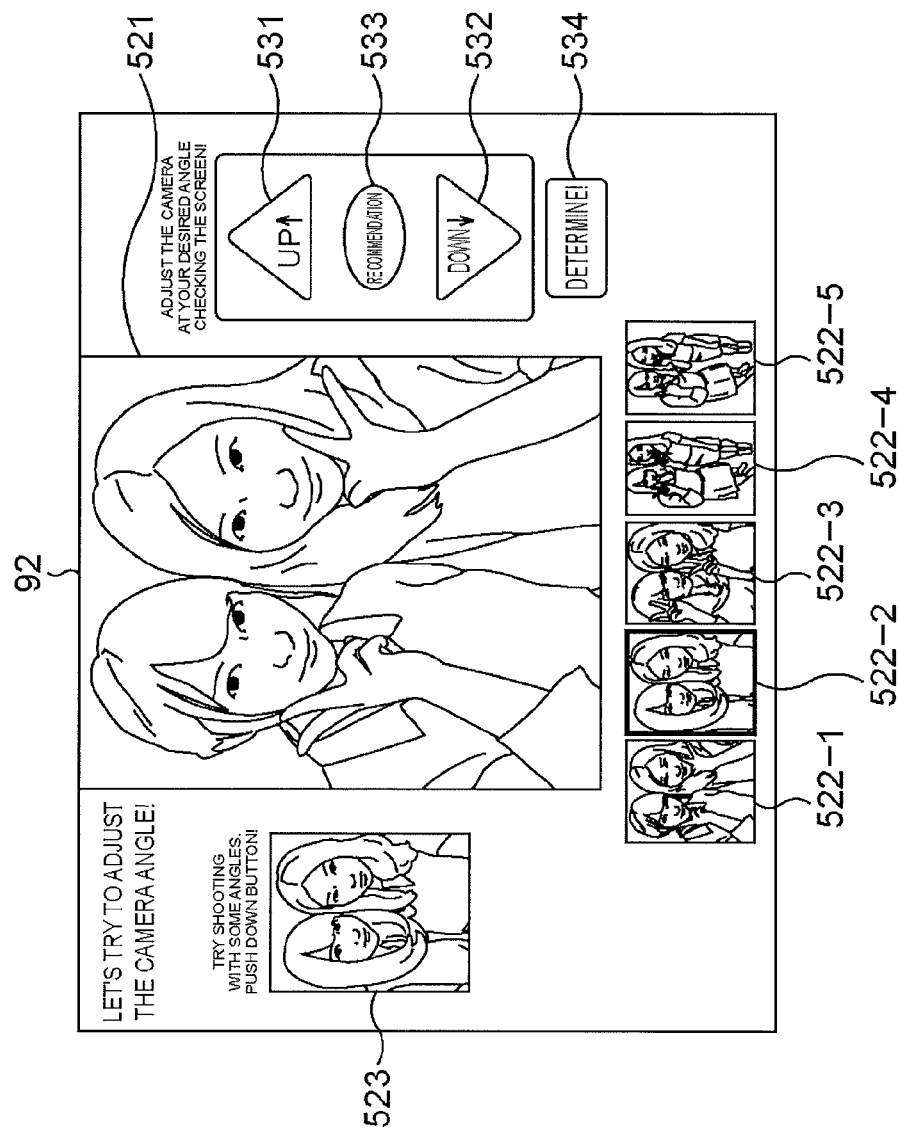
FIG. 30 is a diagram illustrating an example of a live view display screen when desirable close-up shooting is performed.

FIG. 30 is a diagram illustrating an example of a live view display screen of the desirable close-up shooting.

Note that, the description is based on the assumption that the desirable close-up shooting is performed two times in the two-persons course. In this case, the desirable close-up shooting will be performed for the second and third times among the three close-up shootings.

On the image display area 521 on the live view display screen illustrated in FIG. 30, a moving image in which two users appear is displayed in real time. Note that, among the image display areas 522-1 to 522-5, on the image display area 522-1 corresponding to the first close-up shooting, which has been performed, the still image (close-up image) obtained by the shooting is displayed.

Furthermore, on the left side of the image display area 521 on the live view display screen, messages, such as "Let's try to adjust the camera angle!" and a model image 523 are displayed. The model image 523 is a sample image for the posture in the desirable close-up shooting.

Moreover, on the right side of the image display area 521 on the live view display screen, a message "Adjust the camera at your desired angle checking the screen!" is displayed. Furthermore, an up button 531, a down button 532, and a recommendation button 533 are displayed under the message.

The up button 531 is used to adjust the tilt angle of the camera 91 by a predetermined angle such that the camera 91 faces upward from the state at a predetermined angle. The down button 532 is used to adjust the tilt angle of the camera 91 by the predetermined angle such that the camera 91 faces downward from the state at the predetermined angle. Furthermore, the recommendation button 533 is used to set the tilt angle of the camera 91 to a default angle (recommended angle).

Furthermore, under the up button 531, the down button 532, and the recommendation button 533, a determination button 534 is displayed. The determination button 534 is used to determine the tilt angle of the camera 91 adjusted by each button.

As described above, on the touch panel monitor 92, the tilt angle of which is adjustable according to the camera 91, the buttons to adjust the tilt angles of the camera 91 and the touch panel monitor 92 are displayed together with the live view image. With this configuration, when the user sets the angle of the camera 91 checking the live view image, it is possible for the user to operate the button making one's expression and posture without being required to largely move the eyes. As a result, it is possible to more reliably perform the shooting which satisfies the user.

Furthermore, the tilt angle of the camera 91 is adjustable by the predetermined angle, and it is possible for the user to perform the shooting at the adjusted tilt angle of the camera 91 where the user beautifully appears the most. As a result, it is possible to more reliably provide a shot image having an excellent finish and satisfying the user.

Moreover, even when the tilt angle of the camera 91 is set to any angle, the tilt angle automatically returns to the default angle by operating the recommendation button 533. Therefore, the user easily performs the shooting at the recommended angle.

In the above description, although the tilt angle of the camera 91 can be adjusted by the predetermined angle, the adjusted angle (predetermined angle) may be changed by the instruction of the user. By reducing the adjusted angle of the tilt angle, it is possible to adjust the tilt angle in a detailed manner. As a result, it is possible to perform the shooting at more desirable angle of the user.

Furthermore, in the above description, buttons as an input portion to adjust the tilt angles of the camera 91 and the touch panel monitor 92 are displayed on the touch panel monitor 92. However, the input portion is not limited to this, and a physical button or other touch panel as the input portion may be provided in the vicinity of the touch panel monitor 92 within the range where the user is not required to largely move the eyes when adjusting the tilt angle.

Note that, as described above, the touch panel monitor 92 in the camera unit 81 is provided such that the display surface thereof faces in the horizontal direction when the camera 91 has the predetermined depression angle. The tilt angle of the camera 91 at this time is set to the default angle.

When the tilt angle is adjusted from the default state of FIGS. 6B and 6E such that the camera 91 inclines backward (the state of FIGS. 6C and 6F), the lens optical axis of the camera 91 faces in the horizontal direction. At this time, the user can naturally see the lens of the camera 91. Furthermore, when the tilt angle is adjusted from the default state such that the camera 91 inclines forward (the state of FIGS. 6A and 6D), the display screen of the touch panel monitor 92 has the predetermined depression angle where the display screen slightly inclines forward. At this time, the user can naturally see the display screen of the touch panel monitor 92 by looking up at the camera 91.

As described above, by providing the touch panel monitor 92 such that the display screen thereof faces in the horizontal direction when the camera 91 has the predetermined depression angle, it is possible to provide the situation where the user easily perform shooting work even when the tilt angle of the camera 91 is adjusted at any angle.

Furthermore, when the two-persons course is selected, the number of the desirable close-up shooting can be zero. That is, the user who does not desire the desirable close-up shooting can perform the shooting work with satisfaction.

Note that, when the two-persons course is selected, the desirable close-up shooting may be performed once similarly to the large-number-persons course. Since the user adjusts the tilt angle of the camera 91, the desirable close-up shooting takes time to some extent. Thus, by performing the desirable close-up shooting once, it is possible to shorten the time of the shooting work and increase the turnover of the game.

On the other hand, all of the close-up shooting may be the desirable close-up shooting. In this case, the user can perform the shooting work by adjusting the tilt angles of the camera 91 at various angles. As a result, it is possible to improve the user's satisfaction with the shooting.

Furthermore, when the user is accustomed to the game of the photo sticker creating device 1, the user has known the one's desired tilt angle of the camera 91 and is accustomed to the operation of the tilt angle adjustment. Therefore, such a user can perform the desirable close-up shooting without taking much time. Thus, whether or not the user is accustomed to the game may be determined according to the time to input the name in the pre-service processing. The number of the desirable close-up shooting increases for the user who is accustomed to the game.

Moreover, by providing an input portion, such as a numeric keypad which can input numerical numbers, on or in the vicinity of the touch panel monitor 92, the user who is accustomed to the game as described above may directly input the one's desired tilt angle of the camera 91. Note that, when the angle out of the angle range set in advance is input, an error message is displayed on the touch panel monitor 92, and the user thereby inputs the angle within the angle range set in advance.

The voice, or the sound of handclapping or stepping of the user may be used to input the tilt angle, besides the numeric keypad. Moreover, according to the pitch or the length of the voice or the sound, the tilt angel may be adjusted such that the camera 91 faces upward or downward.

Furthermore, the default tilt angle set by the recommendation button 533 may be randomly changed for each game or each shooting. It is thereby possible to excite the user at every game or every shooting, and for the game to be more enjoyable.

Moreover, when the desirable close-up shooting is performed a plurality of times, for example, two times, the tilt angle of the camera 91 adjusted at the first desirable close-up shooting may be displayed on the touch panel monitor 92 at the second desirable close-up shooting. It is thereby possible for the user to reproduce the same shooting as the first desirable close-up shooting and adjust the tilt angle at the second desirable close-up shooting with reference to the first desirable close-up shooting.

Furthermore, in each of a plurality of desirable close-up shootings, when the camera 91 is adjusted at the same tilt angle, the adjusted tilt angle of the camera 91 may be printed on the sticker sheet output at the end. It is thereby possible for the user to reproduce the same shooting as the desirable close-up shooting performed in the previous game when the user plays a game with the photo sticker creating device for the next time.

Note that, in the above description, the tilt angle of the camera 91 is adjusted by the predetermined angle by the operation of the user. However, the camera 91 may continuously perform the shooting while the tilt angle of the camera 91 is changed by the predetermined angle without the operation of the user. In this case, the shot images shot at the respective tilt angles are shown to the user to be selected. Moreover, the camera 91 may perform the shooting of the moving image while the tilt angle of the camera 91 is changed by the predetermined angle. In this case, a predetermined frame in the moving image is selected by the user. With the above described configurations, it is possible to provide an image closer to the user's desired image.

Moreover, by providing a sensor which can calculates the distance between the user and the camera 91, the tilt angle of the camera 91 may be adjusted such that the user is arranged in the center of the shooting range. At this time, a zoom function of the camera 91 is also adjusted.

Note that, in the above description, the tilt angles of the camera 91 and the touch panel monitor 92 are adjustable. In addition, the pan angles of the camera 91 and the touch panel monitor 92 may be adjustable, or both of the pan angle and the tilt angle may be adjustable. Moreover, the camera 91 and the touch panel monitor 92 may have a mechanism that the height or the horizontal position of the camera 91 and the touch panel monitor 92 (the camera unit 81) are adjustable according to the pan angle or the tilt angle. It is thereby possible to perform the shooting at various camera angles. As a result, it is possible to improve the user's satisfaction with the desirable close-up shooting.

Furthermore, in the above description, when the two-persons course is selected, the number of the desirable close-up shooting can be zero. However, the desirable close-up shooting may be performed at least once.

Figure 25:
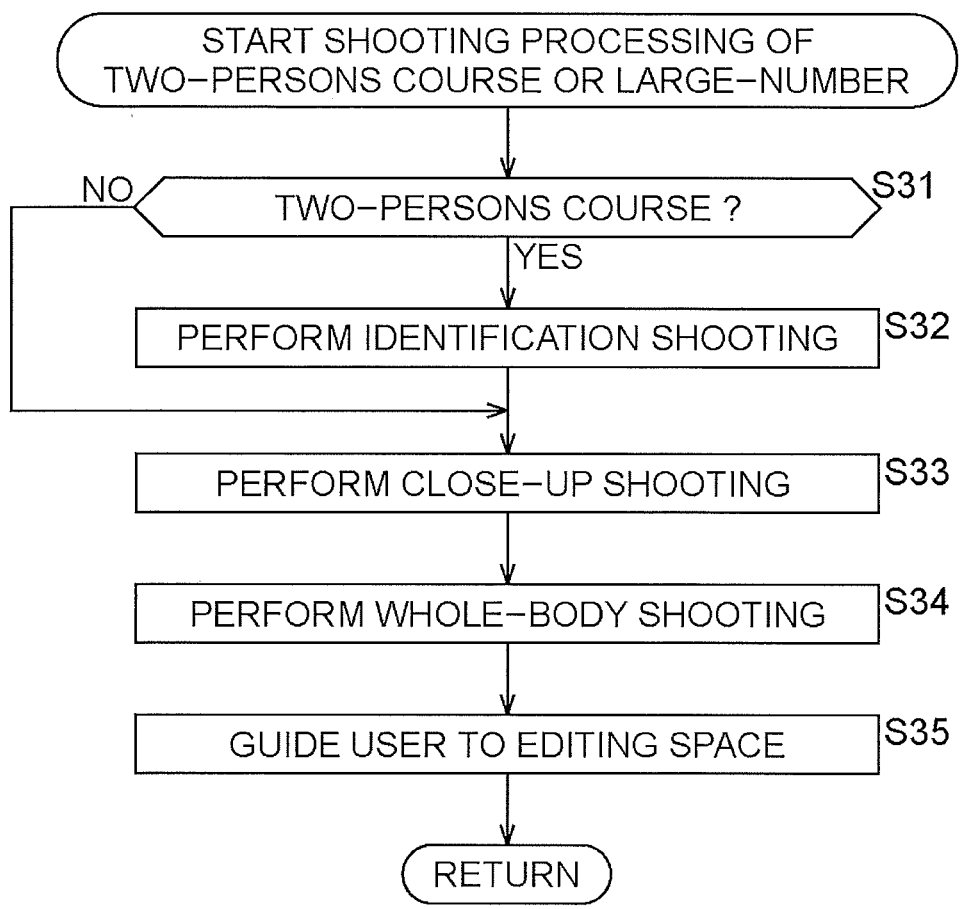
FIG. 25 is a flowchart describing shooting processing of a two-persons course or a large-number-persons course.

Now, returning to the flowchart of FIG. 25, when three close-up shootings are completed, the guidance outputting control section 324 displays, on the touch panel monitor 92, a screen for explaining how to perform whole-body shooting to obtain a whole-body image. Then, in step S34, the shooting control section 323 performs the whole-body shooting.

Although detailed description is omitted, the whole-body shooting is performed two times similarly to the above described close-up shooting. At this time, the zoom function of the camera 91 is adjusted so as to be zoomed out compared to the close-up shooting.

Here, the tilt angles of the camera 91 and the touch panel monitor 92 when the "close-up+front whole-body course" is selected as the shooting course is differently adjusted from that when the "close-up+whole-body from above course" is selected.

Moreover, the emission of light of the upper strobe 82 or the lower strobe 83 may be controlled according to the type of the whole-body shooting to be performed.

More specifically, when the front whole-body shooting is performed, the upper strobe 82 and the lower strobe 83 uniformly irradiate the whole-body of the user with light by emitting the substantially same amount of light. On the other hand, when the whole-body from above shooting is performed, the upper strobe 82 emits the larger amount of light than that of the lower strobe 83, and the upper strobe 82 intensely irradiates the upper half of the body of the user with light. It is thereby possible to provide an image in which the user beautifully appears.

Furthermore, when the whole-body shooting is performed, the tilt angles of the camera 91 and the touch panel monitor 92 may be adjusted by the operation of the user, similarly to the desirable close-up shooting. However, the user does not generally care about the detailed camera angle in the shooting of the whole-body. Thus, when the whole-body shooting is performed, the tilt angles of the camera 91 and the touch panel monitor 92 are adjusted by a larger angle than that when the close-up shooting is performed.

Note that, when the "close-up course" is selected as the shooting course, step S34 is skipped, and the processing proceeds to step S35.

In step S35, the guidance outputting control section 324 guides the users who have completed the shooting to the editing space A2-1 or the editing space A2-2. The guide to the editing space is performed by displaying a guide screen on the touch panel monitor 92 or by outputting sound from the speaker 233.

(Embodiment of Desirable Close-Up Shooting)

In the above described processing, when the two-persons course is selected as the person-number course, the number of the desirable close-up shooting is selected. Here, when the selected number of the desirable close-up shooting is two or more times, the two or more desirable close-up shootings are consecutively performed.

For example, when two times among the three close-up shootings is selected as the number of the desirable close-up shooting, the normal close-up shooting is performed for the first time, and the desirable close-up shooting is consecutively performed for the second and third times.

Furthermore, the tilt angle of the camera 91 in the desirable close-up shooting may be selected by the user before the shooting (for example, at the same time of selecting the number of the desirable close-up (the number of the desirable close-up shooting) in the pre-service processing).

Moreover, when the selected number of the desirable close-up shooting is two or more times, the two or more desirable close-up shootings may be consecutively performed in the order of minimizing the adjustment of the tilt angle of the camera 91 for each shooting.

For example, it is assumed that the tilt angle (the depression angle) set in advance in the close-up shooting is 17°, and the tilt angles (the depression angle) in the two desirable close-up shootings selected by the user are 12° and 20°. When the normal close-up shooting is performed for the first time and the desirable close-up shooting is consecutively performed for the second and the third times, the two desirable close-up shootings is consecutively performed such that the tilt angle (the depression angle) is changed to 17°, 20°, and 12°. That is, the shooting is performed in the order that the difference of the tilt angles between the previous shooting and the next shooting is minimized.

Furthermore, for example, it is assumed that the two or more desirable close-up shootings are performed for the first time among the three close-up shootings. In this case, the two or more desirable close-up shootings may be consecutively performed in the order that the adjustment from the angle where other user has been performed shooting earlier than the user to the tilt angle of the camera 91 for each shooting is minimized.

For example, it is assumed that the tilt angle (the depression angle) at the end of the shooting of the previous user is 20°, and the tilt angles (the depression angles) in the two desirable close-up shootings selected by the user are 12° and 19°. When the desirable close-up shooting is performed for the first and second times, the two desirable close-up shootings are consecutively performed such that the tilt angle (the depression angle) is changed to 20°, 19°, and 12°.

With the above described processing, it is possible to shorten the time to adjust the tilt angle of the camera 91 for each desirable close-up shooting. That is, it is possible to shorten the time of the shooting work, and eventually, increase the turnover of the game. Furthermore, the user is required to change the standing position in the shooting space according to the tilt angle of the camera 91. With the above described processing, it is possible to minimize the move to change the standing position. Moreover, the change of the tilt angle of the camera 91 between the previous shooting and the next shooting is small, and it is possible for the user to perform the shooting without uncomfortable feeling from the previous shooting.

Note that, when the last shooting of the previous user is the whole-body shooting, and the next user selects the shooting course in which the close-up shooting and the whole-body shooting are performed, for example, the two whole-body shootings may be performed first, and then the three close-up shootings may be performed.

Furthermore, whether the normal close-up shooting or the desirable close-up shooting is performed may be set according to the selected background image in pre-service processing. When two or more background images for which the desirable close-up shooting is performed are selected, the two or more desirable close-up shootings are consecutively performed regardless of the selected order of the background images.

Moreover, when a plurality of desirable close-up shootings is performed regardless of the person-number course, particularly when the number of users is larger, it is more difficult to move to change the standing position in the shooting space. Thus, when the number of the user is larger than a predetermined number, the above described processing may be performed. Note that, when the number of the user is not many (one or two), since it is not so much difficult to move to change the standing position in the shooting space, the above described processing may not be performed.

Incidentally, as described above, at the back surface as viewed from the user in the shooting space, the back surface curtain 121 is affixed to the upper end of the back surface panel 51 to, for example, the height of around a user's knee, and the back surface panel 51 below the curtain is exposed. Similarly, at both right and left surfaces as viewed from the user in the shooting space, the side surface curtains are affixed from the upper end of the side surface panels to, for example, the height of around a user's knee, and the side surface panels below the curtains are exposed.

Figure 31:
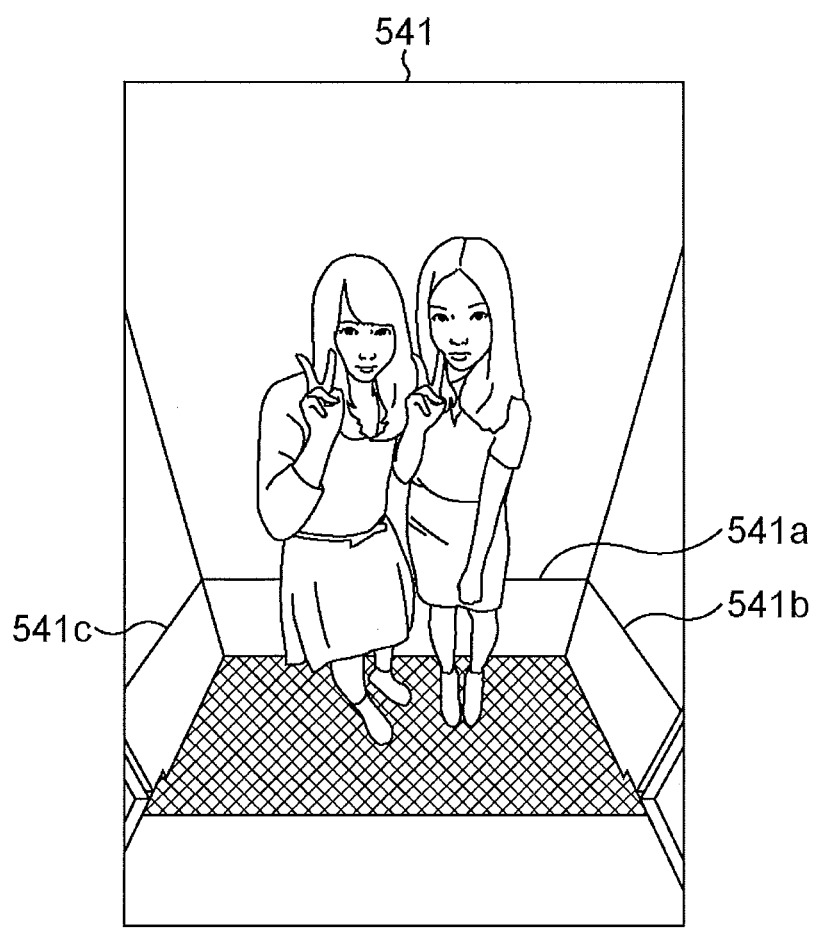
FIG. 31 is a diagram describing a boundary of a back surface curtain and a back surface panel.

Therefore, as described in FIG. 31, boundaries 541a, 541b, and 541c appear in a shot image 541 obtained by the whole-body shooting. The boundary 541a is the boundary between the back surface curtain and the exposed part of the back surface panel. The boundary 541b is the boundary between the side surface curtain and the side surface panel on the left side. The boundary 541c is the boundary between the side surface curtain and the side surface panel on the right side.

Particularly, in the photo sticker creating game processing of the embodiment, when the whole-body shooting is performed, while the chroma key processing is performed to the floor surface, the chroma key processing is not performed to the back surface and the side surfaces as viewed from the user. Therefore, the above described boundaries remain in the shot image obtained by the whole-body shooting.

(Boundary Erasing Processing)

Thus, with reference to FIG. 32 and FIG. 33, processing to erase the above described boundaries will be described.

Figure 32:
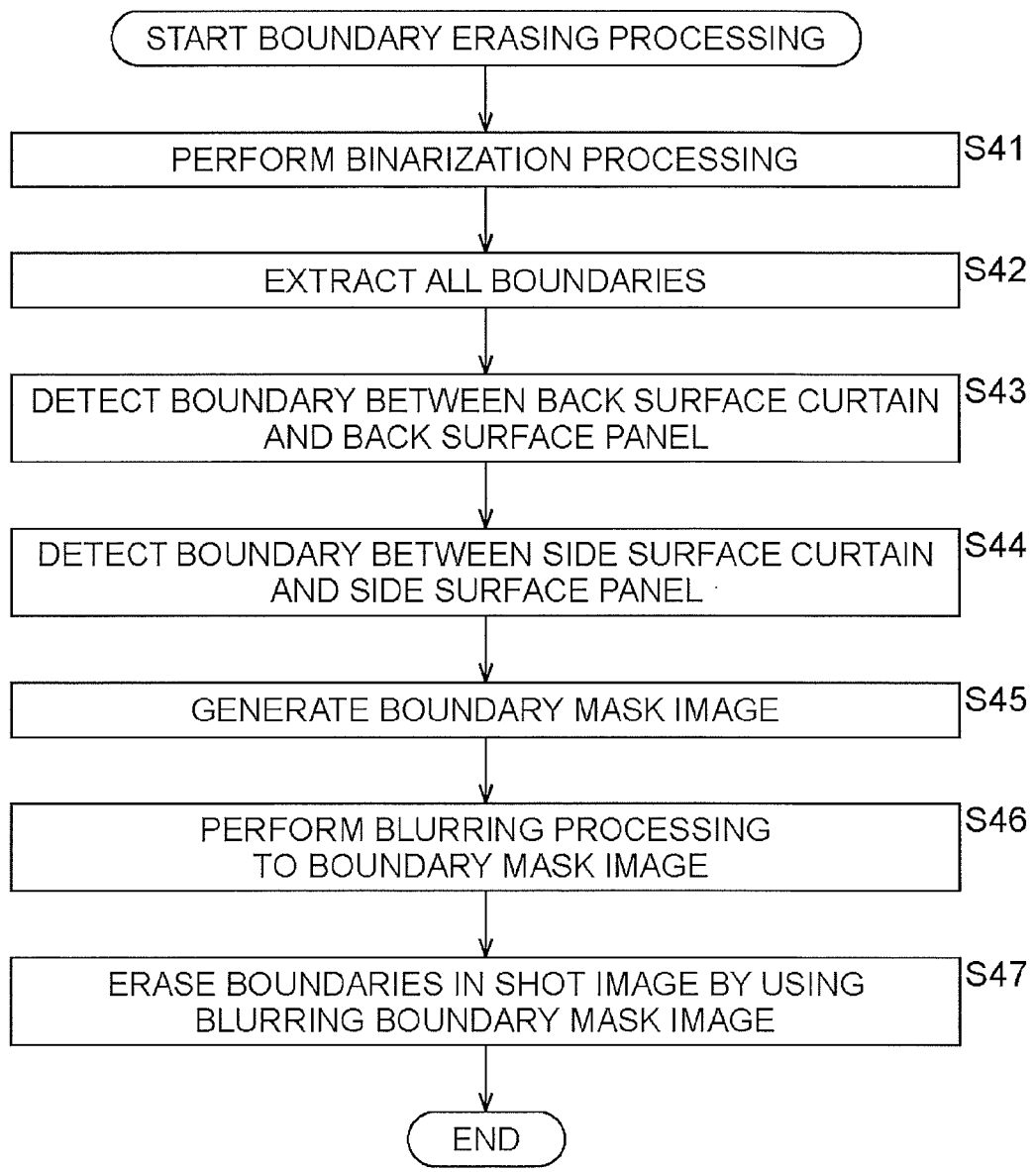
FIG. 32 is a flowchart describing boundary erasing processing.

FIG. 32 is the flowchart describing boundary erasing processing to erase the above described boundaries. FIGS. 33A to 33E are examples of mask images generated in the boundary erasing processing. The boundary erasing processing is performed to the shot image (the whole-body image) obtained by the whole-body shooting (the front whole-body shooting and the whole-body from above shooting).

In step S41, the image processing section 325 performs binarization processing to the shot image 541 (FIG. 31).

In step S42, by extracting all of the boundaries from the image to which the binarization processing has been performed, the image processing section 325 generates a boundary extraction mask image 551 illustrated in FIG. 33A. Here, besides the boundaries between the back surface curtain and the exposed part of the back surface panel, between the side surface curtain and the side surface panel on the right side, and between the side surface curtain and the side surface panel on the left side, the boundaries between the back surface panel and the side surface panels, between the back surface panel and the floor surface, and between the side surface panels and the floor surface are also extracted.

In step S43, the image processing section 325 moves the horizontal segment in the boundary extraction mask image 551 in the vertical direction and detects the area overlapping the segment as the boundary between the back surface curtain and the exposed part of the back surface panel. The image processing section 325 thereby generates a horizontal line extraction mask image 552 illustrated in FIG. 33B.

In step S44, while fixing a one end of the vertical segment in the boundary extraction mask image 551, the image processing section 325 inclines the other end of the segment by a predetermined angle, and detects the area overlapping the segment as the boundary between the side surface curtain and the exposed part of the side surface panel. The image processing section 325 thereby generates an oblique line extraction mask image 553 illustrated in FIG. 33C.

In step S45, the image processing section 325 composites the horizontal line extraction mask image 552 and the oblique line extraction mask image 553. The image processing section 325 thereby generates a boundary mask image 554 illustrated in FIG. 33D. The boundary mask image 554 is to mask the boundaries 541a, 541b, and 541c in the shot image 541.

In step S46, by performing the blurring processing to the boundary mask image 554, the image processing section 325 generates a blurring boundary mask image 555 illustrated in FIG. 33E.

Figure 34:
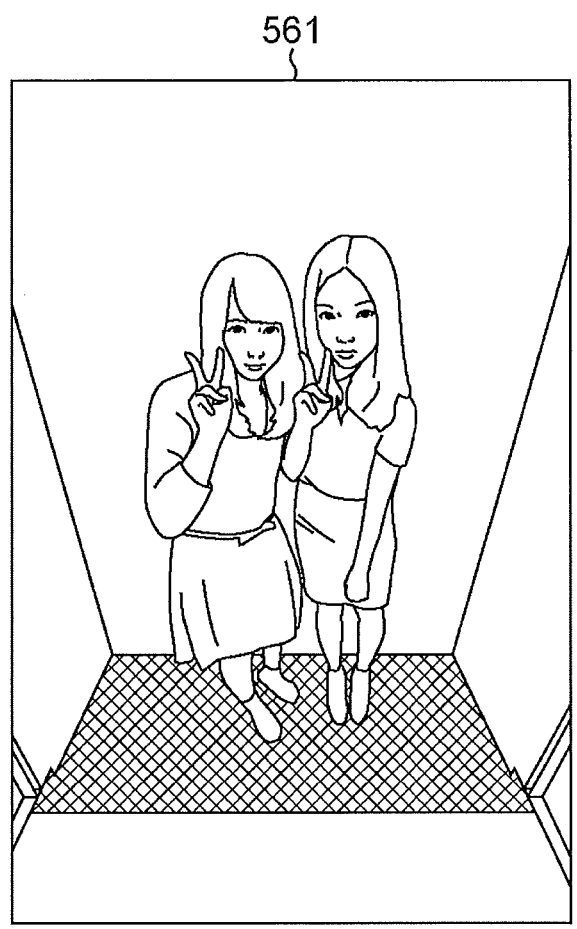
FIG. 34 is an example of a processing result of the boundary erasing processing.

Then, in step S47, the image processing section 325 erases the boundaries 541a, 541b, and 541c in the shot image 541 by using the blurring boundary mask image 555. More specifically, a pixel corresponding to a white pixel in the blurring boundary mask image 555 in the shot image 541 is replaced with the same color pixel (for example, a white-based color) as the back surface curtain (the back surface panel) and the side surface curtain (the side surface panel) in the shot image 541. As illustrated in FIG. 34, a shot image 561 in which the boundaries 541a, 541b, and 541c are erased is thereby obtained.

Note that, the above described boundary erasing processing is performed to the moving image captured by the camera 91, and the result may be displayed as the live view image. Furthermore, the above described boundary erasing processing is performed to the shot image obtained as the still image, and the result may be displayed as the shooting result.

With the above described processing, in the photo sticker creating device of the embodiment, when unnatural lines appear in the back surface and the side surfaces as viewed from the user as the object, it is possible to provide a shot image without uncomfortable feeling.

Note that, in the above description, the boundary between the back surface curtain and the exposed part of the back surface panel and the boundary between the side surface curtain and the exposed part of the side surface panel are erased. In addition to them, boundaries between the back surface panel and the side surface panels, between the back surface panel and the floor surface, and between the side surface panels and the floor surface may be erased.

Then, boundaries, between the back surface panel and the side surface panels, between the back surface panel and the floor surface, and between the side surface panels and the floor surface, which are different from the actual boundaries may be composed on the shot image in which all of the boundaries are erased.

It is thereby possible for the shooting space to be seen as if the shooting space has depth in the shot image, or for the actual shooting space to be seen as if the space has another shape. As a result, it is possible to the finish of the shot image with interesting.

Furthermore, the boundary erasing processing is performed to the whole-body image and is not performed to the close-up image. Therefore, the image processing section 325 can perform the boundary erasing processing according to the image shooting range (field angle) of the camera 91. More specifically, when the image shooting range of the camera 91 is the whole-body of the user (that is, when the whole-body shooting is performed), the boundary erasing processing is performed. Furthermore, when the image shooting range of the camera 91 is the face and the upper half of the body of the user (that is, the close-up shooting is performed), the boundary erasing processing is not performed.

In the above description, the shooting processing of the two-persons course or the large-number-persons course has been described.

(Shooting Processing of One-Person Course)

Next, shooting processing of the one-person course will be described with reference to the flowchart of FIG. 35.

When the shooting processing of the one-person course is started, the guidance outputting control section 324 displays a screen for explaining how to perform identification shooting on the touch panel monitor 92. Then, in step S51, the shooting control section 323 performs the identification shooting.

In the one-person course, the identification shooting is performed in order to identify the face organs (such as eyes and a mouth) of the user. An identification image obtained by the identification shooting is also neither edited in editing processing nor printed on the sticker sheet in printing processing. The identification image is used only to identify the face organs.

When the guidance is completed, the shooting control section 323 starts to capture the moving image by the camera 91. Then, the display control section 321 displays the moving image, in which the user appears, captured by the camera 91 on a live view display screen.

Figure 36:
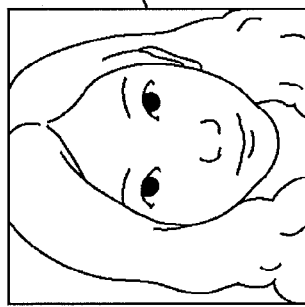
FIG. 36 is a diagram illustrating an example of a live view display screen when identification shooting is performed.

FIG. 36 is a diagram illustrating an example of the live view display screen of the identification shooting.

On the upper part of the live view display screen, a message "Let's start with registering your face! Display your face inside the frame and shoot facing forward!" is displayed. On an image display area 611 provided under the message, the moving image in which the single user appears is displayed in real time. Under the image display area 611, a message "Registered image is not printed on a sticker!" is displayed.

A predetermined area of the moving image captured by the camera 91 is cut-out and displayed on the image display area 611. The single user adjusts the face position to fit the face inside the image display area 611 checking the display of the image display area 611.

After the live view image is displayed for a predetermined time, a countdown to the shooting is started. Then, at the timing of the shooting, the shooting control section 323 performs the identification shooting and obtains the still image as the identification image. The display control section 321 displays a shooting result of the identification shooting on the touch panel monitor 92.

Figure 37:
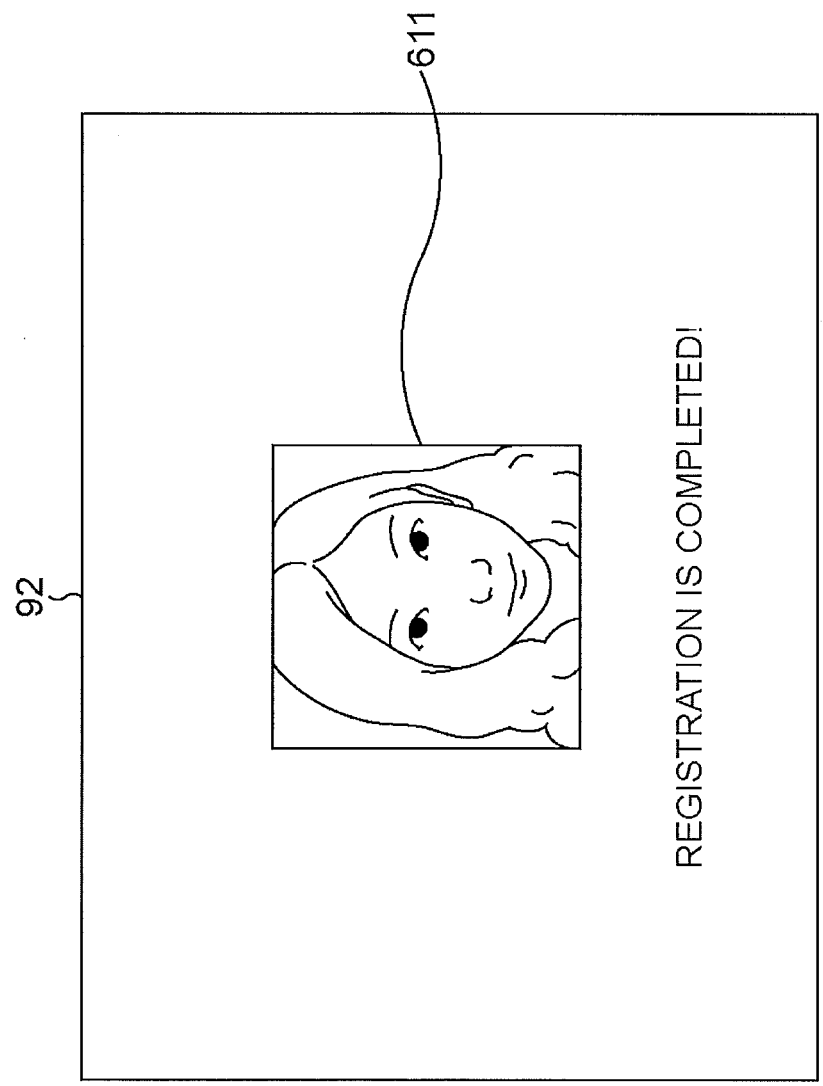
FIG. 37 is a diagram illustrating an example of a shooting result confirmation screen when the identification shooting is performed.

FIG. 37 is a diagram illustrating an example of a shooting result confirmation screen of the identification shooting.

On the image display area 611 of the shooting result confirmation screen, the still image (identification image) obtained by the identification shooting is displayed. Under the image display area 611, a message "Registration is completed!" is displayed.

As described above, the identification shooting is performed.

When the identification shooting is completed, the guidance outputting control section 324 displays a screen for explaining how to perform the shooting on the touch panel monitor 92. Then, in step S52, the display control section 321 displays, on the touch panel monitor 92, the sticker layout image selected in the pre-service processing.

Figure 38:
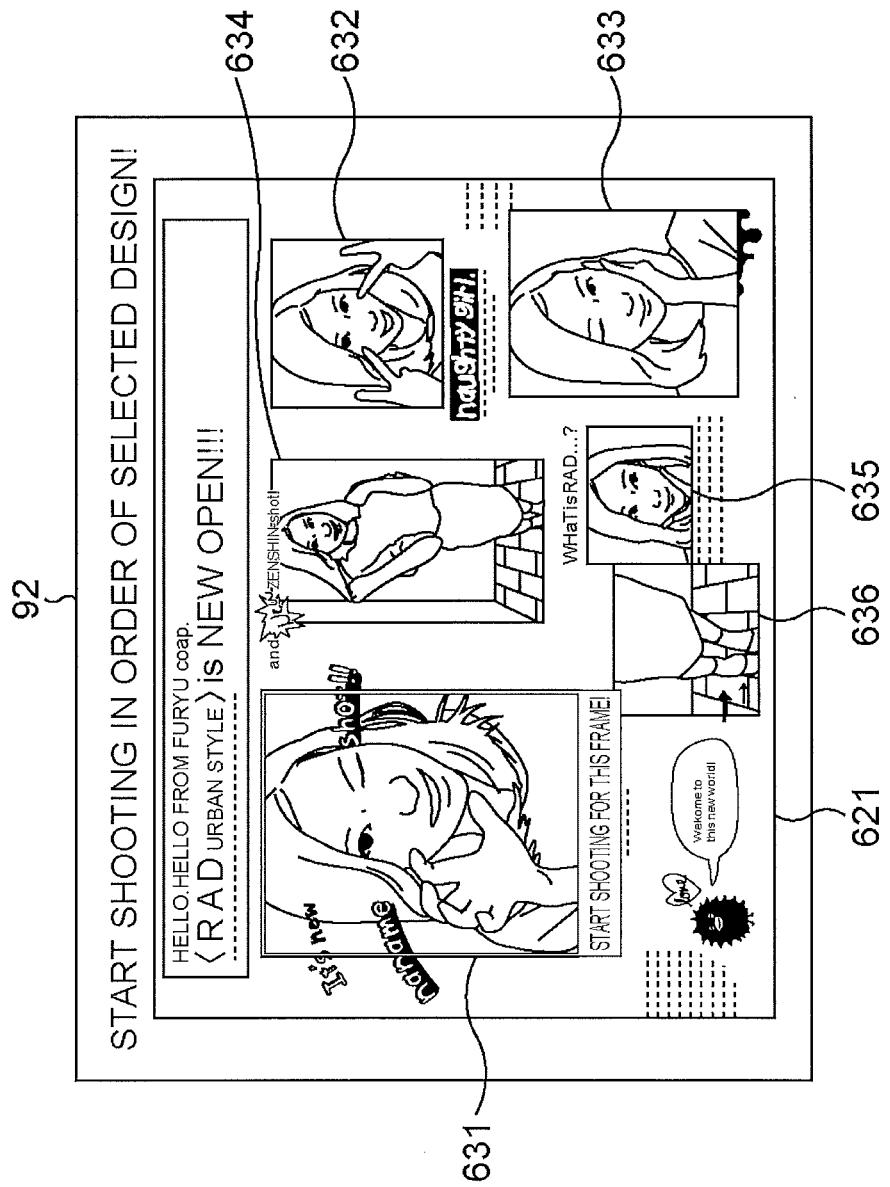
FIG. 38 is a diagram illustrating an example of a sticker layout image display screen.

FIG. 38 is a diagram illustrating an example of a sticker layout image display screen.

On the upper part of the sticker layout image display screen, a message "Start shooting in order of selected design!" is displayed. Under the message, a sticker layout image 621 selected in the pre-service processing is displayed. Here, it is assumed that a sticker layout image 452 is selected on the sticker layout selection screen of FIG. 24.

In the sticker layout image 621, six shot image arrangement areas 631 to 636 are provided. On the respective shot image arrangement areas 631 to 636, the close-up images or the whole-body images are arranged as the model images. More specifically, the close-up images are arranged on the shot image arrangement areas 631, 632, and 633, and the whole-body image is arranged on the shot image arrangement area 634. Furthermore, an image in which a part including the face of the model is cut-out (trimmed), and an image in which a part including the legs of the model is cut-out (trimmed) from one whole-body image are arranged on the respective shot image arrangement areas 635 and 636.

Among the shot image arrangement areas 631 to 636, the shot image arrangement area, on which a model image corresponding to the shooting to be performed next is displayed, is highlighted with the thick frame and a message "Start shooting for this frame!" In the example of FIG. 38, a shot image arrangement area 631 is highlighted.

After the highlighting is performed for a predetermined time, the processing proceeds to step S53. In step S53, the shooting control section 323 shoots the user in an image shooting range set to the area on which the shot image to be obtained is to be arranged (that is, the highlighted shot image arrangement area).

More specifically, the shooting control section 323 starts to capture the moving image by the camera 91. Then, the display control section 321 displays the moving image, in which the user appears, captured by the camera 91 on a live view display screen.

Here, as the three close-up shootings, the desirable close-up shooting is performed for the shot image arrangement areas 631, 632, and 633.

Figure 39:
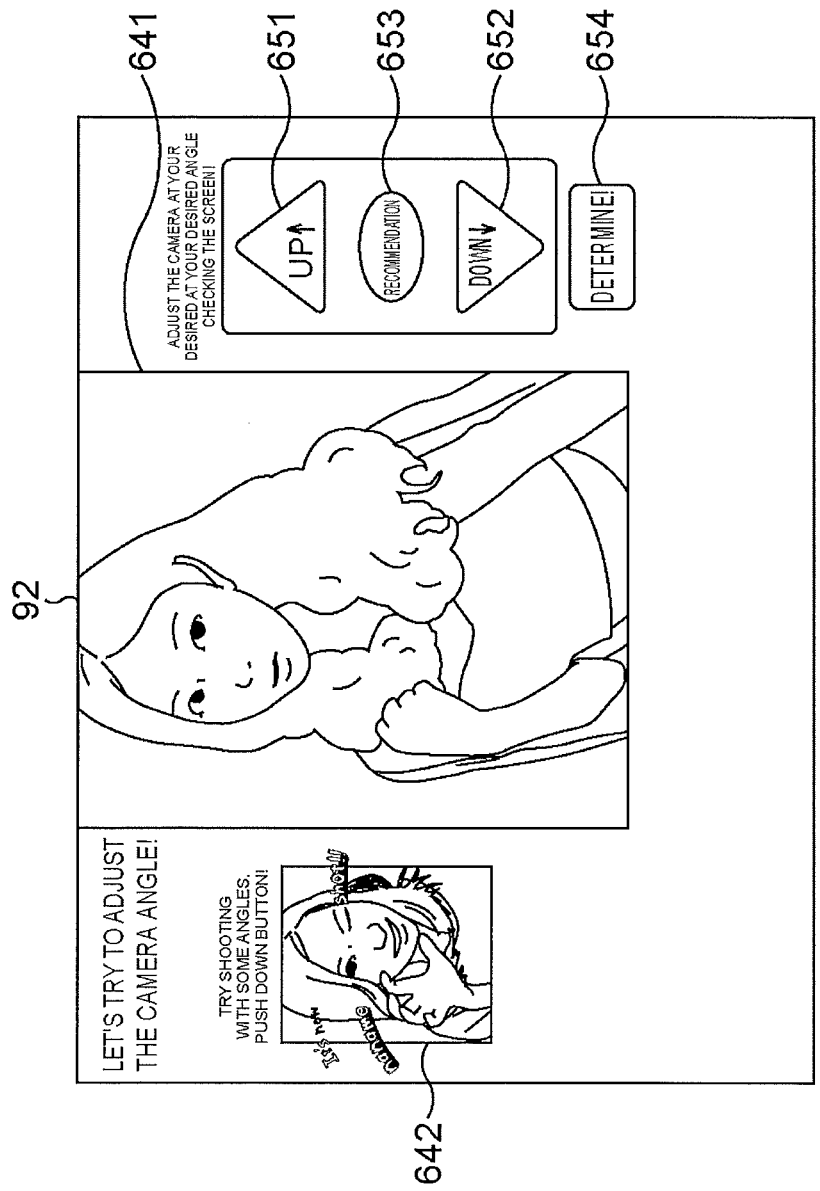
FIG. 39 is a diagram illustrating an example of a live view display screen.

FIG. 39 is a diagram illustrating an example of the live view display screen of the desirable close-up shooting.

On an image display area 641 of the live view display screen, the moving image in which the single user appears is displayed in real time.

Furthermore, on the left side of the image display area 641 on the live view display screen, messages such as "Let's try to adjust the camera angle!" are displayed. Furthermore, on a model image display area 642 provided under the messages, a sample model image for the posture in the desirable close-up shooting is displayed.

Moreover, on the right side of the image display area 641 on the live view display screen, a message "Adjust your desired angle checking the screen!" is displayed. Furthermore, under the message, an up button 651, a down button 652, and a recommendation button 653 are displayed similarly to the live view display screen of FIG. 30. Furthermore, under the up button 651, the down button 652, and the recommendation button 653, an OR button 654 is displayed.

After the tilt angle of the camera 91 is adjusted, the user adjusts the position of the body to fit the face and the upper half of the body inside the image display area 641, with reference to a posture of the model image on the model image display area 642 and checking the image display area 641.

After the live view image is displayed for a predetermined time, a countdown to the shooting is started. Then, at the timing of the shooting, the shooting control section 323 performs the close-up shooting and obtains the still image as the close-up image. The display control section 321 displays a shooting result of the close-up shooting on the touch panel monitor 92.

After the shooting corresponding to the shot image arrangement area is performed, when shooting is further performed, the sticker layout image illustrated in FIG. 40 is displayed again.

Figure 40:
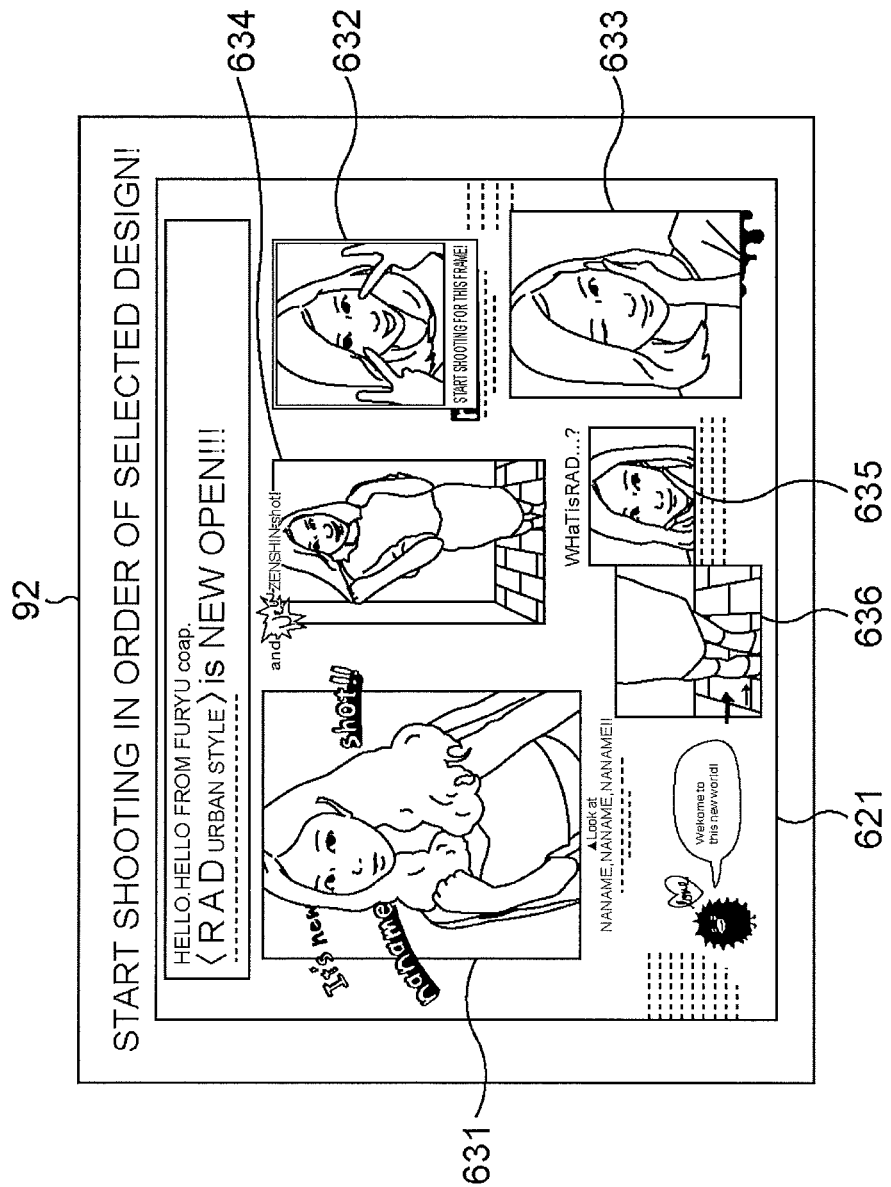
FIG. 40 is a diagram illustrating an example of a sticker layout image display screen.

In the sticker layout image of FIG. 40, on the shot image arrangement area 631, the shot image (the close-up image) obtained by the desirable close-up shooting which has been performed is arranged. A shot image arrangement area 632, in which a model image corresponding to the shooting to be performed next is displayed, is highlighted.

Note that, in the sticker layout image of FIG. 40, after the shot image arrangement area 634, on which a whole-body image is displayed as a model image, is highlighted, the whole-body shooting which shoots the whole-body of the user is performed.

Figure 41:
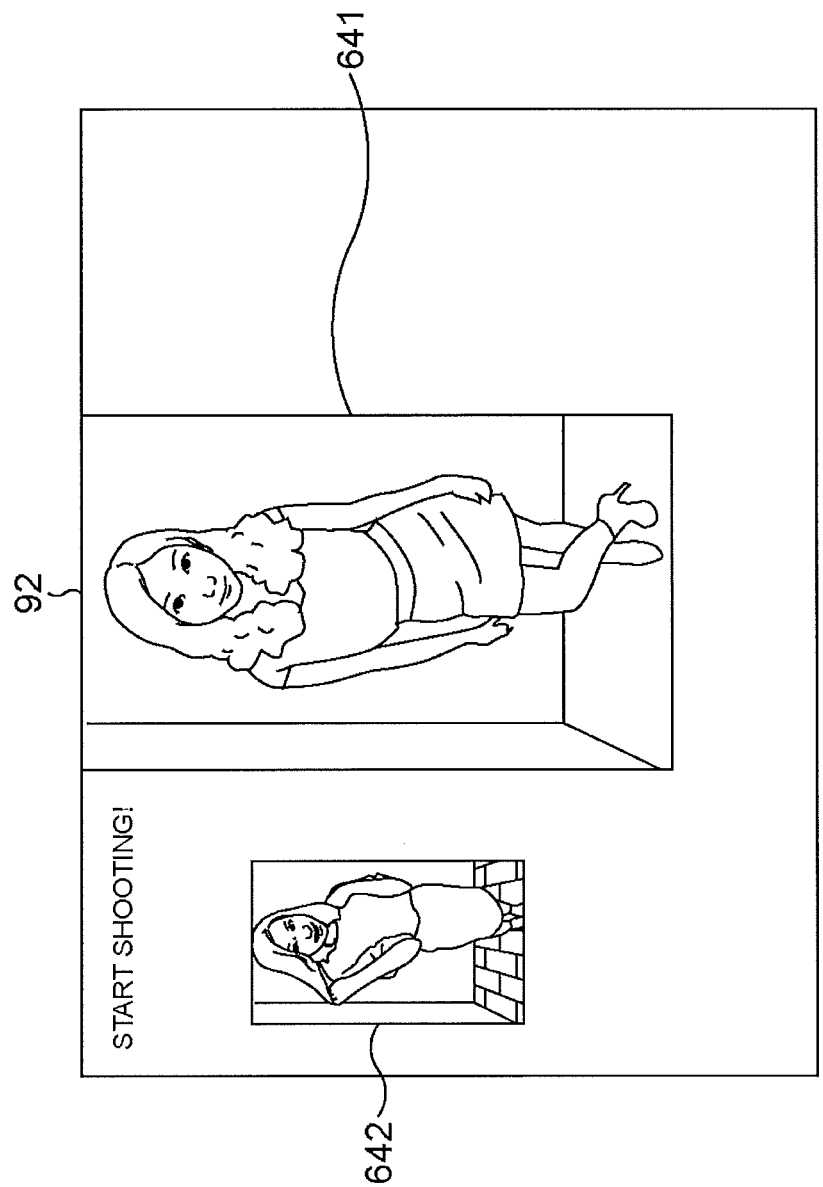
FIG. 41 is a diagram illustrating an example of a live view display screen.

FIG. 41 is a diagram illustrating an example of a live view display screen of the whole-body shooting.

On the upper-left part of the live view display screen, a message "Start shooting!" is displayed. On the image display area 641 provided in substantially the center of the live view display screen, the moving image in which the single user appears is displayed in real time. Furthermore, on the left side of the image display area 641, the model image display area 642 is provided. On the model image display area 642, the model image arranged on the shot image arrangement area 634 in the sticker layout image 621 is displayed.

Note that, it is assumed that the model image arranged on the shot image arrangement area 634 is the whole-body image obtained by the whole-body from above shooting. That is, the whole-body from above shooting is performed.

The user adjusts the position of one's body to fit the whole-body inside an image display area 641 with reference to the posture of the model image on the model image display area 642 and checking the display of the image display area 641.

After the live view image is displayed for a predetermined time, a countdown to the shooting is started. Then, at the timing of the shooting, the shooting control section 323 performs the whole-body shooting and obtains the still images as the whole-body image. The display control section 321 displays a shooting result of the whole-body shooting on the touch panel monitor 92.

After the shooting in the image shooting range set to the shot image arrangement area 634 is performed in this manner, the sticker layout image illustrated in FIG. 42 is displayed again.

Here, in the embodiment, the green sheet for performing chroma key is laid on the floor surface of the background portion 22 side in the shooting space as described above. Therefore, when the whole-body shooting is performed, the image processing section 325 performs the chroma key processing to the floor surface of the shooting space in the shot image obtained by the whole-body shooting. The image for compositing is thereby composed on the floor surface.

Figure 42:
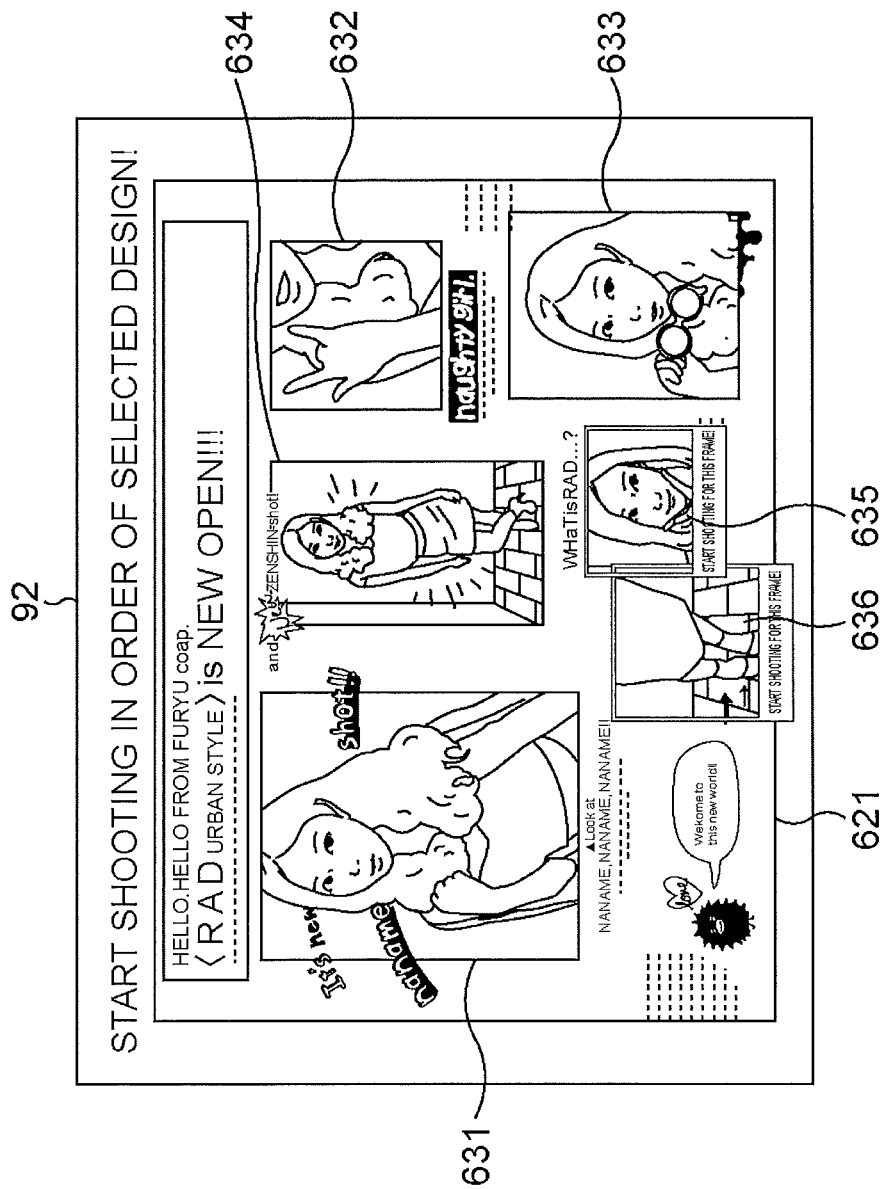
FIG. 42 is a diagram illustrating an example of a sticker layout image display screen.

That is, in the sticker layout image of FIG. 42, the shot image (the whole-body image) obtained by the whole-body from above shooting which has been performed is arranged on shot image arrangement area 634. The image for compositing is composed on the area of the floor surface in the whole-body image. The image for compositing imitates the floor surface where wooden boards are arranged so as to extend along the depth direction.

As described above, as the image for compositing composed on the area of the floor surface in the whole-body image, the image for compositing which has a pattern emphasizing the depth of the floor surface. It is thereby possible for the shooting space to be seen as if the shooting space has depth in the whole-body image.

Note that, the chroma key processing performed to the floor surface is also performed in the whole-body shooting performed in the shooting processing of the two-persons course or the large-number-persons course.

In this case, the chroma key processing to the floor surface may be performed, for example, according to the selected shooting course ("close-up+front whole-body course" or "close-up+whole-body from above course"). Furthermore, the chroma key processing may be performed (or may not be performed) to all of the back surface, the side surfaces, and the floor surface.

Furthermore, when the whole-body shooting is performed a plurality of times, the chroma key processing to the floor surface may be performed (or may not be performed) to a predetermined number of whole-body images among the obtained whole-body images, and the chroma key processing to all of the back surface, side surface, and the floor surface may be performed (or may not be performed) to the rest of whole-body images. For example, when the whole-body shooting is performed three times, the chroma key processing to the floor surface is performed to the first whole-body shooting. Then, the chroma key processing to all of the surfaces is performed to the second and third whole-body shootings.

Moreover, the chroma key processing to the floor surface may be performed according to the number of users. More specifically, since the floor surface area in the shot image becomes smaller when the number of the users is larger, the chroma key processing to the floor surface is not performed. On the other hand, the chroma key processing to the floor surface is performed when the number of the users is smaller.

Furthermore, when the whole-body shooting is performed, but the entire floor surface is not in the image shooting range according to the tilt angle of the camera 91, the chroma key processing to the floor surface may not be performed. When the whole-body from above shooting is performed, since the entire floor surface is in the image shooting range, the chroma key processing to the floor surface may be performed.

Note that, the chroma key processing to the floor surface may be performed not only to the shot image obtained by the whole-body shooting, but also to the live view image displayed in the image display area 641 on the live view display screen of FIG. 41. Moreover, the chroma key processing to the floor surface may be performed to the model image arranged on the shot image arrangement area 634 in the sticker layout image 621 of FIG. 40.

In the above description, the chroma key processing is performed to the floor surface in the shot image. On the other hand, the chroma key processing may be performed to, not limited to the floor surface, surfaces besides the back surface.

For example, when the shooting is performed at the predetermined elevation angle of the camera 91, the chroma key processing is performed to the ceiling surface. Furthermore, when the image shooting range (field angle) of the camera 91 is set widely, the chroma key processing is performed to the side surfaces, the floor surface, and the ceiling surface besides the back surface. In this case, the colors between the green floor surface and the white-based side surfaces are different. Therefore, the chroma key processing is performed to the respective areas using the respective colors as a key. It is thereby possible to provide a shot image having a fresh finish different from a conventional image.

In the sticker layout image of FIG. 42, the shot image arrangement areas 635 and 636, on which the model images corresponding to the shooting to be performed next are displayed, are highlighted.

As described above, the image in which a part including the face of the model and the image in which a part including the legs of the model which are trimmed from one whole-body image are arranged on the respective shot image arrangement areas 635 and 636.

Figure 43:
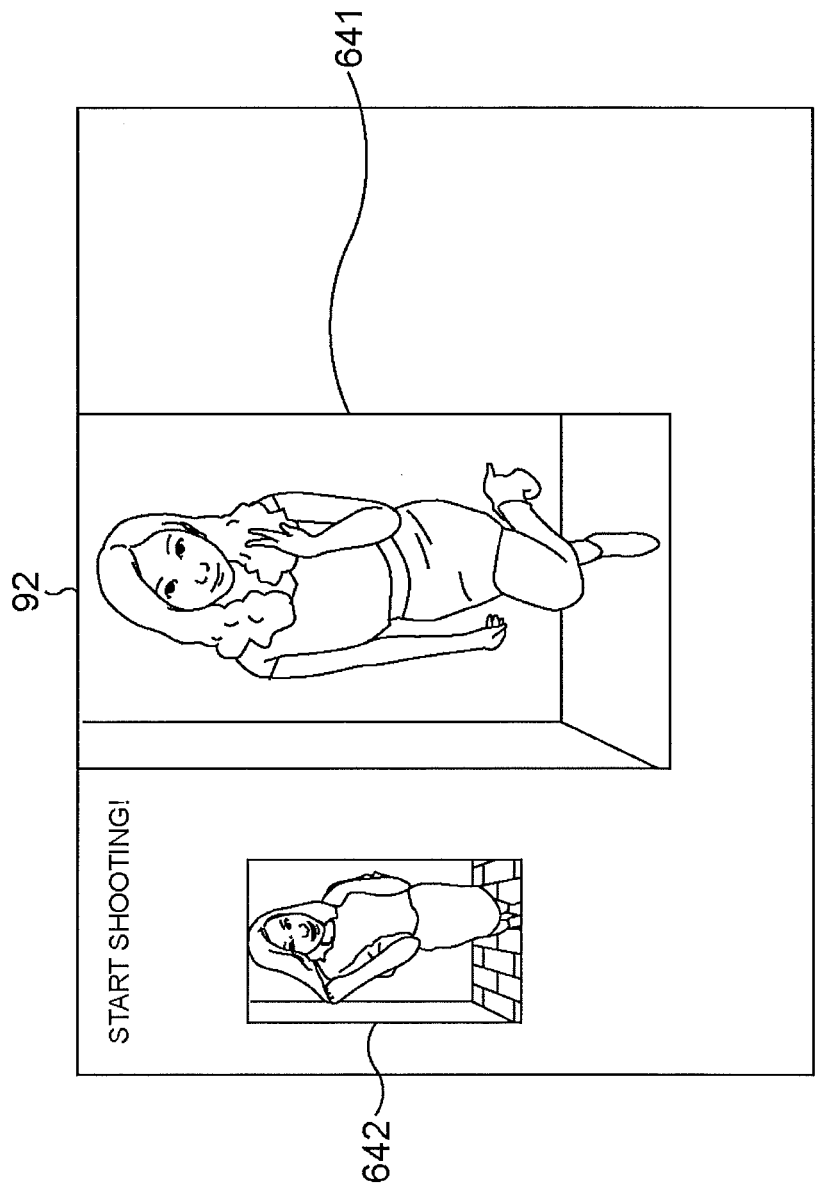
FIG. 43 is a diagram illustrating an example of a live view display screen.

FIG. 43 is a diagram illustrating an example of a live view display screen corresponding to the shot images to be arranged on the arrangement areas 635 and 636 in the whole-body shooting.

On the upper-left part of the live view display screen, a message "Start shooting!" is displayed. On the image display area 641 provided in substantially the center of the live view display screen, the moving image, in which the single user appears, is displayed in real time. Furthermore, on the model image display area 642 provided on the left side of the image display area 641, the model image is displayed.

The user adjusts the position of one's body to fit the whole-body inside the image display area 641, with reference to postures of the model image on the model image display area 642 and checking the display of the image display area 641.

After the live view image is displayed for a predetermined time, a countdown to the shooting is started. Then, at the timing of the shooting, the shooting control section 323 performs the whole-body shooting. Moreover, the shooting control section 323 trims an area including the face of the user and an area including the legs of the user from the whole-body image obtained by one whole-body shooting. In this manner, the shooting control section 323 generates the image including the face of the user and the image including the legs of the user as a predetermined body part other than the face of the user. Note that, the image including the legs of the user may be obtained by a method other than the above described manner to be generated by trimming. For example, the person area in the shot image is extracted by the chroma key processing, and the about lower half (or about two thirds) of the extracted person area may be the image including the legs of the user.

As describe above, the shooting in the image shooting range set to the shot image arrangement areas 635 and 636 in the sticker layout image 621 is performed. As a result, the sticker layout image 661 in which the shot images are arranged on the respective shot image arrangement areas 671 to 676 as illustrated in FIG. 44 is generated.

Figure 44:
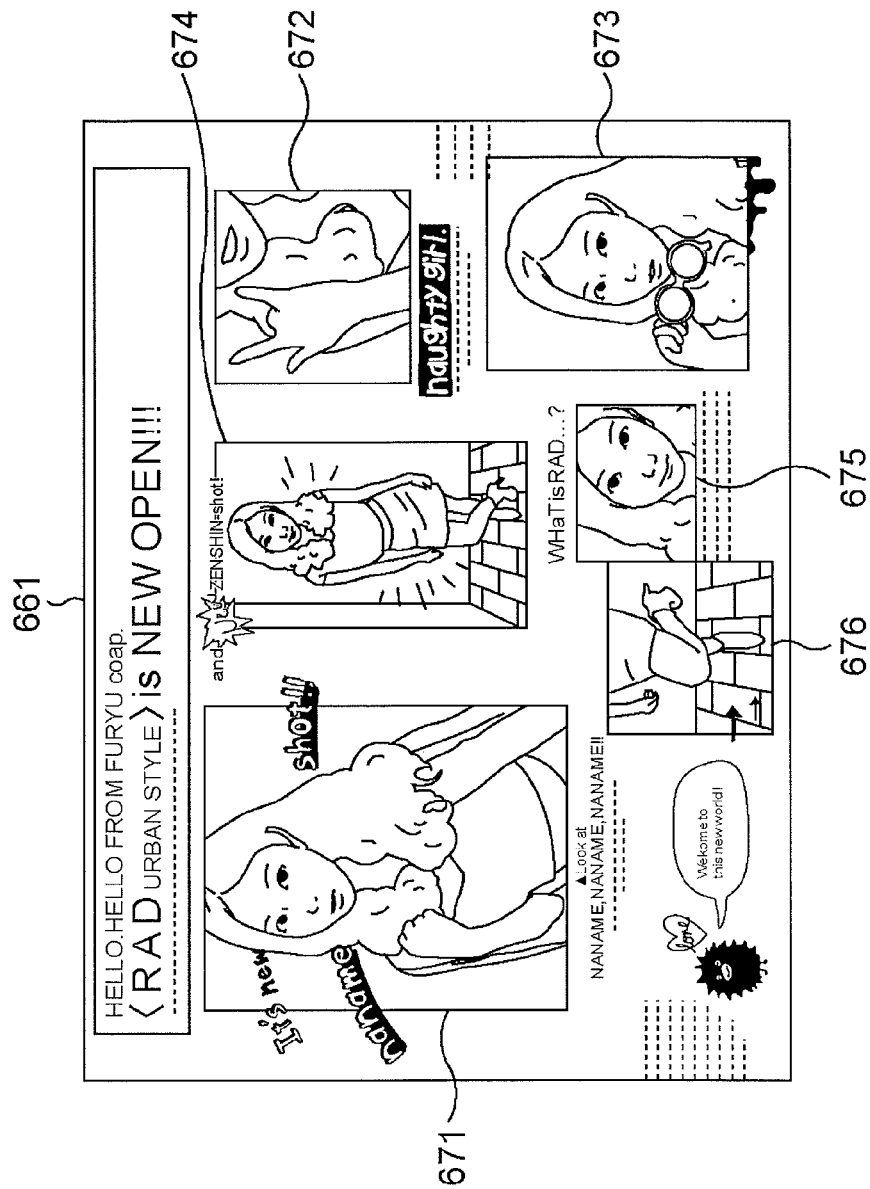
FIG. 44 is a diagram illustrating an example of a sticker layout image.

In the sticker layout image 661 of FIG. 44, on the shot image arrangement area 675, the image including the face of the user obtained by the whole-body shooting is arranged. Furthermore, on the shot image arrangement area 676, the image including the legs of the user is arranged. Note that, the image to be arranged on the shot image arrangement area 675 and the image to be arranged on the shot image arrangement area 676 are the same size.

In the whole-body shooting, since the whole-body of the user is shot, the entire coordinated outfit of the user can remain in the image. Furthermore, in the close-up shooting, since the upper half of the body is shot, a shirt or a cardigan in the coordinated outfit of the user can remain in the image. On the other hand, with the above described shooting, the image including the legs of the user is generated in addition to the image including the face of the user, and it is possible for an unconventional part, such as pants, a skirt, or shoes, in the coordinated outfit of the user to remain in one image.

As described above, the shot image in which the predetermined body part other than the face of the user appears is generated, and it is possible to provide an unconventional new image.

Note that, in order for the user to grasp which area of the whole-body image is trimmed, a frame to indicate the trimmed area may be displayed on the image display area 641 on the live view display screen (FIG. 43).

Figure 45:
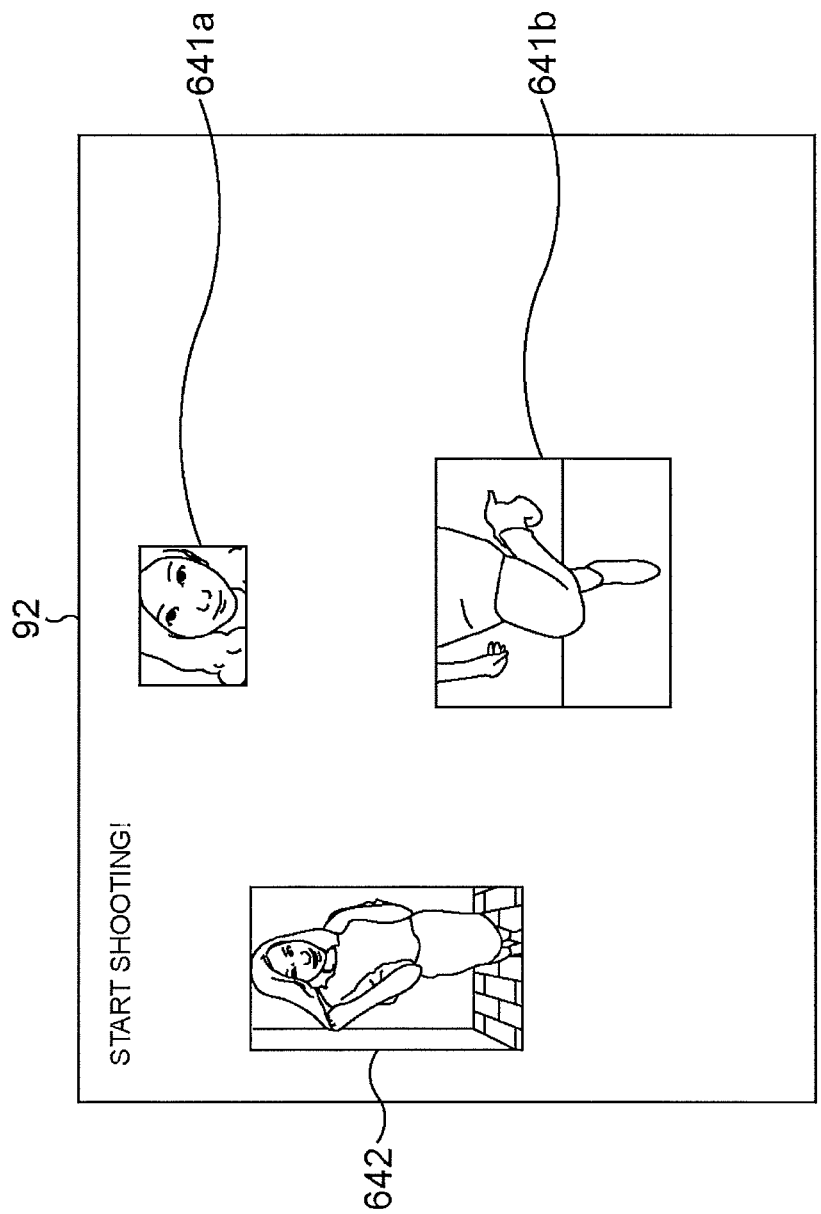
FIG. 45 is a diagram illustrating an example of a live view display screen.

Furthermore, as illustrated in FIG. 45, a live view display screen having image display areas 641*a* and 641*b* may be displayed instead of the image display area 641. The image display area 641*a* is to display the live view image including the face of the user, and the image display area 641*b* is to display the live view image including the legs of the user.

Note that, the images to be arranged on the shot image arrangement areas 675 and 676 may be different in sizes or shapes according to the trimmed part. For example, the image including the face of the user is a landscape rectangular, and the image including the legs of the user is a portrait rectangular.

Figure 46:
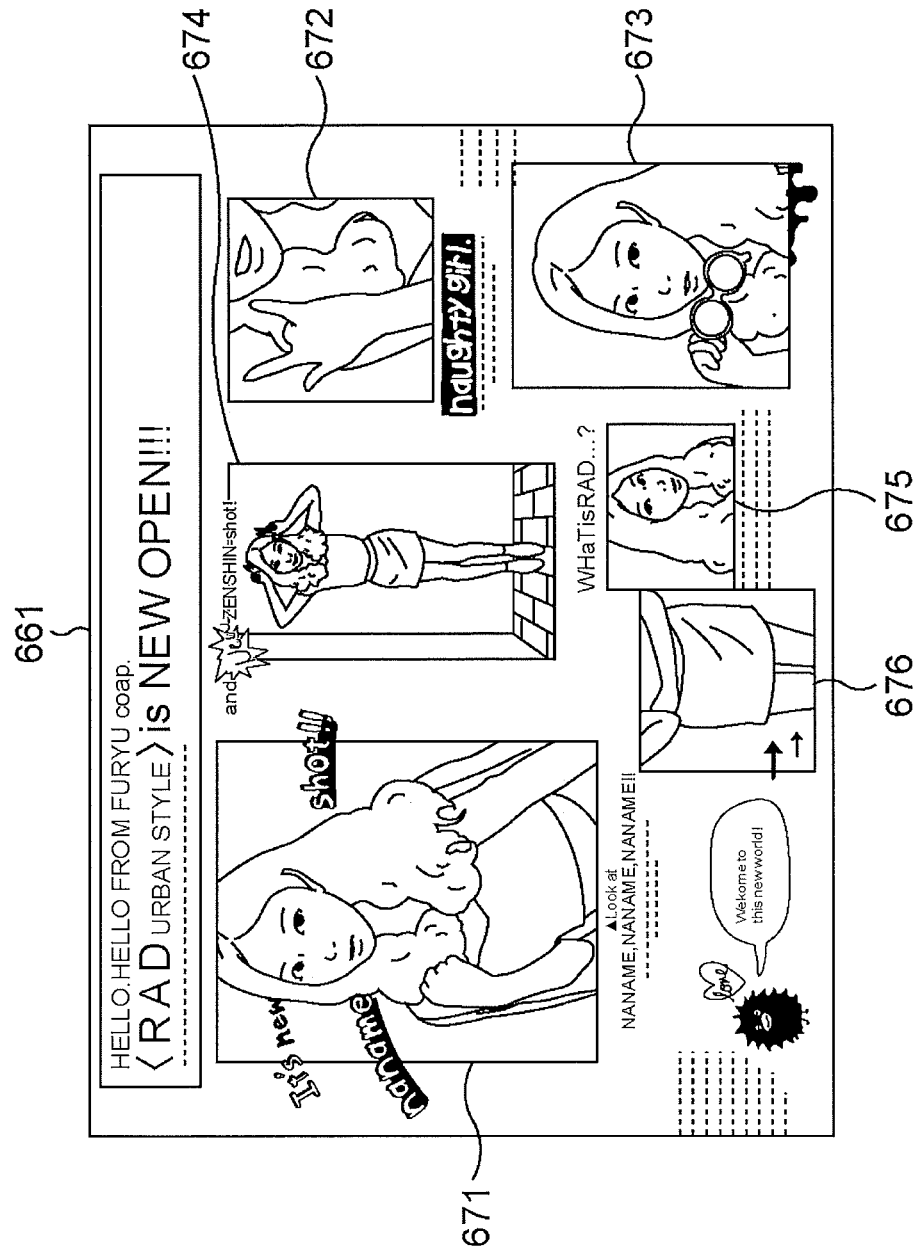
FIG. 46 is a diagram illustrating an example of a sticker layout image.

Furthermore, in the above description, the images to be arranged on the shot image arrangement areas 674, 675, and 676 of the sticker layout image 661 are obtained by the whole-body from above shooting. On the other hand, the images to be arranged on the shot image arrangement areas 674, 675, and 676 may be obtained by the front whole-body shooting similar to the sticker layout image 661 illustrated in FIG. 46. It is thereby possible to provide a sticker layout image with different finish in the same sticker layout image design.

Moreover, the three or more shot images may be generated by one whole-body shooting. For example, three images of the image in which the face of the user appears, the image in which the upper half of the body besides the face appears, and the image in which the lower half appears may be generated.

Moreover, when a plurality of shot images is generated by one whole-body shooting, the user may select the shot images to be arranged in the sticker layout image at the end. It is thereby possible to provide a more desirable image for the user.

Furthermore, in the above description, a plurality of shot images is generated by one whole-body shooting in the shooting processing of the one-person course. Similarly, a plurality of shot images may be generated by one whole-body shooting in the shooting processing of the two-persons course or the large-number-persons course.

In this case, a plurality of shot images is generated for each user. For example, when there are two users, four images of the image which the face of one user appears, the image in which the legs of the one user appears, the image in which the face of the other user appears, and the image in which the legs of the other user appears are generated. Furthermore, images in which different parts appear for each user may be generated. For example, when there are two users, the images in which the face of one user appears, the image in which the legs of the one user appears, the image in which the face of the other user appears, and the image in which the waist of the other user appears are generated. Moreover, images having different shapes for each user may be generated. For example, the shape of the trimmed area is changed according to the posture or the body of each user.

Moreover, in the above description, the predetermined area is trimmed from the whole-body image. However, the area to be trimmed may be selected by the user. For example, first, the guidance such as "What's the point of your today's outfit!" is output. Then, after the area to be trimmed from the shot image obtained by the first whole-body shooting of two whole-body shootings is selected by the user, the second whole-body shooting is performed. It is thereby possible for the part which the user wants to show off in one's coordinated outfit to remain in the image.

Note that, the image including the face of the user and the image including a predetermined body part (a breast or arms) other than the face of the user may be generated not from the whole-body image, but from the close-up image.

Figure 35:
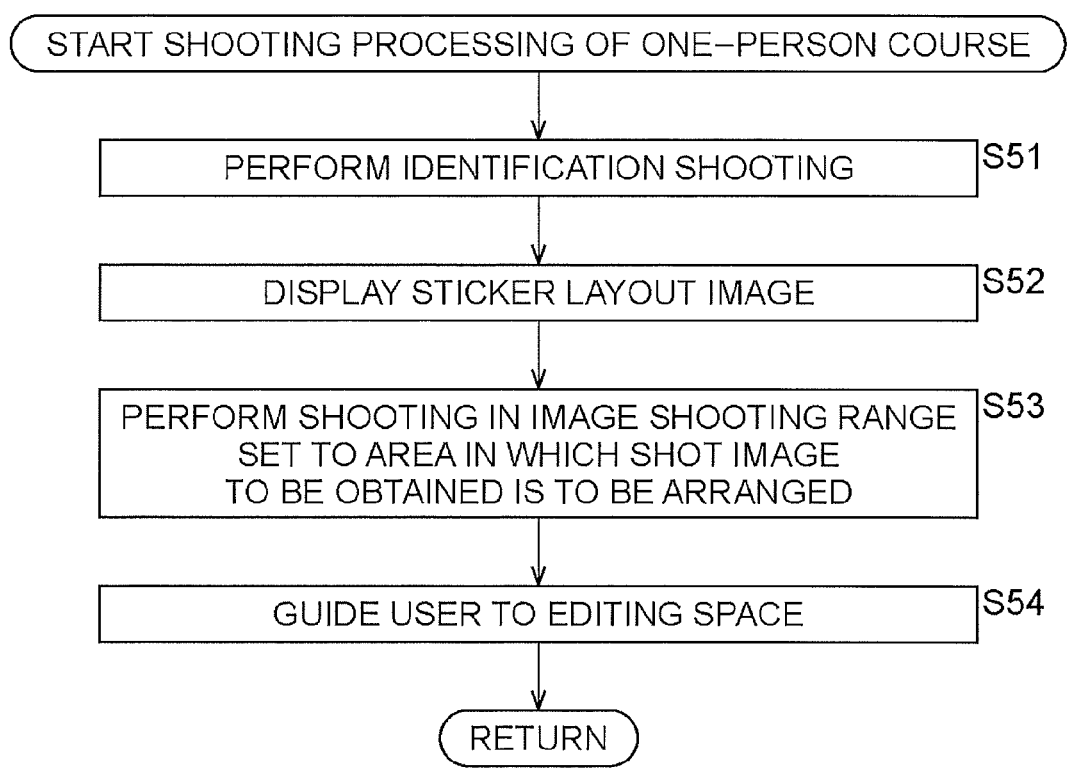
FIG. 35 is a flowchart describing shooting processing of a one-person course.

Now, returning to the flowchart of FIG. 35, when the shooting is performed the number of times according to the number of shot image arrangement areas in the sticker layout image in the above described manner, the processing proceeds to step S54. In step S54, the guidance outputting control section 324 guides the user who has completed the shooting to the editing space A2-1 or the editing space A2-2. The guide to the editing space is performed by displaying a guide screen on the touch panel monitor 92 or by outputting sound from the speaker 233.

Note that, when a plurality of same shot images is arranged in the sticker layout image, the number of shootings is different from that of the shot image arrangement areas.

Furthermore, the sticker layout images, in which the number of the images to be arranged is, for example, five images, six images, or seven images, are prepared. In this case, a user who wants to arrange many images can select the sticker layout image in which seven images are to be arranged. On the other hand, a user who wants larger shot images printed on the sticker sheet at the end can select the sticker layout image in which five images are to be arranged.

Naturally, since user's impression of each of the sticker layout images is different, a user can select a sticker layout image in terms of design.

Note that, the composed image in which the shot image is arranged and composed on the sticker layout image is printed on the sticker sheet and transmitted to the mobile terminal of the user via a server.

<Details of Editing Processing>

Figure 47:
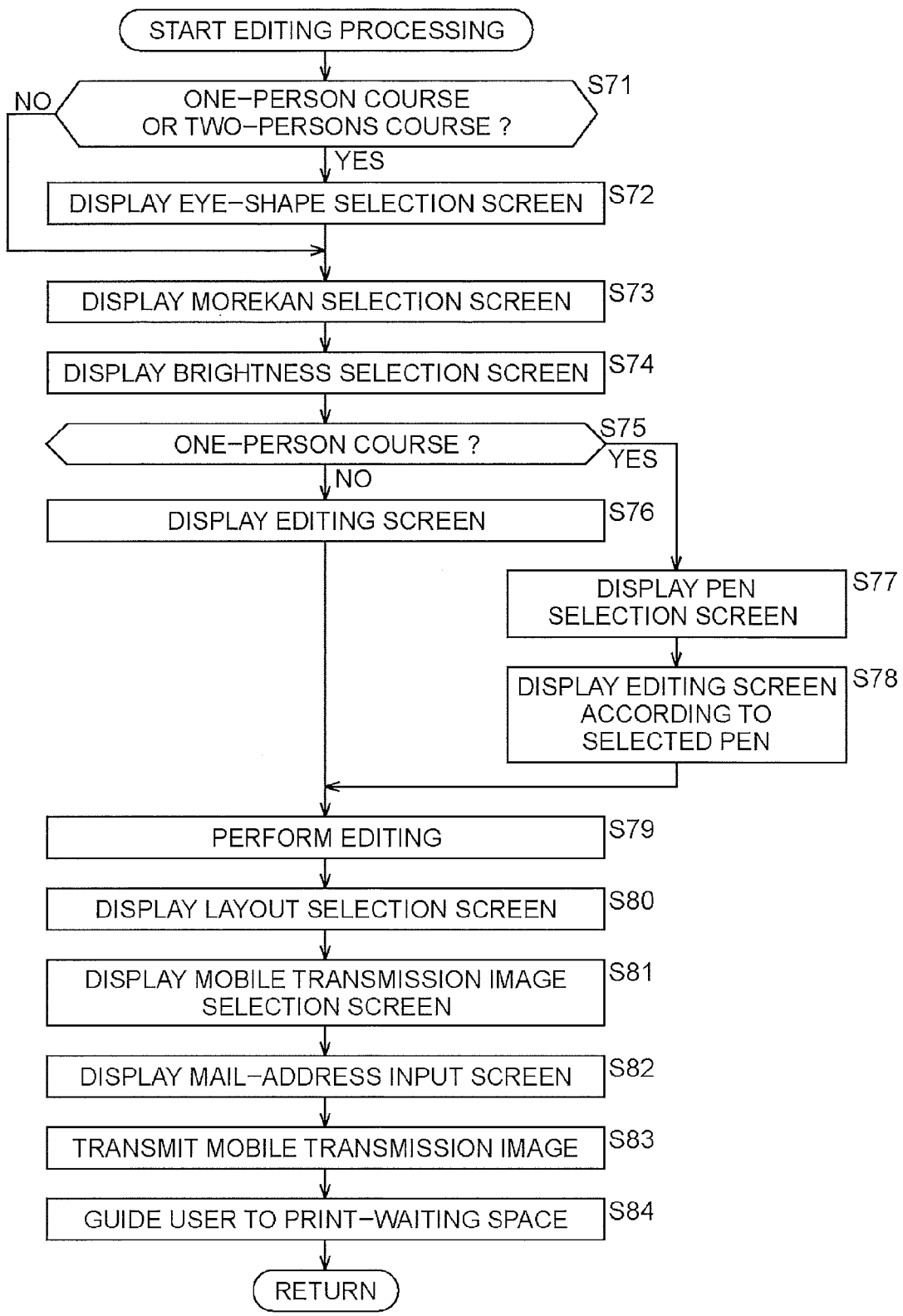
FIG. 47 is a flowchart describing editing processing.

Next, details of editing processing in step S4 in the above described series of processing of the photo sticker creation game will be described with reference to the flowchart of FIG. 47. Note that, regardless of the course by person-number selected in the pre-service processing, the similar editing processing is basically performed.

In step S71, the editing processing section 303 determines whether the course by person-number is the one-person course or the two-persons course.

When the course by person-number is the one-person course or the two-persons course, the guidance outputting control section 335 displays a screen for explaining how to select a shape of eyes on the tablet built-in monitor 131. Then, the processing proceeds to step S72, the display control section 331 displays an eye-shape selection screen on the tablet built-in monitor 131.

On the eye shape selection screen, a plurality of face images which has different shapes of eyes is displayed. These face images are generated by performing a plurality of types of image processing (eye-shape changing processing) to the area of the eyes of the user in the identification image obtained by the identification shooting in order to change the shapes of the eyes. Note that, the images displayed on the eye-shape selection screen are not only the face images but also eye images which have different shapes and includes at least an eye area to which the eye-shape changing processing is to be performed.

By each of the users, when any one of the face images displayed on the eye-shape selection screen is selected, the input receiving section 332 receives the selection. Then, the image processing section 333 performs the eye-shape changing processing performed to the selected face image to the respective shot images obtained by the shooting processing.

Note that, when the course by person-number is the large-number-persons course, step S72 is skipped and the eye-shape selection screen is not displayed.

When the shape of eyes is selected or the editing processing of the large-number-persons course is started, the guidance outputting control section 335 displays a screen for explaining how to select "Morekan" on the tablet built-in monitor 131. Then, in step S73, the display control section 331 displays a Morekan selection screen on the tablet built-in monitor 131.

Note that, the "Morekan" indicates the degree of exaggeration to exaggerate (flatter) an impression of appearance, such as a size of eyes, a size of a face, and thickness of eyelashes.

On the Morekan selection screen, a plurality of face images having a different size of eyes, a different size of a face, and different thickness of eyelashes, is displayed. These face images are generated by performing a plurality of types of image processing (Morekan changing processing) to the areas of the eyes and the face of the user in the identification image obtained by the identification shooting in order to change the size of eyes, the size of the face, and the thickness of the eyelashes. Note that, a plurality of face images displayed here may be generated by performing the Morekan changing processing to the model images.

When any one of the face images displayed on the Morekan selection screen is selected by the user, the input receiving section 332 receives the selection. Then, the image processing section 333 performs the Morekan changing processing performed to the selected face image to the respective shot images obtained by the shooting processing.

With the Morekan changing processing, various types of processing individually performed to the face and each of the face organs can be combined and collectively performed. Therefore, with the Morekan changing processing, compared with the case in which the various types of image processing individually performed to the face and each of the face organs is performed by selecting the image processing one by one by the user, it is possible to save user's trouble for the selection and is also possible to shorten the working time.

When the Morekan is selected, the guidance outputting control section 335 displays a screen for explaining how to select brightness on the tablet built-in monitor 131. Then, in step S74, the display control section 331 displays a brightness selection screen on the tablet built-in monitor 131.

On the brightness selection screen, for example, a plurality of shot images obtained by the shooting processing, a plurality of brightness selection buttons, and a confirmation button are displayed. The brightness selection button is used to select the brightness of skin. The confirmation button is used to confirm the brightness selected by the brightness selection button.

When any one of the brightness selection buttons displayed on the brightness selection screen is selected by the user, the input receiving section 332 receives the selection. Then, the image processing section 333 detects the area of the skin of the person from the shot image and adjusts the brightness of the detected area according to the selected brightness selection button.

When the confirmation button is operated on the brightness selection screen, the guidance outputting control section 335 displays a screen for explaining how to proceed with the editing work on the tablet built-in monitor 131.

Then, in step S75, the editing processing section 303 determines whether or not the course by person-number is the one-person course.

When the course by person-number is not the one-person course, the processing proceeds to step S76. In step S76, the display control section 331 displays the editing screen on the tablet built-in monitor 131.

On the other hand, when the course by person-number is the one-person course, the processing proceeds to step S77. In step S77, the display control section 331 displays the pen selection screen on tablet built-in monitor 131. The pen selection screen is used for a single user to select which stylus pen 132A or 132B to be used.

On the pen selection screen, when either stylus pen 132A or 132B is selected, the processing proceeds to step S78. In step S78, the display control section 331 displays the editing screen according to the selected stylus pen on the tablet built-in monitor 131.

Although the detail will be described later, a different editing screen is displayed in the two-persons course and the large-number-persons course and in the one-person course.

In step S79, when the input receiving section 332 receives the editing work to the shot image displayed on the editing screen, the editing section 334 edits the shot image.

When the editing work is completed, in step S80, the display control section 331 displays the layout selection screen on the tablet built-in monitor 131. Then, the input receiving section 332 receives a selection instruction of the number of divisions of the sticker sheet by the user. Note that, when the course by person-number is the one-person course, step S80 is skipped.

In step S81, the display control section 331 displays a mobile transmission image selection screen on the tablet built-in monitor 131. Then, the input receiving section 332 receives the user's instruction to select, for example, a shot image as a mobile transmission image. Note that, not only the shot image but also the edited image may be selected as the mobile transmission image. Furthermore, the number of images to be selected as the mobile transmission images is not limited to one image and may be two or more images.

In step S82, the display control section 331 displays the mail-address input screen on the tablet built-in monitor 131. Then, the input receiving section 332 receives an input of the mail-address of the mobile terminal of the user. Note that, when the course by person-number is the one-person course, step S82 is skipped.

Then, when a predetermined time has passed or a finish button is operated, the processing proceeds to step S83. In step S83, the communication control section 336 transmits all of the images including the image selected by the user as mobile transmission images and the mail-address input by the user to a server via a network, such as the Internet, by controlling the communication section 203. The server is administered by, for example, the manufacture of the photo sticker creating device 1.

The server sends, to the mail-address input by the user, a mail containing a necessary uniform resource locator (URL) for a mobile terminal to access. Then, when the mobile terminal of the user accesses the server through a network based on the URL, the mobile transmission image transmitted to the server is provided to the mobile terminal.

Thereafter, in step S84, the guidance outputting control section 335 guides the user who has completed the editing work to the print-waiting space A3. The guide to the print-waiting space A3 is performed by displaying a guide screen on the tablet built-in monitor 131 of the editing section 210 or by outputting sound from the speaker 241.

<Example of Editing Screen>

Here, an example of the editing screen displayed in the editing processing of FIG. 47 will be described.

(Editing Screen of Two-Persons Course or Large-Number-Persons Course)

Figure 48:
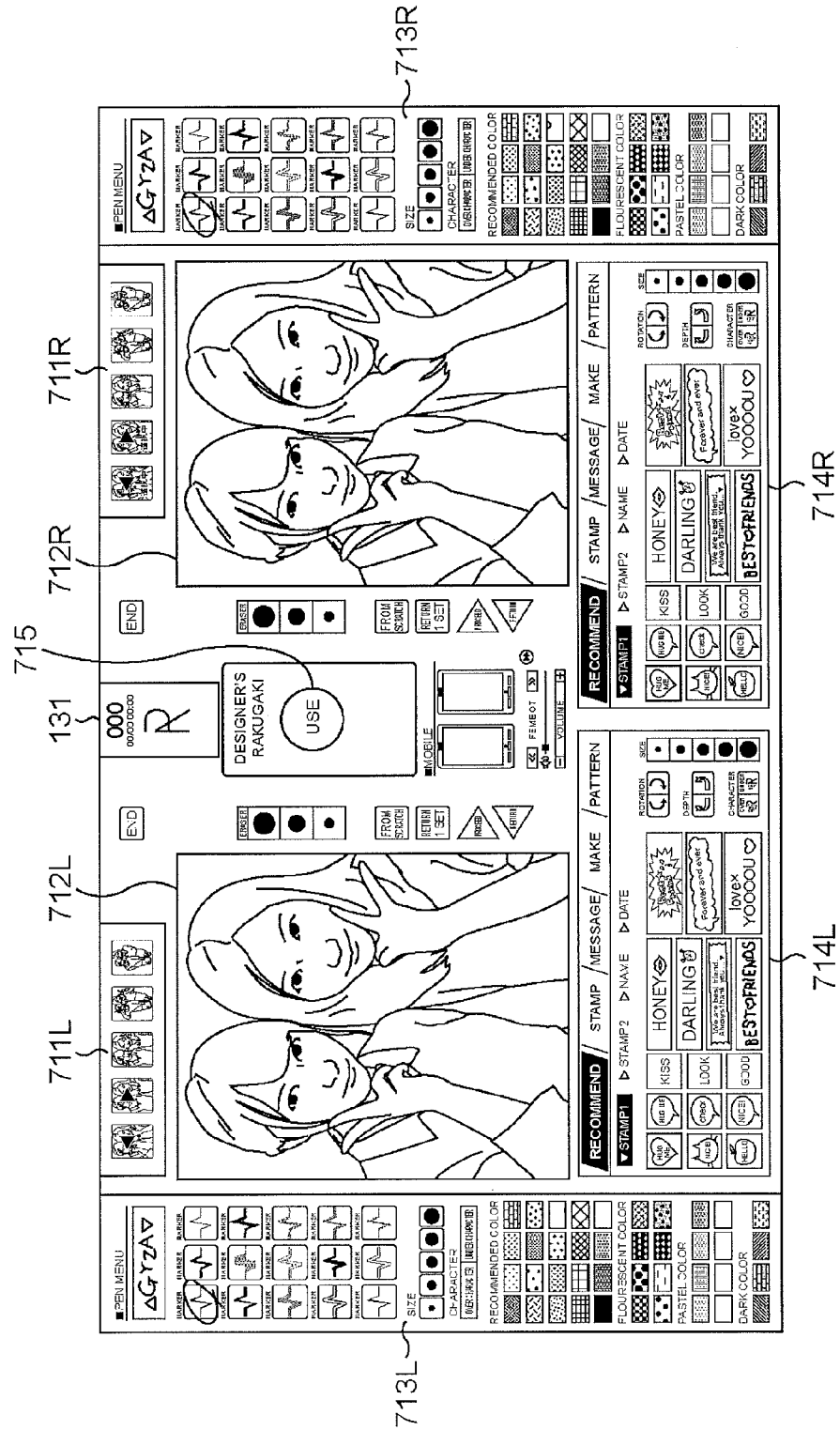
FIG. 48 is a diagram illustrating an example of an editing screen of the two-persons course or the large-number-persons course.

First, with reference to FIG. 48, an example of the editing screen of the two-persons course or the large-number-persons course will be described.

The editing screen of the two-persons course or the large-number-persons course is basically configured such that main configurations are symmetrically provided. A left-half area is used by the user on the left side facing the tablet built-in monitor 131. A right-half area is used by the user on the right side facing the tablet built-in monitor 131. On a central area, a remaining time of the editing processing and the like are displayed. Hereinafter, the left-half area of the editing screen will be mainly described.

On the upper-center part of the left-half area, a thumbnail image display area 711L is provided. The thumbnail image display area 711L is for displaying thumbnail images indicating the shot images. By selecting a thumbnail image displayed on the thumbnail image display area 711L, the user can select the editing target shot image.

On substantially the center of the left-half area, an editing area 712L is provided. The editing area 712L is for displaying the shot image selected to edit. By selecting an editing tool (images for compositing, such as pen images and stamp images) with the stylus pen 132A, the user can perform the editing work to the shot image displayed on the editing area 712L.

On the left side of the editing area 712L, a pen palette display area 713L is provided. The pen palette display area 713L is for displaying a pen palette to select a pen image (hereinafter, referred to as a pen tool) used for a handwriting input. On the pen palette display area 713L, a plurality of buttons to select a type of line, a thickness, and a color of the pen image is displayed. The pen palette of the pen palette display area 713L remains displayed while the editing screen is displayed.

On the lower side of the editing area 712L, an editing palette display area 714L is provided. The editing palette display area 714L is for displaying an editing palette to select various editing tools (images for compositing), mainly stamp images (hereinafter, referred to as a stamp tool) and the like. The images for compositing displayed on the editing palette are categorized. By selecting a tab to which each of the category names is attached, the images for compositing displayed on the editing palette display area 714L are switched.

Conventionally, the pen images are displayed in a tab in the editing palette together with other editing tools. However, in this example, by independently displaying the pen palette, it is possible to save user's trouble for switching the tabs when a type of line, a thickness, and a color of the pen image is selected.

On a central area of the editing screen, a one touch editing button 715 is provided. The one touch editing button 715 is operated when the one touch editing is performed. The one touch editing is a function to perform the editing work of contents set in advance with a single operation. By operating the one touch editing button 715, predetermined images for compositing are collectively composited on the shot image. A user who is not accustomed to the editing work can thereby finish the editing work easily.

On the right-half area of the tablet built-in monitor 131, the same configuration as the above described left-half area is basically symmetrically arranged.

With the editing screen, two users can perform the editing work at the same time.

Here, examples of the editing tools displayed in the editing palette on the editing palette display area 714L (714R) will be described.

(First Example of Stamp Tool)

Figure 49:
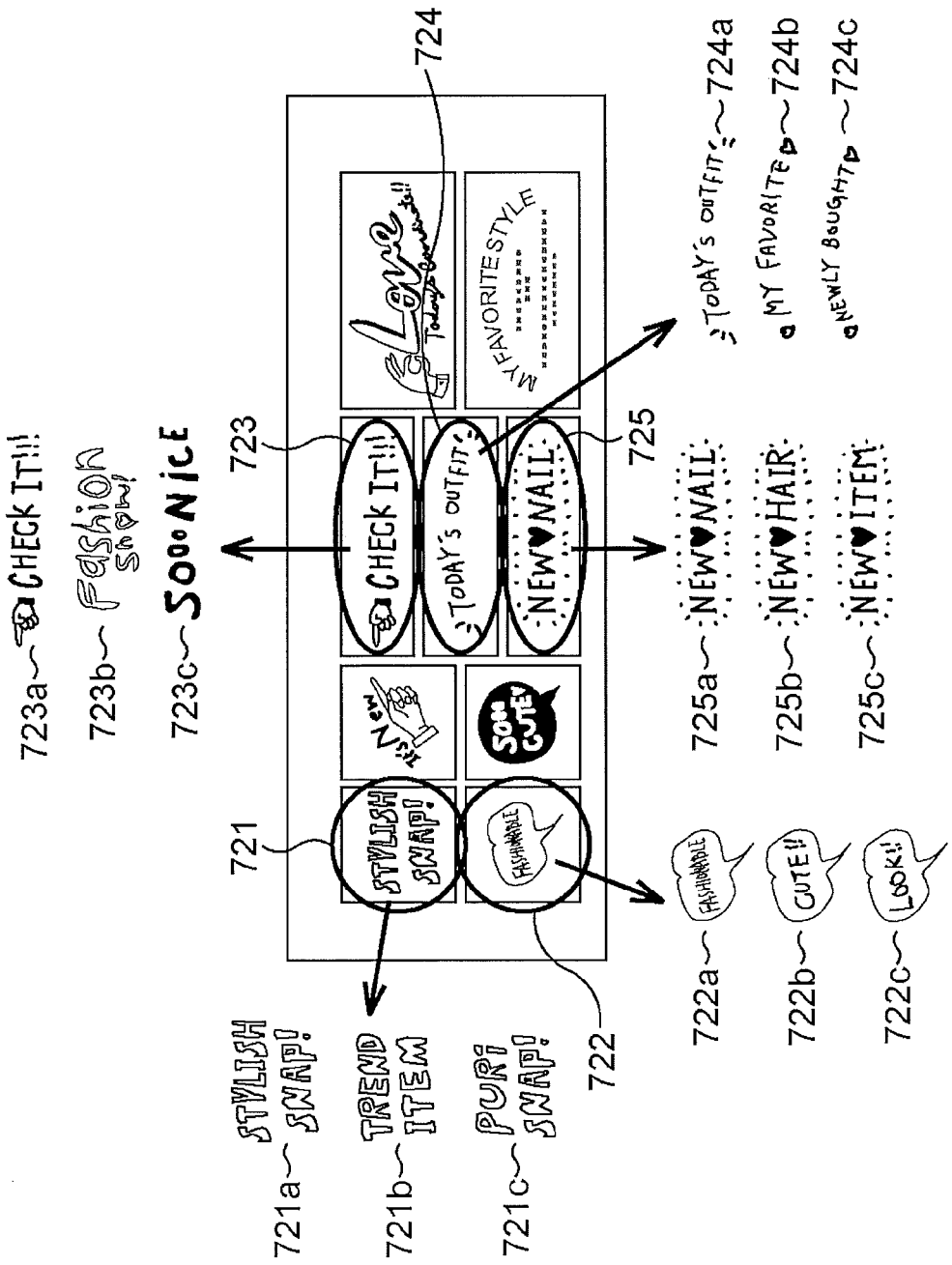
FIG. 49 is a diagram illustrating an example of a stamp tool.

FIG. 49 is examples of stamp tools which change every time the display is pushed with the stylus pens 132A and 132B in the editing palette.

Among the stamp tools illustrated in FIG. 49, the display of the stamp tool 721 is changed in the order of a stamp tool 721a, a stamp tool 721b, and a stamp tool 721c every time the display is pushed with the stylus pens 132A and 132B.

The display of a stamp tool 722 is changed in the order of a stamp tool 722a, a stamp tool 722b, and a stamp tool 722c every time the display is pushed with the stylus pens 132A and 132B.

The display of a stamp tool 723 is changed in the order of a stamp tool 723a, a stamp tool 723b, and a stamp tool 723c every time the display is pushed with the stylus pens 132A and 132B.

The display of a stamp tool 724 is changed in the order of a stamp tool 724a, a stamp tool 724b, and a stamp tool 724c every time the display is pushed with the stylus pens 132A and 132B.

The display of a stamp tool 725 is changed in the order of a stamp tool 725a, a stamp tool 725b, and a stamp tool 725c every time the display is pushed with the stylus pens 132A and 132B.

As described above, the stamp tools, in which the characters are changed while the basic design remains unchanged every time the display is pushed with the stylus pens 132A and 132B in the editing palette, are prepared. It is thereby possible to provide more stamp tools to the user without expanding the display area of the editing palette.

(Second Example of Stamp Tool)

Figure 50:
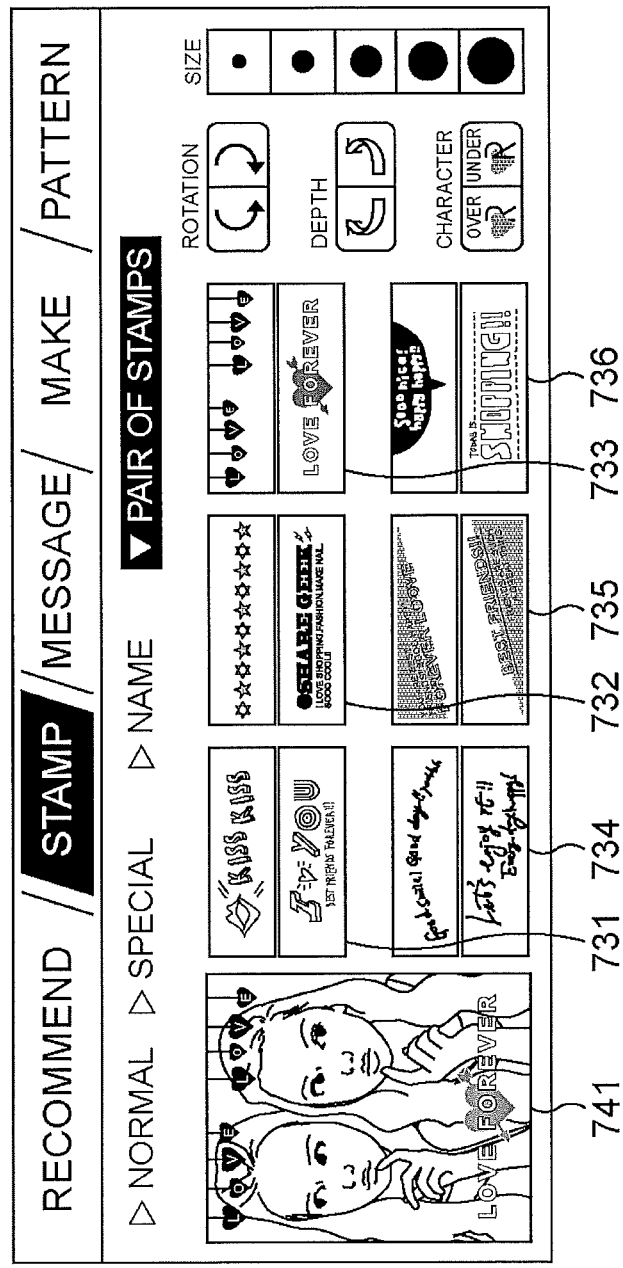
FIG. 50 is a diagram illustrating an example of a stamp tool.

FIG. 50 is examples of the stamp tools which are simultaneously composed on the upper end area and the lower end area of the shot image.

Each of stamp tools 731 to 736 illustrated in the editing palette of FIG. 50 is a pair of an upper stamp and a lower stamp. The upper stamp is the stamp tool to be composed on the upper end area of the shot image. The lower stamp is the stamp tool to be composed on the lower end area of the shot image. A pair of the upper stamp and the lower stamp has a sense of unity of these designs.

Figure 51:
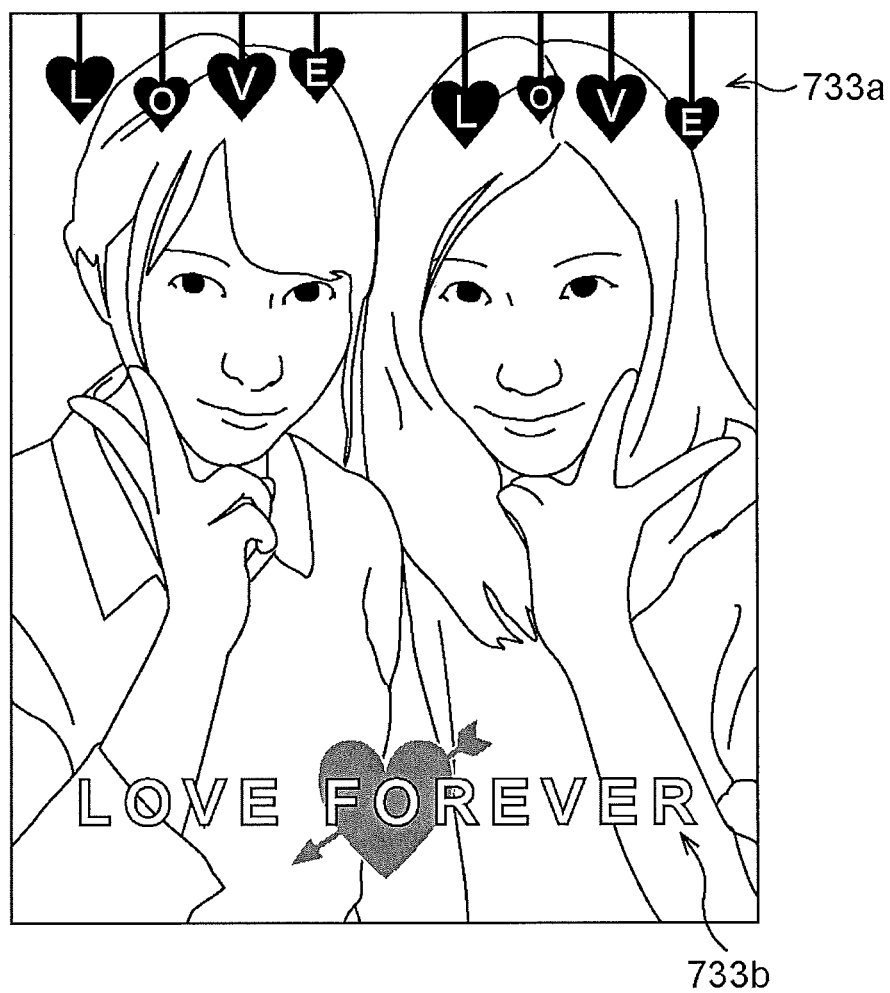
FIG. 51 is a diagram illustrating a composition example of a stamp tool.

In the editing palette of FIG. 50, on the left side of the stamp tools 731 to 736, a model image 741 is displayed. The stamp tool selected from the stamp tools 731 to 736 is composed on the model image 741. In the example of FIG. 50, the stamp tool 733 is selected, and the upper stamp and the lower stamp are composed on the model image 741. At this time, the upper stamp and the lower stamp of the stamp tool 733 are composed on the editing target shot image to be displayed in the editing area 712L (712R). More specifically, as illustrated in FIG. 51, the upper stamp 733a and the lower stamp 733b constituting the stamp tool 733 are automatically composed on the upper end area and the lower end area of the shot image respectively. Note that, the editing target shot image may be displayed instead of the model image 741 in the editing palette of FIG. 50.

As described above, the upper stamp and the lower stamp are automatically composed on the upper end area and the lower end area of the shot image respectively. It is thereby possible to save user's trouble for adjusting the position to compose each of the upper stamp and the lower stamp on the shot image. Moreover, it is possible for the upper stamp and the lower stamp to be more reliably composed on the appropriate area of the shot image.

Note that, besides the above described upper stamp and the lower stamp, stamp tools configured with a left stamp and a right stamp which are respectively composed on the left end area and the right end area of the shot image, and stamp tools configured with a upper-left stamp and a lower-right stamp (or an upper-right stamp and a lower-left stamp) which are composed on the diagonal areas of the shot image may be prepared.

Moreover, as the stamp tools configured with the above described pair of stamps, a large stamp and a small stamp which are different in sizes may be prepared. For example, a crescent-shaped stamp tool for the large stamp and a star-shaped stamp tool for the small stamp are prepared. The crescent-shaped large stamp is composed on the left end area of the shot image, and the star-shaped small stamp is composed on the right end area of the shot image.

(Third Example of Stamp Tool)

Figure 52:
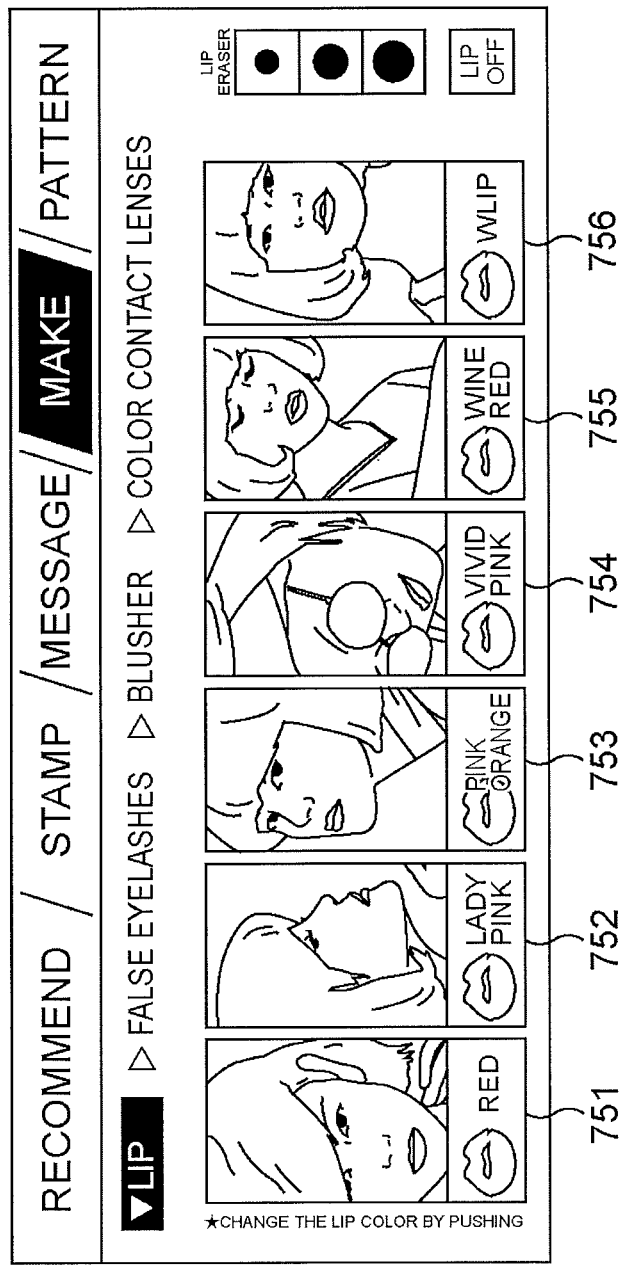
FIG. 52 is a diagram illustrating an example of a stamp tool.

FIG. 52 is examples of lip tools which is the stamp tool to be composed on the lips of the user in the shot image.

In the editing palette of FIG. 52, model images 751 to 756 are displayed. The model images 751 to 756 are used to select a color from the different colors of the lip tools.

More specifically, when the model image 751 is selected, a red lip image (the image imitating lips) is composed on the lips of the user in the editing target shot image. When the model image 752 is selected, a pale pink lip image is composed on the lips of the user in the editing target shot image. When the model image 753 is selected, an orange-tinged pink lip image is composed on the lips of the user in the editing target shot image.

Furthermore, when the model image 754 is selected, a deep pink lip image is composed on the lips of the user in the editing target shot image. When the model image 755 is selected, a wine red lip image is composed on the lips of the user in the editing target shot image. When the model image 756 is selected, a bicolor lip image (for example, red and deep pink) is composed on the respective upper lip and lower lip of the user in the editing target shot image.

In the respective model images 751 to 756, the models shot in different camera angles are displayed. On the lips of each of the models, the corresponding color lip image is composed.

Conventionally, the same model image has been used for the model image on which a different stamp tool is composed. However, as the example of FIG. 52, by using the different model image for each of the stamp tools, it is possible to renew the appearance of the editing palette.

(Editing Screen of One-Person Course)

Next, an example of the editing screen of the one-person course will be described.

As described above, when the course by person-number is the one-person course, the editing screen according to the stylus pen selected by the user on the pen selection screen is displayed.

FIG. 53 is a diagram illustrating an example of the pen selection screen.

On the upper part of the pen selection screen, a message "Select either pen to scribble" is displayed. In substantially the center of the pen selection screen, a message "Touch the display with a pen at your dominant hand side!" is displayed. On the both right and left sides of the message, selection buttons 761 and 762 are displayed. The selection button 761 is used to select the stylus pen 132A (FIG. 11) provided on the left side facing the tablet built-in monitor 131. The selection button 762 is used to select the stylus pen 132B (FIG. 11) provided on the right side facing the tablet built-in monitor 131. In this state, both of the stylus pens 132A and 132B are valid (available).

When a right-handed user selects the selection button 762 with the stylus pen 132B on the pen selection screen, the stylus pen 132A becomes invalid. Then, a first editing screen illustrated in FIG. 54 is displayed.

Figure 54:
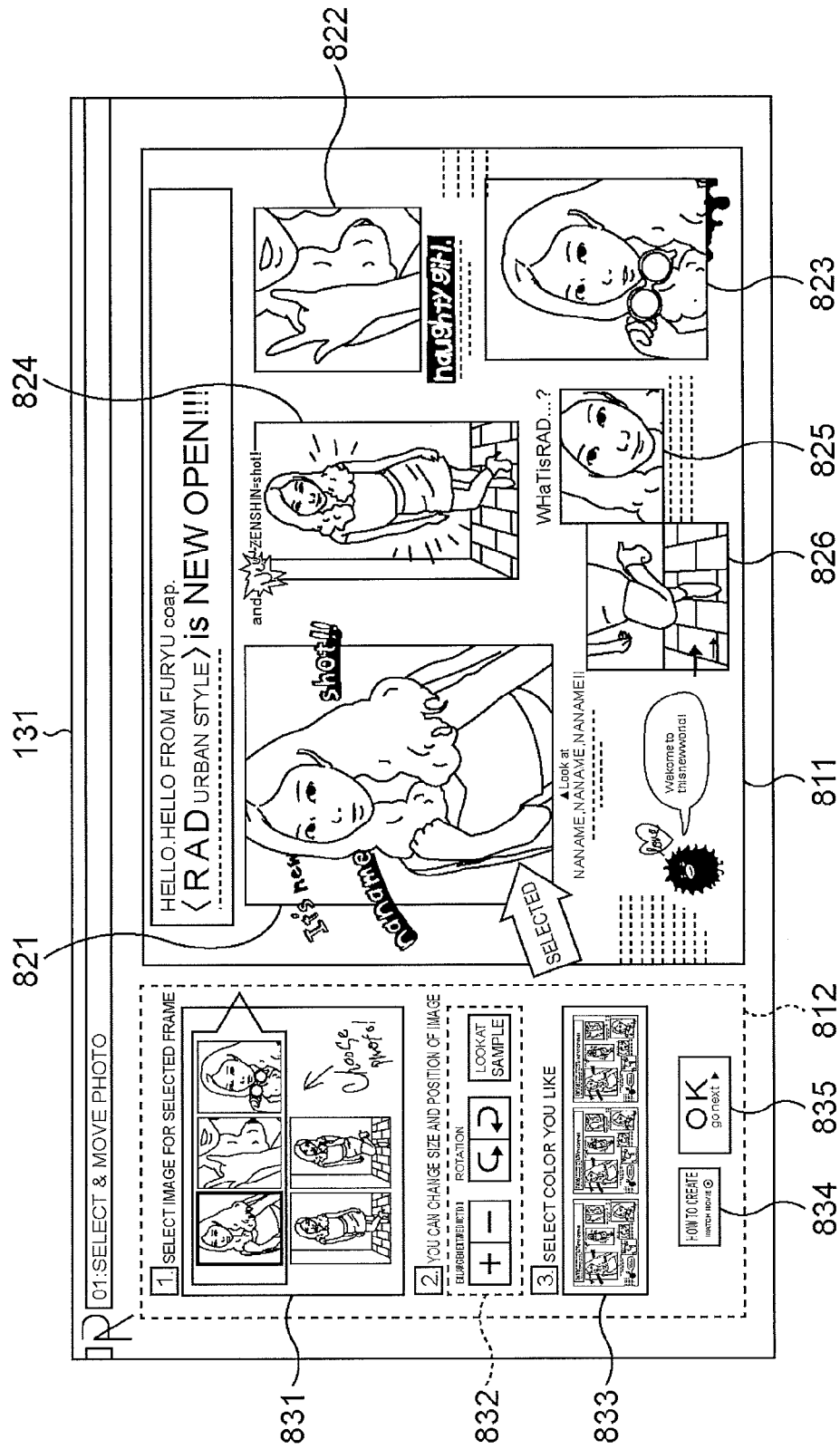
FIG. 54 is a diagram illustrating an example of an editing screen of the one-person course.

On the editing screen of FIG. 54, a sticker layout image 811 is provided on the right side of the editing screen, and an area 812 is provided on the left side of the editing screen. The sticker layout image 811 is an editing area on which the editing target shot images are displayed. Furthermore, the area 812 is the area on which the editing palette in which the editing tools are displayed and buttons for various settings relating to edition are displayed.

On the other hand, a left-handed user selects the selection button 761 with the stylus pen 132A on the pen selection screen, the stylus pen 132B becomes invalid. Then, the first editing screen illustrated in FIG. 55 is displayed.

Figure 55:
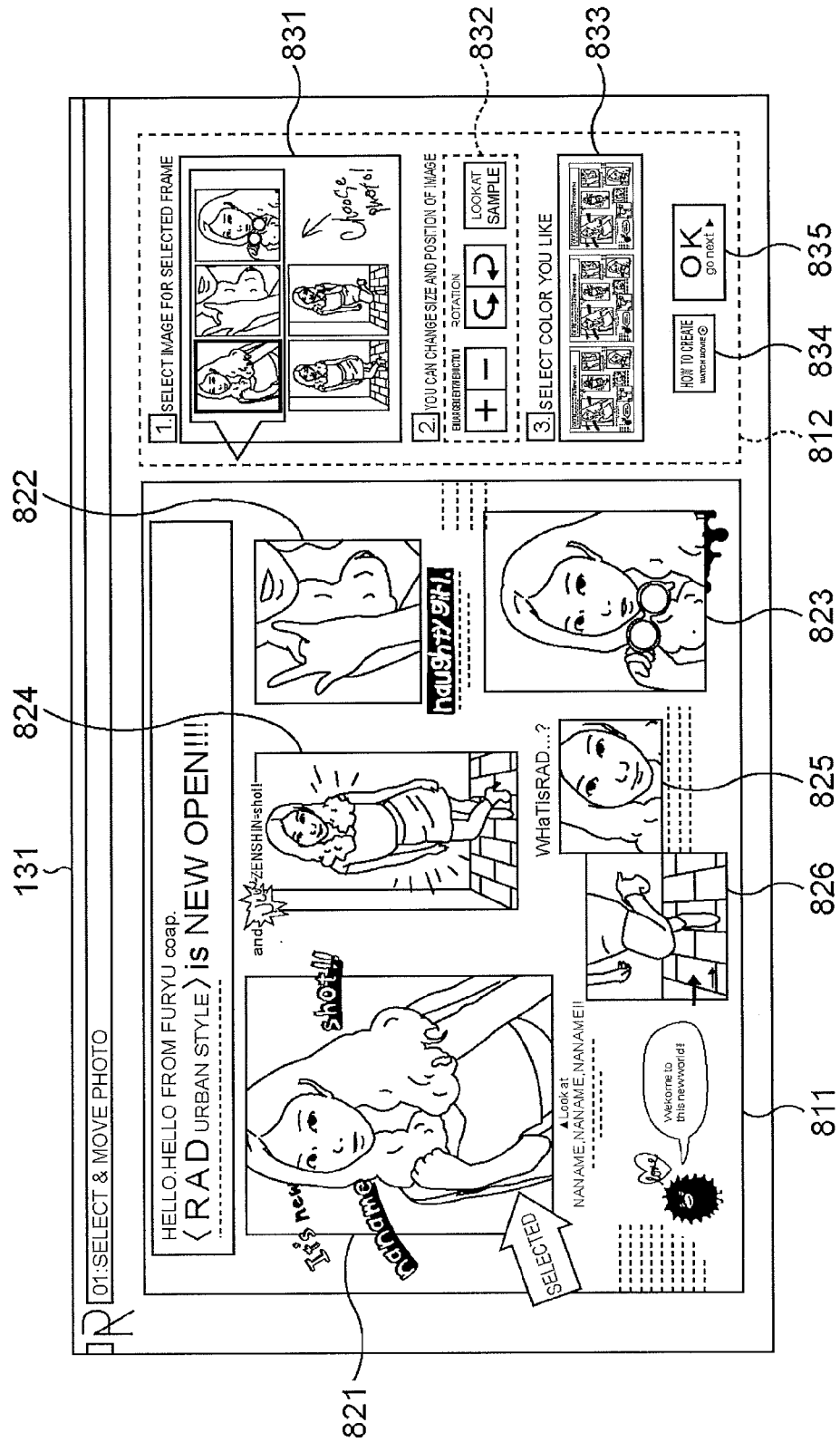
FIG. 55 is a diagram illustrating an example of an editing screen of the one-person course.

On the editing screen of FIG. 55, the sticker layout image 811 is provided on the left side of the editing screen, the area 812 is provided on the right side of the editing screen.

Generally, most of the operation using the stylus pen to the editing screen is the operation to the editing area on which the editing target shot images are displayed. Therefore, the sticker layout image 811 which is the editing area is displayed on the editing screen on the side where the stylus pen used by the user is provided. It is thereby possible for the user to perform editing input at the editing work without being obstructed by the code connecting the stylus pen and the editing unit 12 (FIG. 11).

In the above description, the positions of the sticker layout image 811 and the area 812 are changed according to the selected stylus pen. However, at least any one of the positions, sizes, shapes, or directions of the sticker layout image 811 and the area 812 may be changed according to the selected stylus pen.

For example, when a plurality of stylus pens is provided on both right and left sides of the tablet built-in monitor 131, the sticker layout image 811 is largely displayed on the editing screen on the side where the number of the valid stylus pens is larger. Thus, it becomes easy to perform the editing input.

Furthermore, when the sticker layout image 811 is divided into the right and left parts, the aspect ratios of which are changed, and the divided images of the sticker layout image 811 are displayed on the right side and the left side of the editing screen, the sticker layout image is largely displayed on the editing screen on the side where the number of the valid stylus pens is larger. Thus, it becomes easy to perform the editing input.

Furthermore, on the editing screen, the sticker layout image 811 and the area 812 may be displayed in a row in the vertical direction instead of in the left-right direction. In this case, two stylus pens are provided over and below the tablet built-in monitor 131 on either right or left side thereof. For example, when the upper stylus pen is selected by a user who is tall, the sticker layout image 811 is provided on the upper part of the editing screen. Furthermore, when the lower stylus pen is selected by a user who is short, the sticker layout image 811 is provided on the lower part of the editing screen.

Moreover, according to the stylus pen selected by the user, the sticker layout image 811 and the area 812 may be rotatably displayed on the editing screen.

Furthermore, the number of the available (valid) stylus pens may be changed according to the number of users. It is thereby possible to perform the editing input without a situation where the respective users have nothing to do when the number of the users is large.

The editing screen illustrated in FIG. 54 or FIG. 55 is used to determine the shot image to be arranged in the sticker layout image 811, a size and an angle of the shot image, and a color of the sticker layout image 811.

On the first editing screen illustrated in FIG. 54 or FIG. 55, six shot images 821 to 826 are arranged in the sticker layout image 811.

Furthermore, an image selection area 831, an operation area 832, a color selection area 833, a movie reproduction button 834, and an OK button 835 are provided in the area 812.

On the image selection area 831, the shot images (in this example, three close-up images and two whole-body images) obtained in the shooting processing of the one-person course are displayed. The shot images 821 to 826 arranged in the sticker layout image 811 can be replaced with the shot image displayed in image selection area 831.

More specifically, when any one of the shot images displayed in the image selection area 831 is selected by the user, the shot image indicated by an arrow with a word "Selected" in the sticker layout image 811 is replaced with the selected shot image.

Furthermore, in the sticker layout image 811, any one of a plurality of shot images can be selected as the shot image to be arranged in each of the shot image arrangement areas.

Note that, when the shot image to be arranged on the shot image arrangement area is the close-up image, the whole-body images among the shot images displayed in the image selection area 831 are grayed out, and the selection of the close-up image is received. Furthermore, when the shot image to be arranged on the shot image arrangement area is the whole-body image, the close-up images among the shot images displayed in the image selection area 831 are grayed out, and the selection of the whole-body image is received.

On the operation area 832, a "+ button", a "− button" and a rotation button are provided. The "+ button" and the "− button" are used to enlarge/reduce the shot image within the shot image arrangement area. The rotation button is operated to rotate the shot image. The enlargement/reduction of the shot image is limited within a predetermined range. Similarly, the rotation range of the shot image is limited so as not to miss a part of the shot image.

In the examples of FIG. 54 and FIG. 55, a button to rotate the shot image counterclockwise and a button to rotate the shot image clockwise are provided as the rotation button. In addition, a button to set a rotation angle and the like may be provided.

Furthermore, in the sticker layout image 811, the shot image is moved within the shot image arrangement area by, for example, dragging the image, and the display range of the shot image on the shot image arrangement area can be changed. It is thereby possible to avoid a foreground image from overlapping the user as the object when the foreground image is arranged in advance at a predetermined position on the shot image arrangement area. Note that, in this case, the foreground image may be moved within the shot image arrangement area.

Moreover, the shot image may be laterally inverted within the shot image arrangement area, or shearing processing in which a rectangular shot image is changed to a parallelogram shot image may be performed. Note that, when the shot image is laterally inverted, the area to be inverted in the shot image may be selected by the user.

On the color selection area 833, three sticker layout images, to which different colors are added, are displayed. When any one of the three sticker layout images displayed in the color selection area 833 is selected, the color added to the selected sticker layout image is reflected in the sticker layout image 811. Note that, in addition to a color of the sticker layout image, a hue of the shot images arranged in the sticker layout image may be changed according to the color of the sticker layout image.

When the movie reproduction button 834 is operated, a pop-up window is displayed on the editing screen. The moving image for explaining possible editing work on the editing screen is reproduced on the pop-up window.

The OK button 835 is operated to perform a screen transition to a second editing screen. When the OK button 835 is operated, the second editing screen illustrated in FIG. 56 is displayed.

Figure 56:
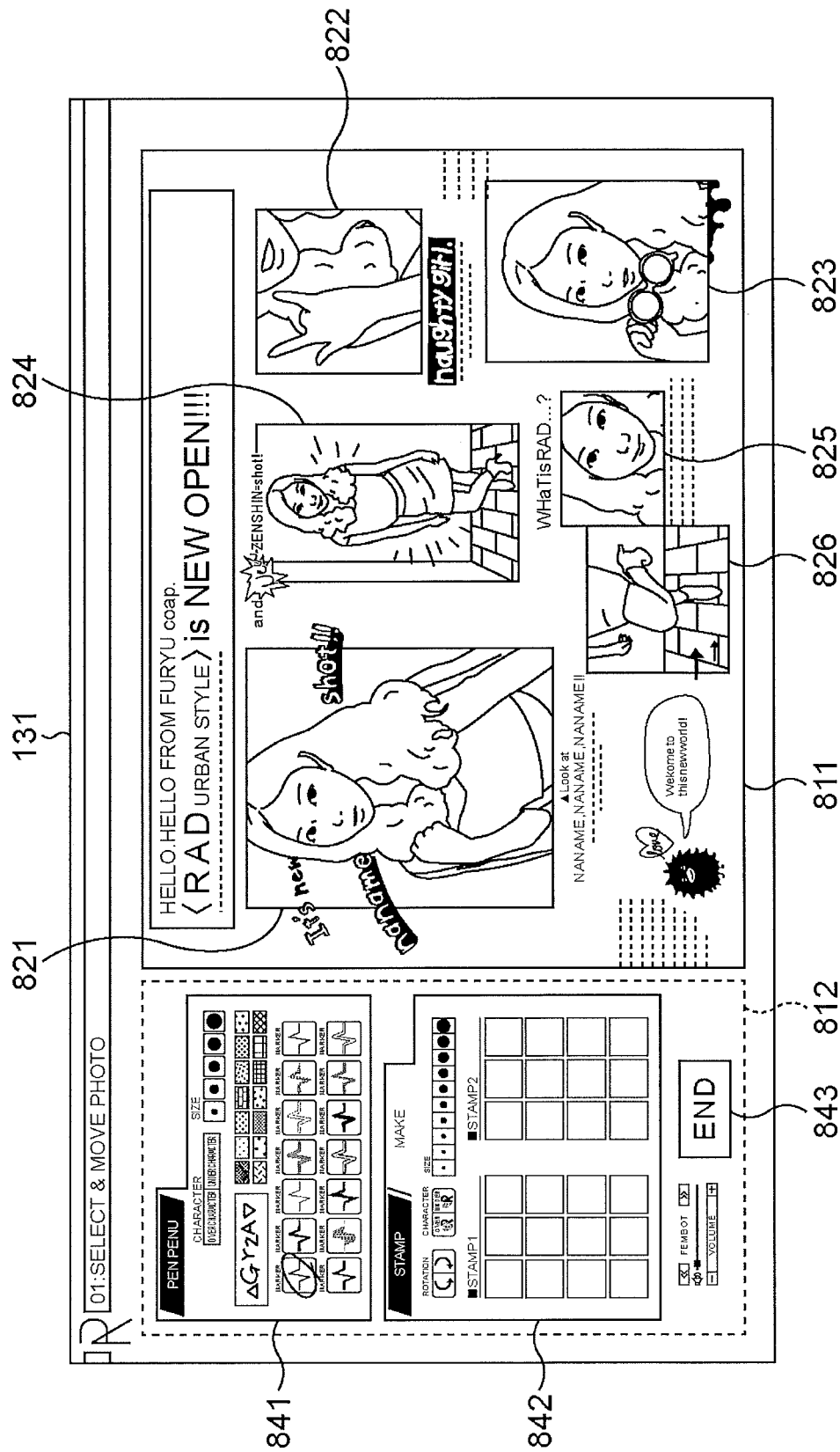
FIG. 56 is a diagram illustrating an example of an editing screen of the one-person course.

The second editing screen illustrated in FIG. 56 is displayed after the OK button 835 is operated on the first editing screen illustrated in FIG. 54. On the editing screen illustrated in FIG. 56, the sticker layout image 811 is provided on the right side of the editing screen, and the area 812 is provided on the left side of the editing screen. That is, the editing screen illustrated in FIG. 56 is the editing screen which is displayed when a right-handed user selects the selection button 762 with the stylus pen 132B on the pen selection screen.

Note that, when a left-handed user selects the selection button 761 with the stylus pen 132A on the pen selection screen, the editing screen, in which the sticker layout image 811 is provided on the left side of the editing screen, and the area 812 is provided on the right side of the editing screen, is displayed similarly to the editing screen illustrated in FIG. 55.

The second editing screen illustrated in FIG. 56 is used to edit the shot images to be arranged in the sticker layout image 811.

On the editing screen illustrated in FIG. 56, a pen palette display area 841, a stamp palette display area 842, and an end button 843 are displayed on the area 812.

On the pen palette display area 841, the pen palette is displayed. The pen palette is used to select a pen image (pen tool) used for a handwriting input. Furthermore, on the stamp palette display area 842, the stamp palette is displayed. The stamp palette is used to select a stamp image (stamp tool) to be composed on the shot image arranged in the sticker layout image 811. A type of line, a thickness, and a color of the pen image displayed on the pen palette, and a color, a pattern, and the like of the stamp image displayed on the stamp palette are suitable for the design of the sticker layout image 811. Note that, as described above, when the size of the sticker layout image 811 is changed, the pen palette display area 841 and the stamp palette display area 842 may be enlarged or reduced according to the size of the sticker layout image 811.

It is thereby possible to obtain the sticker sheet having a finish with a sense of unity at the end without impairing a sense of unity of the sticker layout image and the shot images arranged on the shot image arrangement areas thereof.

The end button 843 is operated to terminate the editing work on the editing screen.

As described above, in the one-person course, the user can perform the editing work to the respective the shot images, while the shot images are displaying in the sticker layout image. The user can thereby perform the editing while imaging the finished entire image to be printed on the sticker sheet. Consequently, it is possible to more reliably provide the sticker sheet as the user imagined.

<Example of Mobile Transmission Image Selection Screen>

Next, an example of the mobile transmission image selection screen displayed in the editing processing of FIG. 57 will be described.

Figure 57:
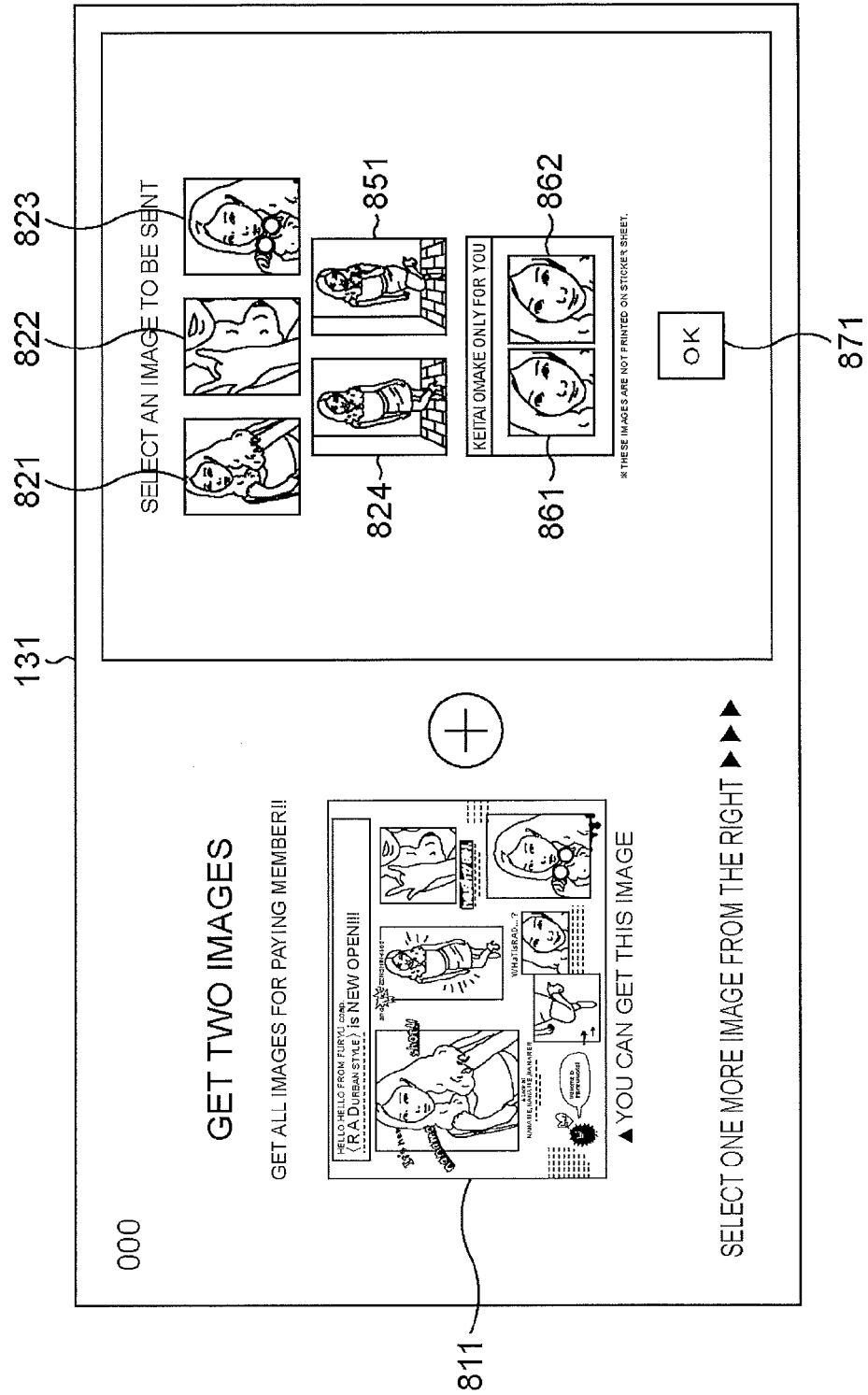
FIG. 57 is a diagram illustrating an example of a mobile transmission image selection screen.

FIG. 57 is a diagram illustrating an example of the mobile transmission image selection screen when the course by person-number is the one-person course.

On the upper-left part of the mobile transmission image selection screen, messages "Get two images" and "Get all images for a paying member!!" are displayed. The sticker layout image 811, in which the shot images edited on the above described editing screen are arranged, is displayed under these messages. Furthermore, messages "You can get this image" and "Select one more image from the right" are displayed under the sticker layout image 811.

On the upper-right part of the mobile transmission image selection screen, a message "Select an image to be sent" is displayed. The shot images 821 to 824 and 851 arranged in the sticker layout image 811 are displayed under the message. The shot image 851 is the shot image (whole-body image) before the shot images 825 and 826 arranged in the sticker layout image 811 are trimmed. Note that, all of the shot images 821 to 824 and 851 are the images before editing.

Moreover, under the shot images 821 to 824 and 851, keitai omake images 861 and 862 are displayed. The keitai omake image is not to be printed on the sticker sheet but to be transmitted to the mobile terminal. Under the keitai omake images 861 and 862, an OK button 871 to terminate the selection of the mobile transmission image is displayed.

The user applies a membership registration to a site provided by a server which is the transmission destination of the mobile transmission image and can get the mobile transmission images. The site provides a paying member and a non-paying member. When the user is not the member of the site, the user can become the non-paying member by applying the membership registration at getting a mobile transmission image.

All of the shot images 821 to 824 and 851, and the sticker layout image 811 is transmitted from the photo sticker creating device 1 to the server. All of the shot images 821 to 824 and 851, and the sticker layout image 811 are provided from the server to the mobile terminal of the paying member. The shot image selected by the user from the shot images 821 to 824 and 851, and the sticker layout image 811 is provided from the server to the mobile terminal of the non-paying member.

That is, regardless of whether the user is the paying member or the non-paying member, at least the shot image selected by the user and the sticker layout image 811 is provided to the mobile terminal of the user.

As described above, the sticker layout image to be printed on the sticker sheet is transmitted to the mobile terminal of the user. That is, it is possible for the user to check the sticker layout image printed on the sticker sheet on the mobile terminal.

Note that, the shot image which is provided with the sticker layout image to the mobile terminal is the image before editing. It is thereby possible for the user to newly edit the shot image on the mobile terminal.

Furthermore, the shot images arranged in the sticker layout image 811 to be provided to the mobile terminal may be the image before editing instead of the image after editing. In this case, it is possible for the user to edit the shot images arranged in the sticker layout image on the mobile terminal, and thereby obtain the image with a different finish from the sticker layout image printed on the sticker sheet. As a result, it is possible to provide beneficial feeling to the user.

Moreover, whether the shot image provided to the mobile terminal is the shot image after or before editing may be selected by the user.

As described above, when the course by person-number is the one-person course, that is, the number of the users is one, the shot image before editing and the sticker layout image are transmitted to the server and provided to the mobile terminal of the user. On the other hand, when the number of the users is two or more, the shot image after editing is transmitted to the server and provided to the mobile terminals of the users.

That is, it is determined whether the shot image before editing or after editing is provided to the mobile terminal of the user according to the number of the users. Moreover, in the embodiment, the number of the users is selected by the person-number course. Therefore, it can be determined whether the shot image before editing or after editing is provided to the mobile terminal of the user according to the course selected by the user.

When the number of the users is two or more, that is, when the course by person-number is the two-persons course or the large-number-persons course, each of the users performs the editing input to one shot image, and the degree of perfection is thereby improved. On the other hand, when the number of the users is one, that is, when the course by person-number is the one-person course, the single user performs the editing input to a plurality of shot images arranged in the sticker layout image, the entire sticker layout image is thereby well-balanced.

Therefore, according to the number of the users, that is, according to the course selected by the user, either of the image in which the degree of perfection is independently improved or the image in which the entire image are well-balanced is provided to the mobile terminal of the user.

<Example of Print Layout Image>

Next, with reference to FIG. 58, the print layout indicating the arrangement of the images to be printed on the sticker sheet will be described.

The print layout in the one-person course is determined by the number of divisions selected in the pre-service processing. The print layout has an area on which the sticker layout image selected by the user is arranged and an area on which a predetermined shot images are arranged.

Figure 58:
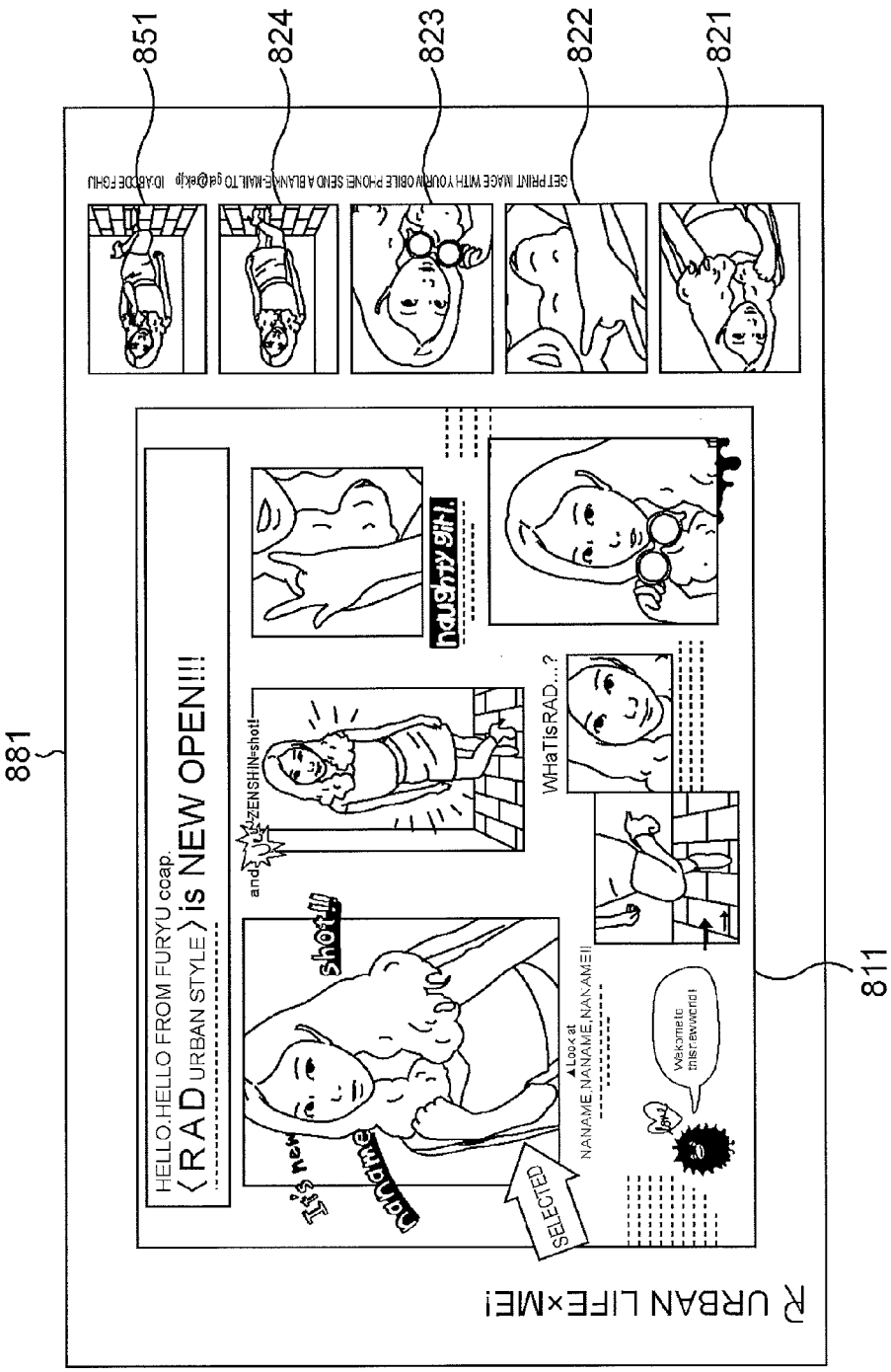
FIG. 58 is a diagram illustrating an example of a print layout of a sticker sheet.

In the sticker sheet 881 illustrated in FIG. 58, five shot images 821 to 824 and 851 together with the sticker layout image 811 are printed. In the sticker sheet 881, the area on which the shot images 821 to 824 and 851 are arranged is the area on which the predetermined shot images are to be arranged. That is, the shot image other than the shot images 821 to 824 and 851 is not arranged on the areas on which the shot images 821 to 824 and 851 are arranged.

On the other hand, as described above, in the sticker layout image, any one of a plurality of shot images can be selected as the shot images to be arranged on the shot image arrangement areas.

That is, the user can arrange the same shot image on, for example, three among a plurality of shot image arrangement areas, or on all of the shot image arrangement areas. Furthermore, in the sticker layout image in which the number of the shot image arrangement areas is larger than the number of the shot images, a plurality of shot images is arranged on the respective shot image arrangement areas, and the specific shot image can be arranged on the rest of the shot image arrangement areas.

That is, the user can arrange the one's favorite shot image in a plurality of shot image arrangement areas in the sticker layout image. As a result, it is possible to improve the user's satisfaction with the printed sticker sheet at the end.

Furthermore, according to the sticker layout image selected in the pre-service processing or the print layout determined by the number of divisions, the arrangement and the number of the shot image arrangement areas of the close-up images are different from that of the whole-body images on the sticker sheet. That is, by selecting the sticker layout image or the number of divisions, it is possible to improve the flexibility to arrange the shot images.

The shot image arrangement areas of the sticker layout image may include the shot image arrangement area for each shot image type in addition to the shot image arrangement areas of the close-up image and the whole-body image. In this case, the image corresponding to the type of the shot image arrangement area is selected as the image to be arranged on each of the shot image arrangement areas. The shot image type is determined by whether the shot image is the close-up image or the whole-body image. Furthermore, the shot image type may be determined by whether or not the shot image is obtained by the whole-body from above shooting. Moreover, in the case of the two-persons course, the shot image type may be determined by whether the shot image is the image of the user on the right side or the image of the user on the left side.

<Example of Other Sticker Layout Image>

Incidentally, the sticker layout image which can be selected when the one-person course is selected is not limited to the above described images. In the following description, an arrangement example of the shot images in other sticker layout images will be described.

Figure 59:
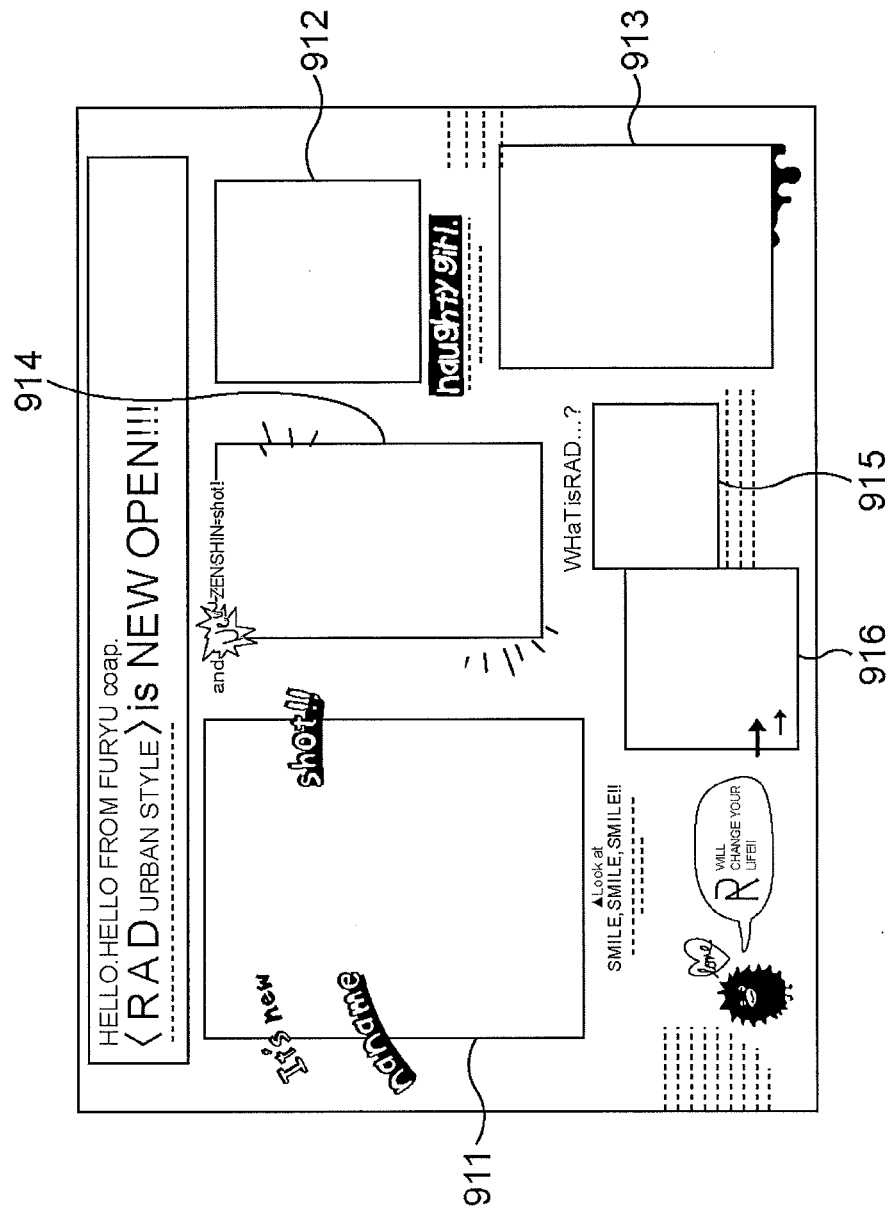
FIG. 59 is a diagram illustrating an example of another sticker layout image.

FIG. 59 is a diagram illustrating an arrangement example of the above described sticker layout image.

In the sticker layout image illustrated in FIG. 59, among shot image arrangement areas 911 to 916, the close-up images are arranged on the shot image arrangement areas 911 to 913, and the whole-body image is arranged on the shot image arrangement area 914. Furthermore, the image in which the area including the face of the user is trimmed from the whole-body image is arranged on the shot image arrangement area 915, and the image in which the area including a body part other than the face of the user trimmed from the whole-body image is arranged on the shot image arrangement area 916. Note that, the shot image arrangement areas 915 and 916 may be arranged such that a part of the area is overlapped each other.

FIGS. 60 to 65 are diagrams illustrating arrangement examples of other sticker layout images.

Figure 60:
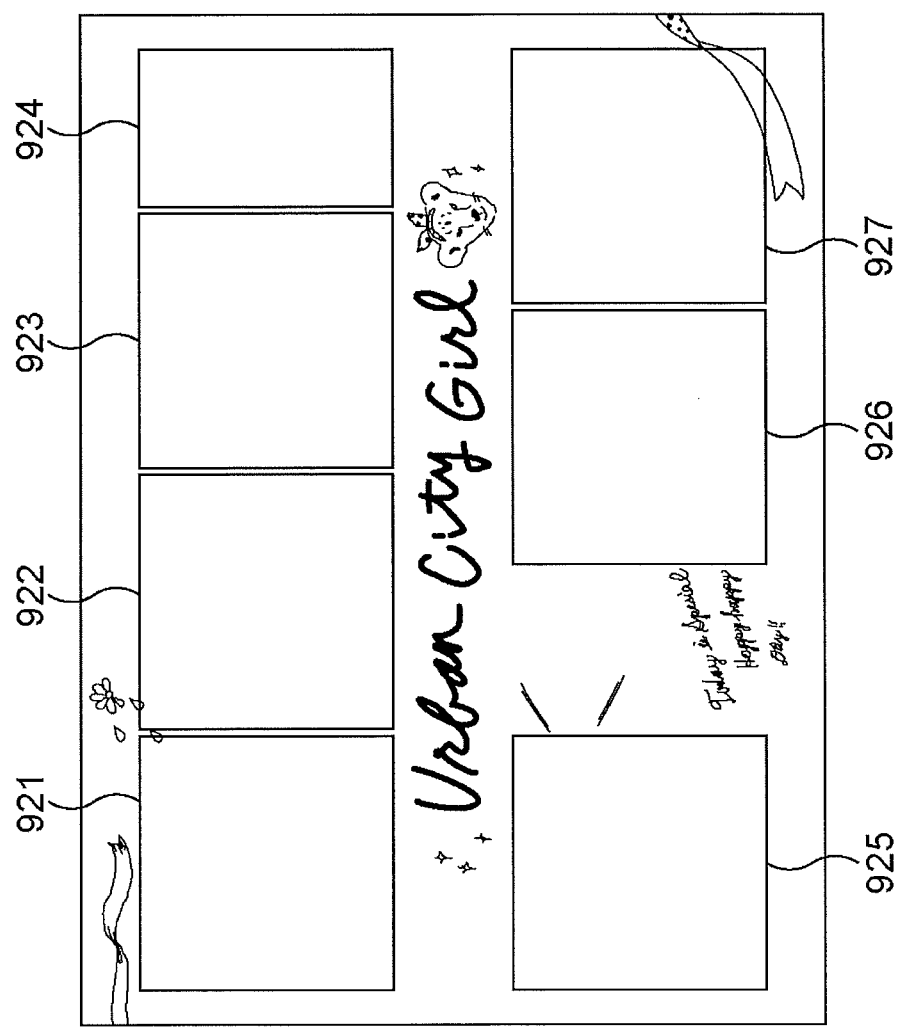
FIG. 60 is a diagram illustrating an example of other sticker layout image.

In the sticker layout image illustrated in FIG. 60, the close-up images are arranged on all of shot image arrangement areas 921 to 927. Note that, the vertical length of each of the shot image arrangement areas 921 to 927 is the same, but the horizontal length is different. That is, the aspect ratio of each of the shot image arrangement areas 921 to 927 is different.

Figure 61:
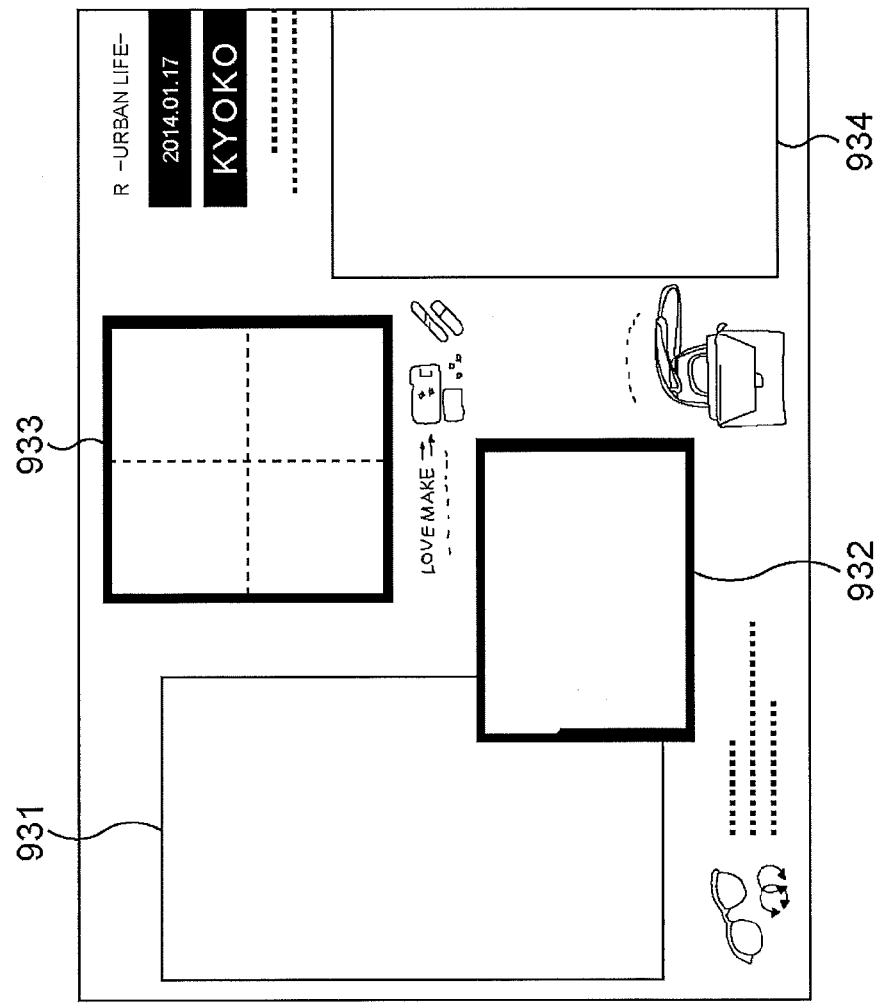
FIG. 61 is a diagram illustrating an example of other sticker layout image.

In the sticker layout image illustrated in FIG. 61, among shot image arrangement areas 931 to 934, the whole-body images are arranged on the shot image arrangement areas 931 and 934 largely provided on the right and the left of the sticker layout image. Furthermore, the image in which a part of area is trimmed from the whole-body image is arranged on the shot image arrangement area 932. Moreover, four images of the close-up image, the image in which a part of area is trimmed from the whole-body image, and the like are arranged in a 2×2 matrix on the shot image arrangement area 933.

Figure 62:
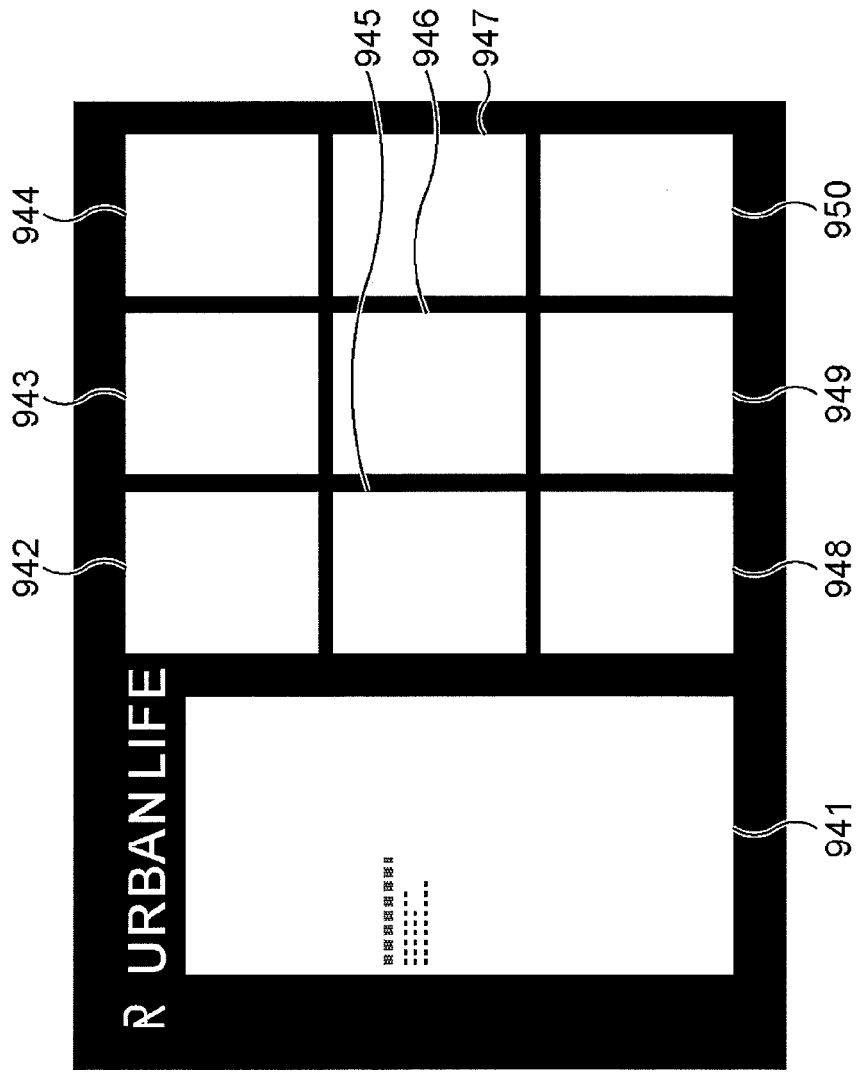
FIG. 62 is a diagram illustrating an example of other sticker layout image.

In the sticker layout image illustrated in FIG. 62, among shot image arrangement area 941 to 950, the whole-body image is arranged on the shot image arrangement area 941 largely provided on the left side of the sticker layout image. Furthermore, the close-up images are arranged on the shot image arrangement areas 942 to 950. Note that, the close-up shooting to obtain the close-up image is performed basically three times. Therefore, the same image is repeatedly arranged on the shot image arrangement areas 942 to 950.

Figure 63:
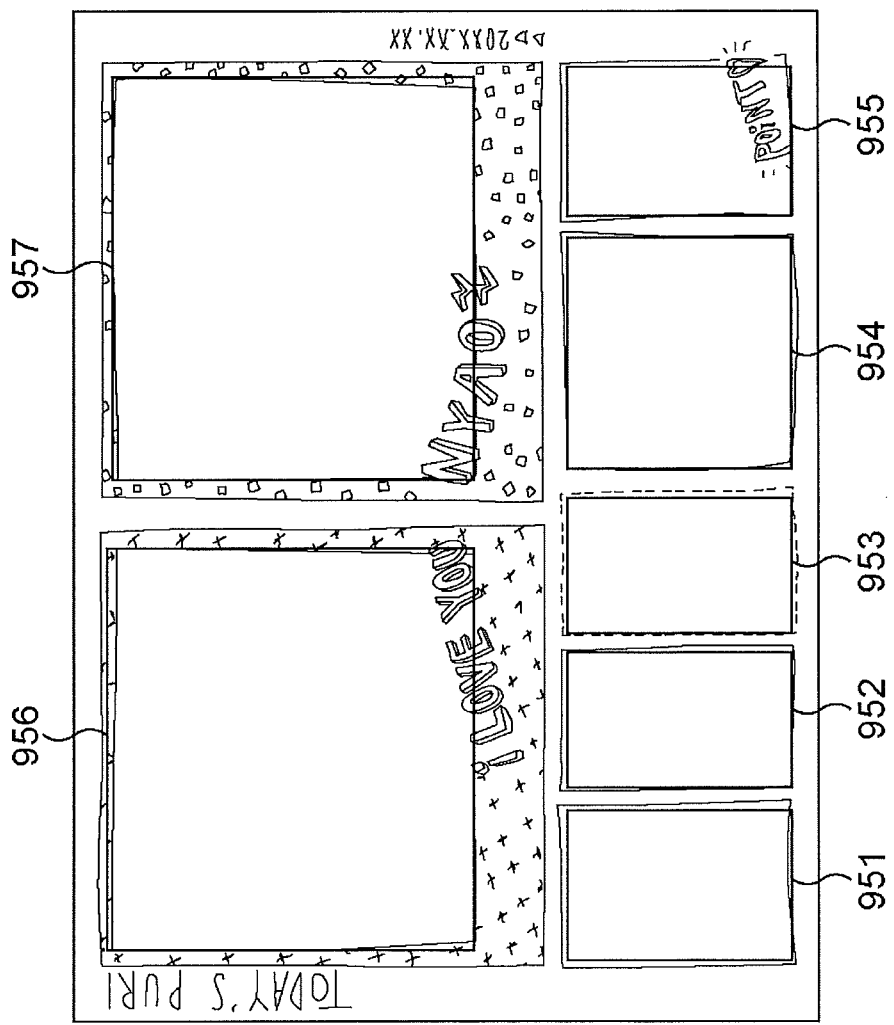
FIG. 63 is a diagram illustrating an example of other sticker layout image.

In the sticker layout image illustrated in FIG. 63, among shot image arrangement areas 951 to 957, the close-up images are arranged on the shot image arrangement areas 951, 954, and 955, and the whole-body images are arranged on the shot image arrangement areas 952 and 953. Furthermore, any one of the close-up images arranged on the shot image arrangement areas 951, 954, and 955 is arranged on each of the shot image arrangement areas 956 and 957. Each frame of the shot image arrangement areas 951 to 957 is written in imitation of a hand-written line. Note that, in the sticker layout image illustrated in FIG. 63, the close-up image may be arranged on the shot image arrangement area on which the whole-body image is to be arranged, or the whole-body image may be arranged on the shot image arrangement area on which the close-up image is to be arranged.

Figure 64:
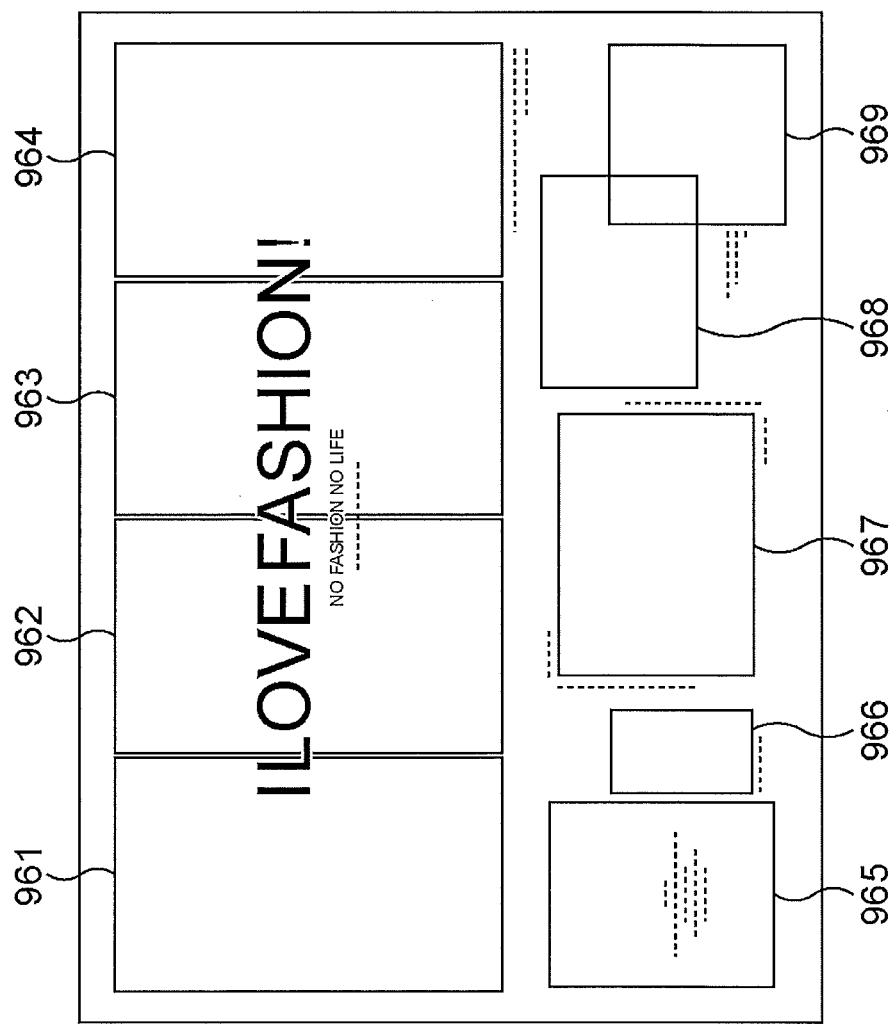
FIG. 64 is a diagram illustrating an example of other sticker layout image.

In the sticker layout image illustrated in FIG. 64, among shot image arrangement areas 961 to 959, two each of two whole-body images are arranged on the shot image arrangement areas 961 to 964. Furthermore, the close-up images are arranged on the shot image arrangement areas 965 to 969 which are different in sizes. Note that, the close-up shooting to obtain the close-up image is performed basically three times. Therefore, the same image is repeatedly arranged on the shot image arrangement areas 965 to 969. Furthermore, the shot image arrangement areas 968 and 969 are arranged such that a part of the area is overlapped each other.

Figure 65:
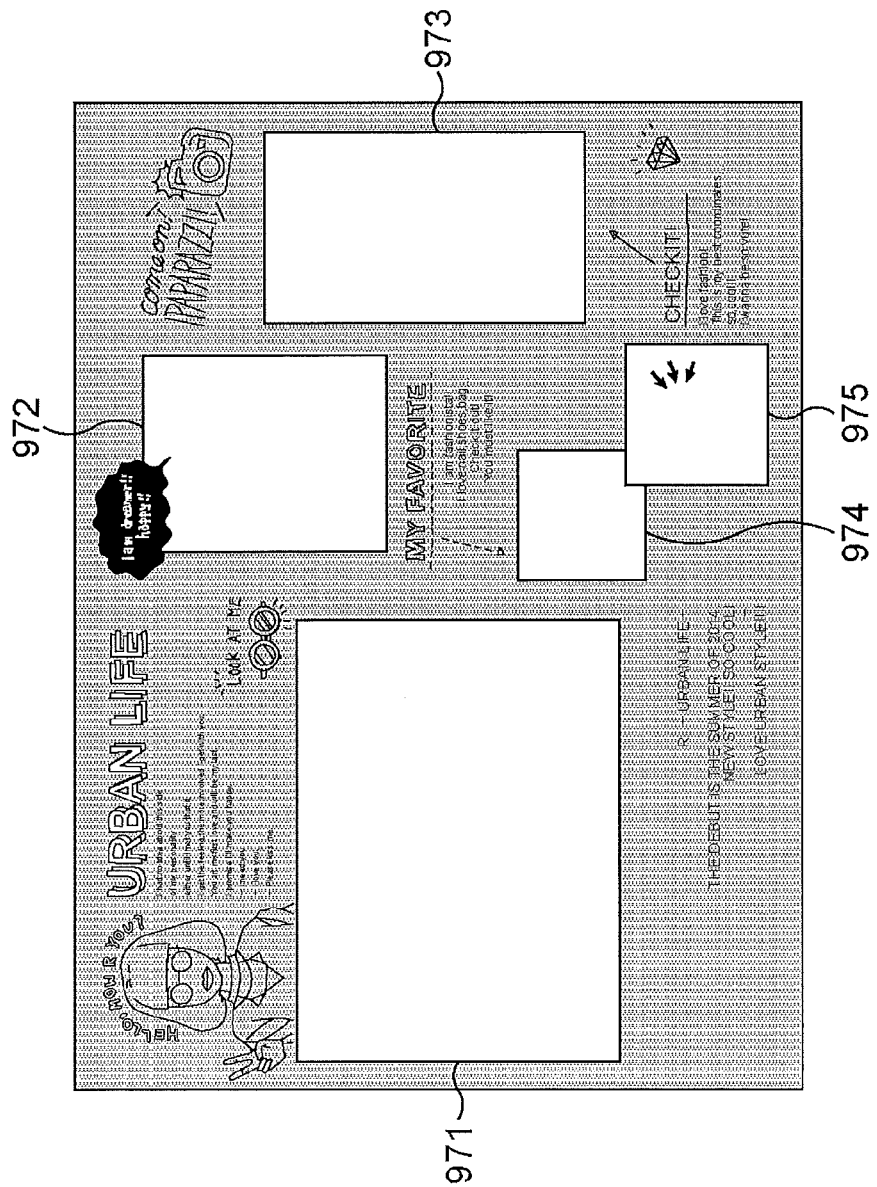
FIG. 65 is a diagram illustrating an example of other sticker layout image.

In the sticker layout image illustrated in FIG. 65, among shot image arrangement areas 971 to 975, the close-up images are arranged on the shot image arrangement areas 971 and 972, and the whole-body image is arranged on the shot image arrangement area 973. Furthermore, the image, in which the area including the face of the user is trimmed from the whole-body image, is arranged on the shot image arrangement area 974, and the image, in which the area including a body part other than the face of the user is trimmed from the whole-body image, is arranged on the shot image arrangement area 975. Note that, the shot image arrangement areas 974 and 975 are arranged such that a part of the area is overlapped each other. Furthermore, each aspect ratio of the shot image arrangement areas 971 to 975 is different.

As described above, by preparing the sticker layout image having various designs and the shot image arrangement areas, it is possible to more reliably provide the user's desired image.

Incidentally, in a conventional photo sticker machine, performing various types of image processing to the shot image has been proposed such that the user more beautifully appears in the shot image.

However, image processing to make the upper arm of the user in the shot image thin has not been performed.

Therefore, in the embodiment, the image processing section 325 of the shooting processing section 302 detects the arm area of the user in the shot image and reduces the detected arm area, and the upper arm of the user in the shot image thereby becomes thin.

<Upper Arm Slimming Processing>

Figure 66:
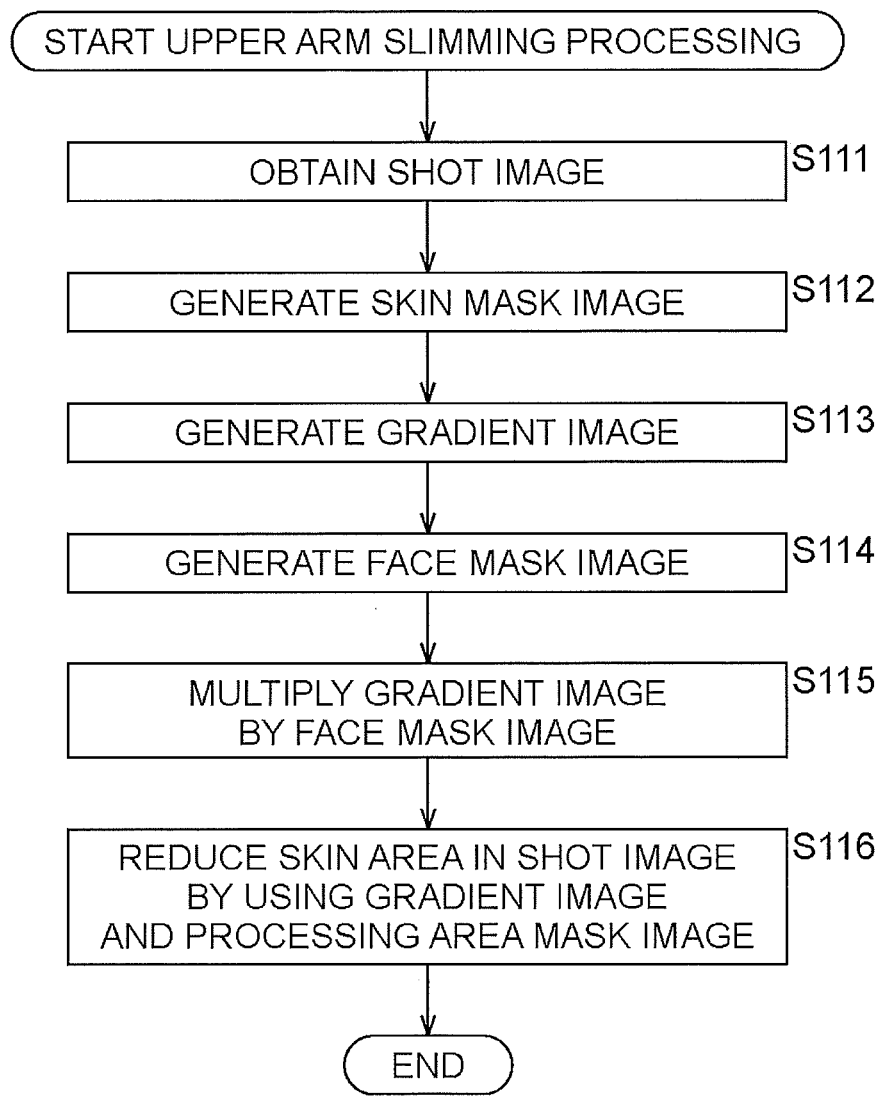
FIG. 66 is a flowchart describing upper arm slimming processing.

With reference to the flowchart of FIG. 66, upper arm slimming processing performed by the image processing section 325 will be described.

In step S111, the image processing section 325 obtains the shot image shot by the camera 91.

In step S112, the image processing section 325 performs skin area detecting processing to the obtained shot image and divides the skin area from the other area in the shot image. The image processing section 325 thereby generates a skin mask image to which binarization processing is performed.

Figure 67:
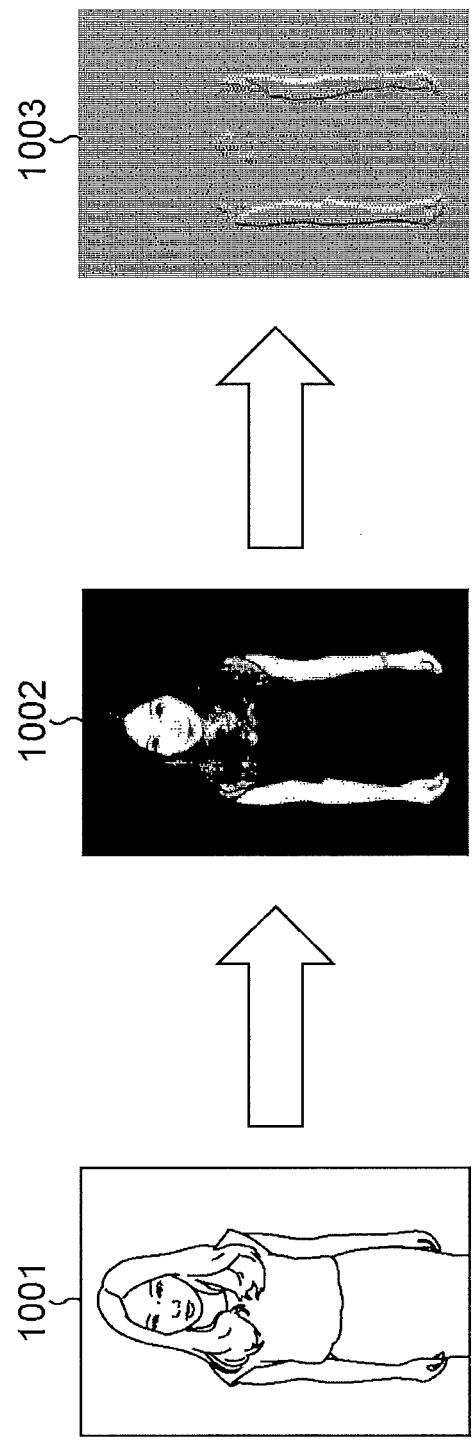
FIG. 67 is a diagram describing an image generated in the upper arm slimming processing.

More specifically, when a shot image 1001 illustrated in the left of FIG. 67 is obtained, the image processing section 325 generates a skin mask image 1002 illustrated in the center of FIG. 67. The skin mask image 1002 is the image in which the pixel value of the pixel of the skin area is set to (R, G, B)=(255, 255, 255) (that is, the pixel of the skin area is the white pixel), and the pixel value of the pixel of the other areas is set to (R, G, B)=(0, 0, 0) (that is, the pixel of the other areas is the black pixel) in the shot image 1001. In the skin mask image 1002, a difference in the pixel values of the boundary between the skin area and the other areas is large.

Next, the image processing section 325 performs blurring processing in which the skin mask image 1002 is blurred by using, for example, a low pass filter and smooths the difference in the pixel values of the boundary between the skin area and the other areas. Then, in step S113, the image processing section 325 generates a gradient image in the X direction (in the horizontal direction in FIG. 67) and a gradient image in the Y direction (in the vertical direction in FIG. 67) based on the pixel value of the skin mask image to which the blurring processing is performed.

In step S114, the image processing section 325 generates a face mask image.

In step S115, the image processing section 325 multiplies the generated gradient image by the face mask image. As a result, a gradient image 1003 illustrated in the right of FIG. 67 is obtained. Here, in the shot image, the areas corresponding to the black area and the white area in gradient image 1003 include the boundary between the skin area and the other areas.

Then, in step S116, the image processing section 325 reduces the skin area in the shot image by using the gradient image and a processing area mask image.

More specifically, the image processing section 325 moves, in the shot image 1001, the image of the area in the vicinity of the boundary between the skin area and the other areas in the image of the areas corresponding to the black area and the white area of the gradient image 1003 for a predetermined movement amounts in the direction toward the inside of the arm.

Figure 68:
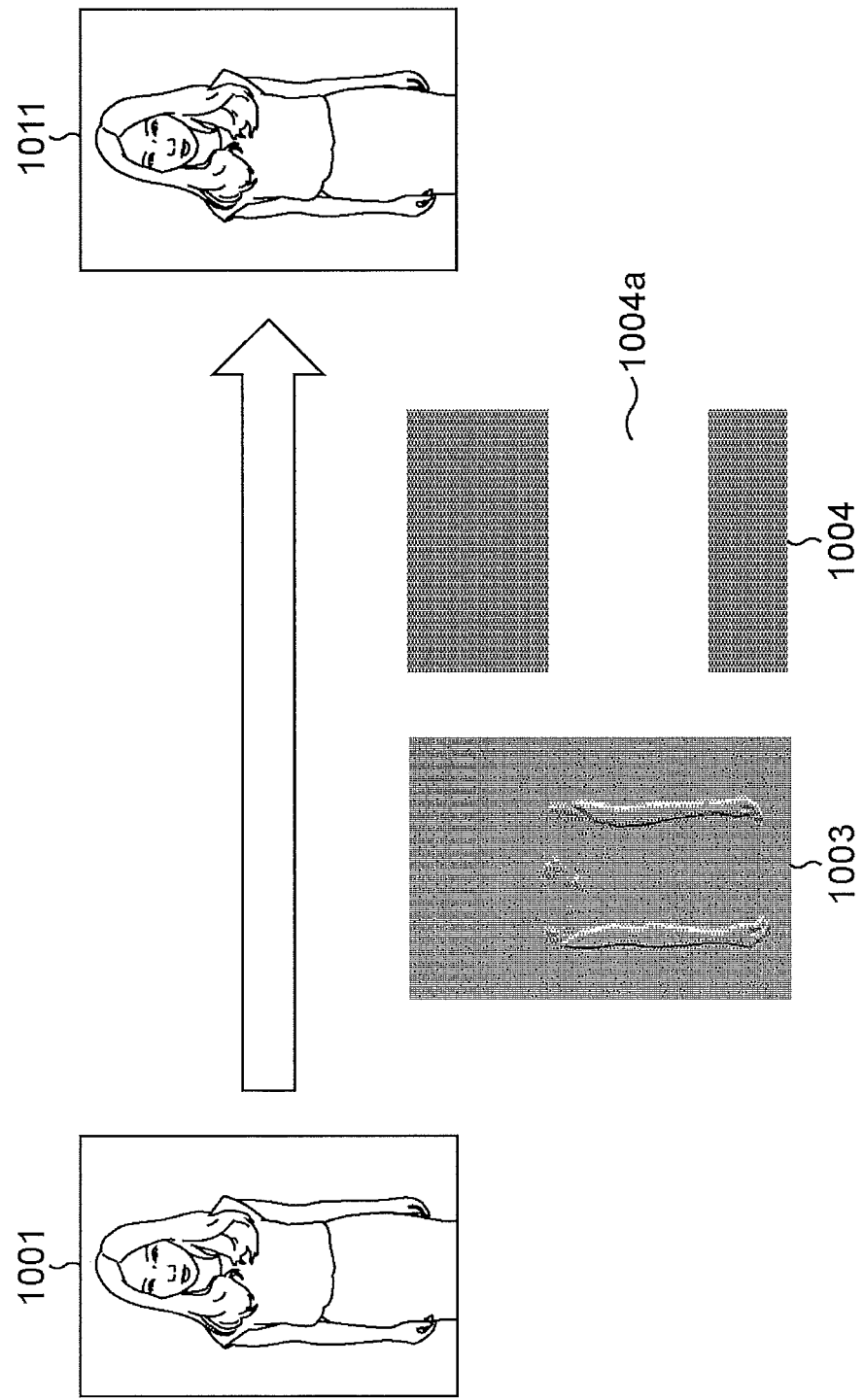
FIG. 68 is a diagram illustrating a result of the upper arm slimming processing.

At this time, by using a processing area mask image 1004 having a specific area 1004a illustrated in FIG. 68, the image processing section 325 designates the image included in the area corresponding to the specific area 1004a in the shot image 1001 as the above described object to move. The specific area 1004a is a predetermined area including the upper arm of the user in the shot image.

As described above, in the shot image 1001, the boundary part of the arm of the user moves in the direction towards the inside of the arm. Thus, the shot image 1011 in which the upper arm of the user is made thin as illustrated in FIG. 68 is displayed on the touch panel monitor 92.

Especially, with the above described processing, not only the boundary part between the arms of the user and the background, but also the boundary part between the arms and breast of the user is moved. That is, the boundary parts of the arm on the both sides of the skeletal structure of the arm move in the direction toward the inside of the arm (skeletal structure side). It is thereby possible to make the upper arms of the user in the shot image very thin.

With the above described processing, it is possible to obtain the shot image in which the upper arms of the user are made thin. As a result, it is possible to provide an image with a higher degree of satisfaction of the user.

Note that, the above described upper arm slimming processing is performed to the moving image captured by the camera 91, and the result may be displayed as the live view image. Furthermore, the above described upper arm slimming processing is performed to the shot image obtained as the still image, and the result may be displayed as the shooting result.

In the above description, the area to be moved is determined by the processing area mask image. In addition to this, the area to be moved may be set based on the position of the face of the user.

Furthermore, the movement amounts to move in the direction toward the inside of the arm may be a plurality of parameters. In this case, the user selects the gradual thickness of the arms, and the above described movement processing is performed using the corresponding parameter.

It is thereby possible to make the arm of the user the user's desired thickness.

<Movements of Camera>

Incidentally, in the camera unit described with reference to FIG. 8, the camera may be driven in the vertical direction.

Figure 69:
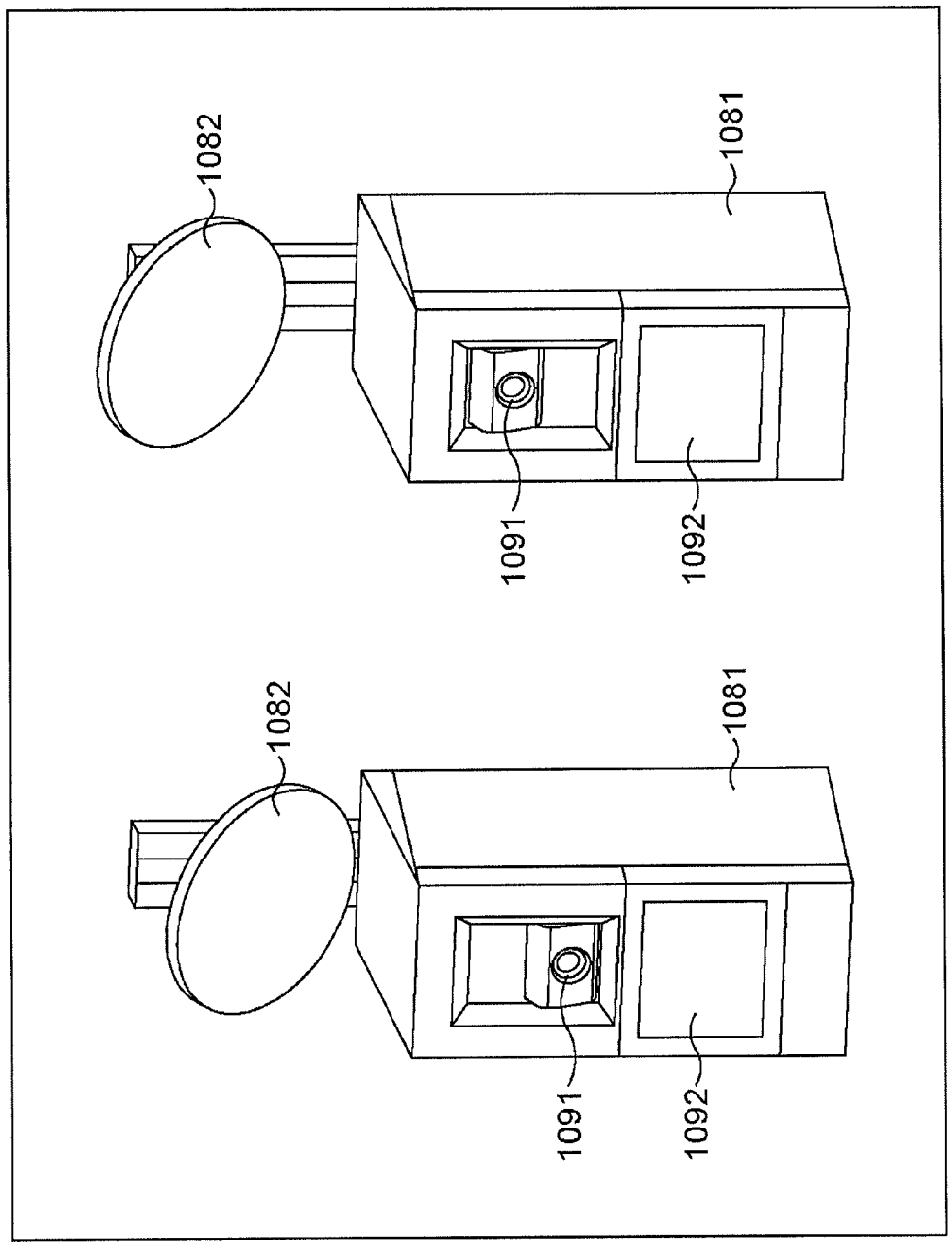
FIG. 69 is a diagram illustrating another configuration example of a camera unit.

FIG. 69 is a diagram illustrating a configuration example of a camera unit including a camera which is driven in the vertical direction.

As illustrated in FIG. 69, a camera unit 1081 is configured with a camera 1091, and a touch panel monitor 1092. Above the camera unit 1081, an upper strobe 1082 is provided. The upper surface of the camera unit 1081 also inclines to the front side as viewed from the user.

The camera 1091 is configured so as to be drivable in the vertical direction inside the camera unit 1081. Furthermore, the upper strobe 1082 is also configured so as to be drivable in the vertical direction according to the driving of the camera 1091.

For example, when the front whole-body shooting is performed, the camera 1091 is positioned at the lower part within the driving range, as illustrated in the left of FIG. 69. At this time, the upper strobe 1082 is also positioned at the lower part within the driving range.

Furthermore, when the whole-body from above shooting is performed, the camera 1091 is positioned at the upper part within the driving range as illustrated in the right of FIG. 69. At this time, the upper strobe 1082 is also positioned at the upper part within the driving range.

Note that, the camera 1091 and the upper strobe 1082 may move by the same distance so as to keep the positional relation, or the upper strobe 1082 may move by twice the distance of the movement distance of the camera 1091. In the latter case, when the whole-body from above shooting is performed, it is possible to irradiate the user with light from a higher position.

As described above, in the embodiment, the camera and the upper strobe can be configured so as to be driven in the vertical direction.

Note that, in the above described embodiments, the photo sticker creating device 1 prints the obtained shot images and edited images on the sticker sheet and further transmits the images to the server, and the images are thereby provided to the mobile terminal of the user. However, the method for providing the images is not limited to the embodiments, the photo sticker creating device 1 can transmit the shot images and the edited images to the mobile terminal of the user without printing the images on the sticker sheet. On the other hand, the photo sticker creating device 1 can print the shot images and the edited images on the sticker sheet without transmitting the images to the server.

The above described series of processing may be executed by hardware or software. When the series of processing is executed by software, a program which configures the software is installed from a network or a recording medium.

The recording medium is configured separately from the main body of the device as illustrated in FIG. 13. The recording medium is configured with the removable medium 205 implemented by, for example, a magnetic disk (including a flexible disk), an optical disk (including a compact disk read-only memory (CD-ROM) and a digital versatile disk (DVD)), a magneto-optical disk, or a semiconductor memory. The removable medium 205 contains a program and is distributed to an administrator of the photo sticker creating device 1 to deliver the program. In addition, the recording medium is configured with the ROM 206 or a hard disk of the storage section 202 which contains the program distributed to the administrator and is equipped with the main body of the device in advance.

Note that, in the present specification, the steps describing the program recorded in the recording medium include not only the processing performed along the described order in time series, but also the processing executed in parallel or separately executed, even if not necessarily processed in time series.

In the above, a print medium is not limited to a sticker sheet or a photograph sheet. For example, an image may be printed on a sheet or a film having a predetermined size, a card, such as a pre-paid card or an integrated circuit (IC) card, or cloth such as a T-shirt, or the like. In this case, a sticker layout image, in which a plurality of shot images is arranged, may be printed on such print medium.

Furthermore, embodiments of the present technology are not limited to the above-described embodiments, and various changes can be made without departing from the gist of the present technology.

What is claimed is:

1. A photo booth comprising:
   a camera; and
   an upper strobe configured to irradiate a user with light from an upper front, wherein
   the upper strobe is inclined with respect to a horizontal axis of the camera and is provided such that a light-emitting surface of the upper strobe is positioned at an upper rear of the camera as viewed from an object, and
   the upper strobe is arranged on a line L that extends along a lens optical axis of the camera to the upper rear of the camera.

2. The photo booth according to claim 1, further comprising:
   a camera unit configured with a housing incorporating the camera and a monitor, wherein
   an upper surface of the camera unit inclines to a front side as viewed from the object.

3. The photo booth according to claim 1, further comprising:
   a lower strobe configured to irradiate the user with light from a lower front, wherein
   the lower strobe is provided below the camera.

4. The photo booth according to claim 3, further comprising:
   a base portion at which the lower strobe is provided, wherein
   an upper surface of the base portion inclines to a front side as viewed from the object.

5. The photo booth according to claim 1, wherein a tilt angle of the camera is adjustable.

6. The photo booth according to claim 1, wherein the camera performs close-up shooting in which a face and an upper half of a body of the user is shot, and whole-body shooting in which a whole-body of the user is shot.

7. The photo booth according to claim 1, further comprising:
 a monitor provided in a vicinity of the camera, wherein
 a tilt angle of a display surface of the monitor is adjustable in accordance with the camera.

8. The photo booth according to claim 1, wherein a shape of the light-emitting surface of the upper strobe is a substantially circle.

9. The photo booth according to claim 1, wherein the camera is driven in a vertical direction.

10. The photo booth according to claim 9, wherein the upper strobe is driven in a vertical direction according to movement of the camera.

11. The photo booth according to claim 1, wherein the upper strobe is inclined such that the light-emitting surface of the upper strobe is configured to face the user.

* * * * *